US008621881B2

(12) United States Patent
Votaw et al.

(10) Patent No.: US 8,621,881 B2
(45) Date of Patent: Jan. 7, 2014

(54) SYSTEM AND METHOD FOR HEAT PUMP ORIENTED ZONE CONTROL

(75) Inventors: Mark Votaw, North Canton, OH (US);
Dennis Laughlin, Chardon, OH (US);
Joseph Ramunni, Wadsworth, OH (US);
Bill Molica, Willowick, OH (US); Ken Barton, Willoughby, OH (US)

(73) Assignee: Arzel Zoning Technology, Inc., Cleveland, OH (US)

( * ) Notice: Subject to any disclaimer, the term of this patent is extended or adjusted under 35 U.S.C. 154(b) by 805 days.

(21) Appl. No.: 12/855,747

(22) Filed: Aug. 13, 2010

(65) Prior Publication Data

US 2010/0314458 A1    Dec. 16, 2010

Related U.S. Application Data

(63) Continuation-in-part of application No. 11/469,971, filed on Sep. 5, 2006, now Pat. No. 7,789,317, which is a continuation-in-part of application No. 11/226,165, filed on Sep. 14, 2005, now Pat. No. 7,775,448.

(51) Int. Cl.
*F25B 25/00* (2006.01)

(52) U.S. Cl.
USPC .............................. 62/260; 62/332

(58) Field of Classification Search
USPC ............... 62/236, 260, 332; 165/45; 236/1 B
See application file for complete search history.

(56) References Cited

U.S. PATENT DOCUMENTS

| 2,254,185 | A | 8/1941 | Newton |
|---|---|---|---|
| 4,261,509 | A | 4/1981 | Anders et al. |
| 4,265,299 | A | 5/1981 | Harnish |
| 4,324,288 | A | 4/1982 | Karns |
| 4,487,028 | A | 12/1984 | Foye |
| 4,501,125 | A | 2/1985 | Han |
| 4,530,395 | A | 7/1985 | Parker et al. |
| 5,197,293 | A | 3/1993 | Okamura et al. |
| 5,245,835 | A | 9/1993 | Cohen et al. |
| 5,297,396 | A | 3/1994 | Kitamoto |
| 5,348,078 | A | 9/1994 | Dushane et al. |
| 5,461,876 | A * | 10/1995 | Dressler .................. 62/160 |
| 5,488,218 | A | 1/1996 | Olsen et al. |
| 5,564,282 | A * | 10/1996 | Kaye ....................... 62/160 |
| 5,701,750 | A | 12/1997 | Ray |
| 5,829,674 | A | 11/1998 | Vanostrand et al. |

(Continued)

FOREIGN PATENT DOCUMENTS

DE        3016125 A    11/1981

OTHER PUBLICATIONS

PCT/US07/77500 International Search Report and Written Opinion Dated Apr. 7, 2008.

*Primary Examiner* — Marc Norman
(74) *Attorney, Agent, or Firm* — Hahn Loeser & Parks LLP

(57) ABSTRACT

A system and method to control environmental parameters of pre-defined zones within an environment using an electronic controller. An electronic controller monitors a loop temperature of a loop field of a geo-thermal heat pump as detected by a temperature sensor connected to the loop field. The electronic controller selects a staging combination of the geo-thermal heat pump and an auxiliary HVAC equipment based on at least the loop temperature. The electronic controller activates the selected staging combination, to modify at least a portion of the environmental parameters, using non-proprietary activating signals provided by the electronic controller.

36 Claims, 51 Drawing Sheets

(56) References Cited

U.S. PATENT DOCUMENTS

| | | | |
|---|---|---|---|
| 5,937,665 A * | 8/1999 | Kiessel et al. | 62/260 |
| 5,979,167 A | 11/1999 | Kochavi et al. | |
| 6,786,473 B1 | 9/2004 | Alles | |
| 6,865,449 B2 | 3/2005 | Dudley | |
| 6,997,390 B2 | 2/2006 | Alles | |
| 7,062,830 B2 | 6/2006 | Alles | |
| 7,228,696 B2 * | 6/2007 | Ambs et al. | 62/260 |
| 7,775,448 B2 * | 8/2010 | Votaw et al. | 236/1 B |
| 7,789,317 B2 * | 9/2010 | Votaw et al. | 236/1 B |
| 2004/0194484 A1 | 10/2004 | Zou et al. | |
| 2005/0064812 A1 | 3/2005 | Darling | |
| 2005/0116055 A1 | 6/2005 | Alles | |
| 2005/0156050 A1 | 7/2005 | Shah et al. | |
| 2005/0234597 A1 | 10/2005 | Harrod et al. | |
| 2007/0063059 A1 | 3/2007 | Votaw et al. | |

* cited by examiner

WIRING DIAGRAM

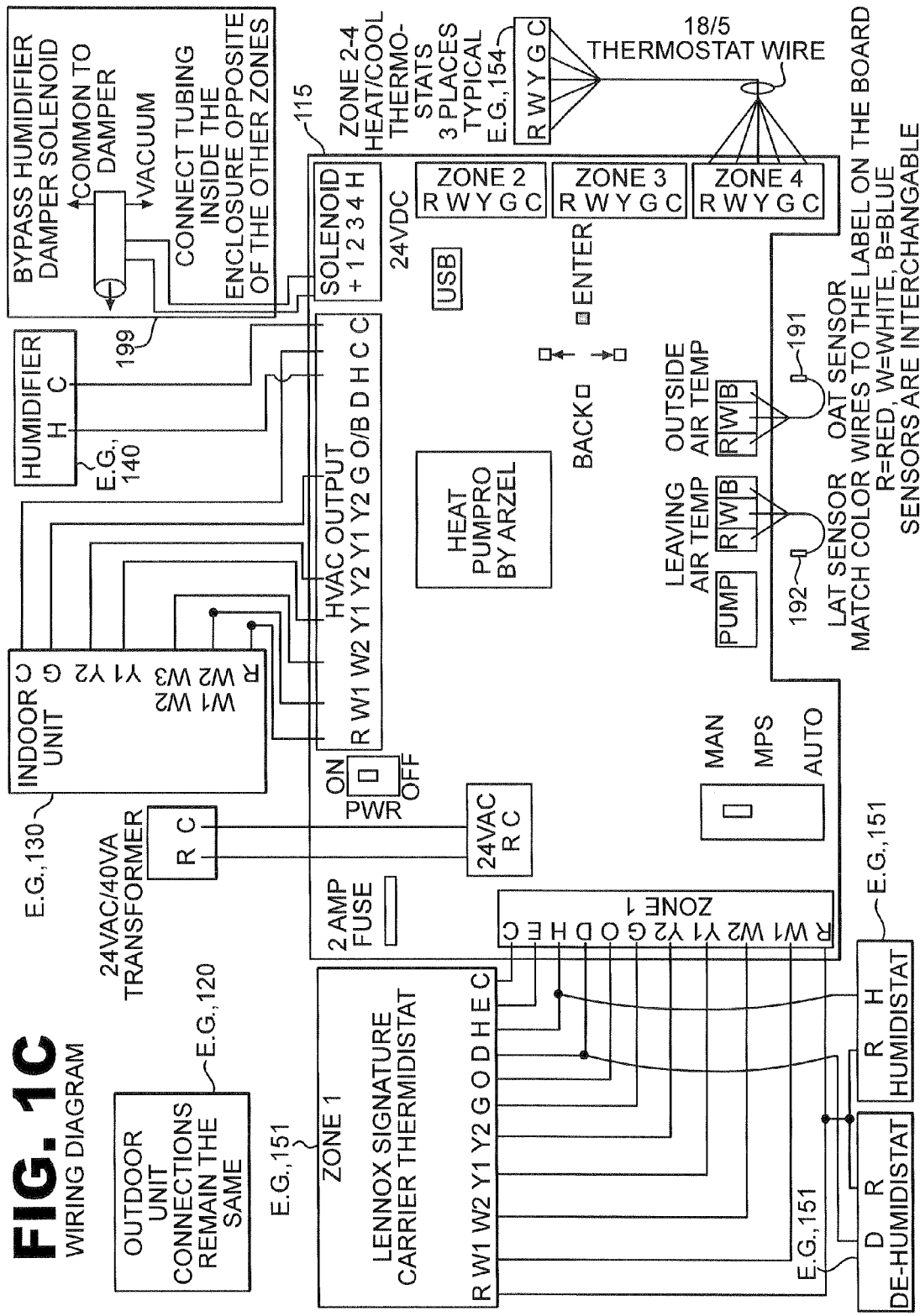
FIG. 1C WIRING DIAGRAM

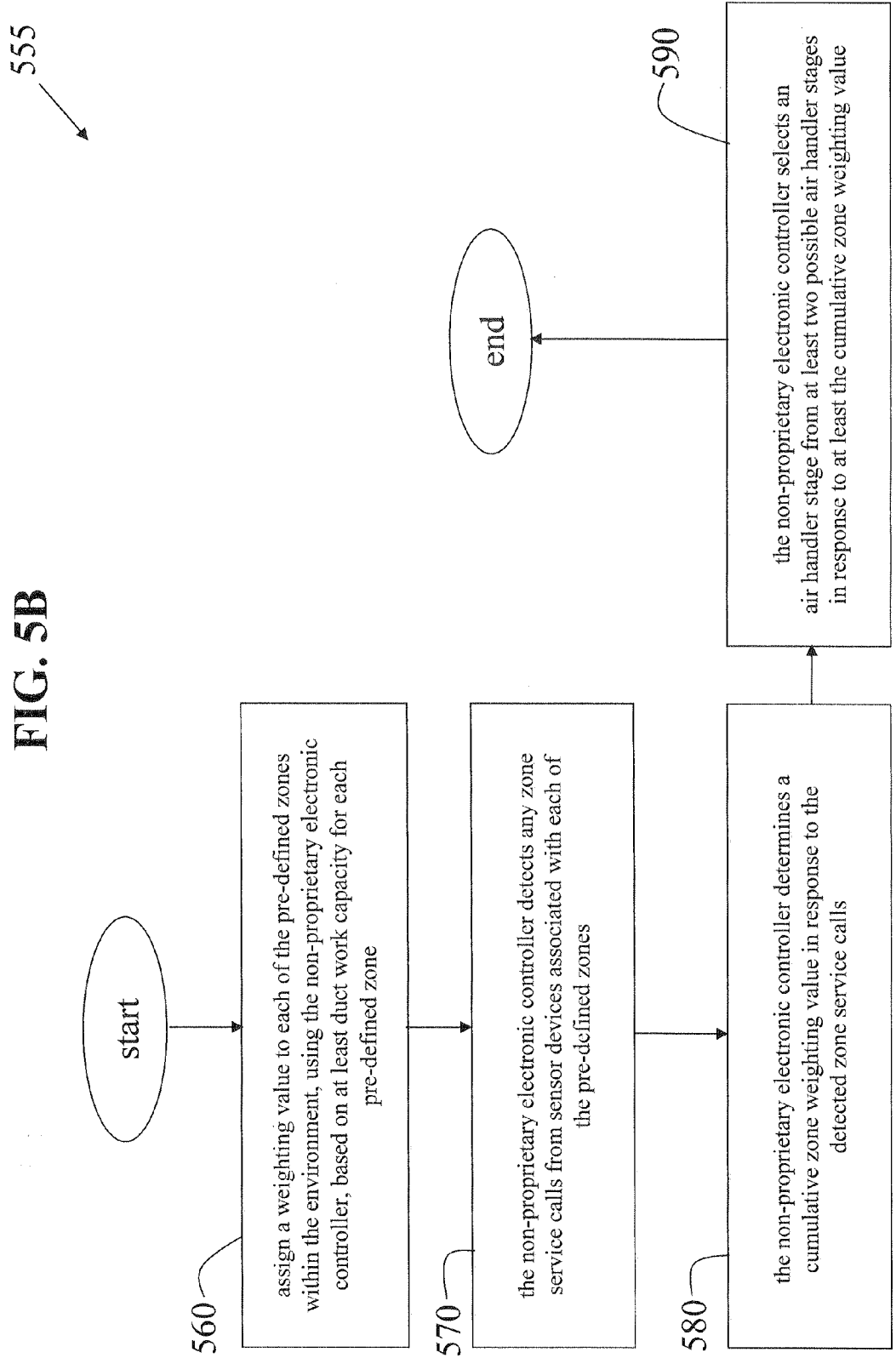

| ZONE1 STAT TYPE? | |
|---|---|
| HEAT PUMP | |
| HEAT/COOL | |

| ZONE1 RELATIVE WEIGHT | |
|---|---|
| 10% | 40% 70% |
| 20% | 50% 80% |
| 30% | 60% 90% |

| ZONE2 RELATIVE WEIGHT | |
|---|---|
| 10% | 40% 70% |
| 20% | 50% 80% |
| 30% | 60% 90% |

| ZONE3 RELATIVE WEIGHT | |
|---|---|
| 10% | 40% 70% |
| 20% | 50% 80% |
| 30% | 60% 90% |

| ZONE4 RELATIVE WEIGHT | |
|---|---|
| 10% | 40% 70% |
| 20% | 50% 80% |
| 30% | 60% 90% |

| STAGING THRESHOLD |
|---|
| 60% |

INCREMENT/DECREMENT BY 10% INTERVALS

| FARENHIEGHT OR CELSIUS |
|---|
| F |
| C |

---

| MIN HEAT TEMP |
|---|
| 90 DEGREES |

INCREMENT/DECREMENT BY 1 DEGREE INCREMENTS

| MAX COOLING TEMP |
|---|
| 50 DEGREES |

INCREMENT/DECREMENT BY 1 DEGREE INCREMENTS

| BALLANCE POINT |
|---|
| 25 DEGREES |

INCREMENT/DECREMENT BY 1 DEGREE INCREMENTS

| OUTDOOR RESET TEMP |
|---|
| 30 DEGREES |

INCREMENT/DECREMENT BY 1 DEGREE INCREMENTS

| LEAVING AIR TEMP HIGH LIMIT |
|---|
| 110 DEGREES |

INCREMENT/DECREMENT BY 1 DEGREE INCREMENTS

| LEAVING AIR TEMP LOW LIMIT |
|---|
| 42 DEGREES |

INCREMENT/DECREMENT BY 1 DEGREE INCREMENTS

| LEAVING AIR TEMP HIGH LIMIT - BACKUP |
|---|
| 140 DEGREES |

INCREMENT/DECREMENT BY 1 DEGREE INCREMENTS

BACKUP HEAT SOURCE
  ELECTRIC
  GAS

FURNACE CTRL FAN?
  YES
  NO

DEHUMIDIFICATION
  SIGNAL
    24VAC
     0VAC

END-OF-CYLE TIME
  90 SECONDS

INCREMENT/DECREMENT IN 10 SECOND INTERVALS

DEHUMIDIFCATION
CYCLE TIME
      10 MINUTE

INCREMENT/DECREMENT IN 5-MINUTE INTERVALS

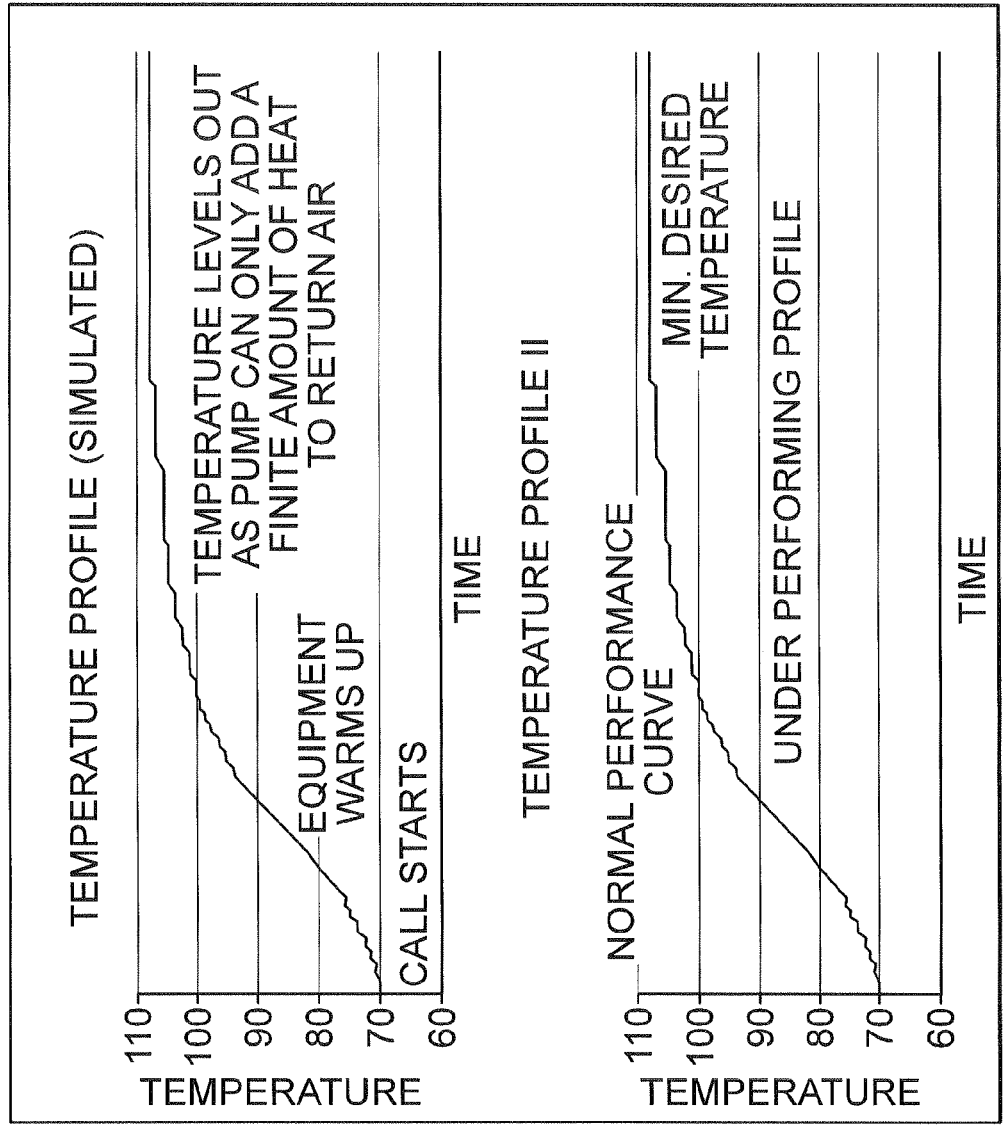

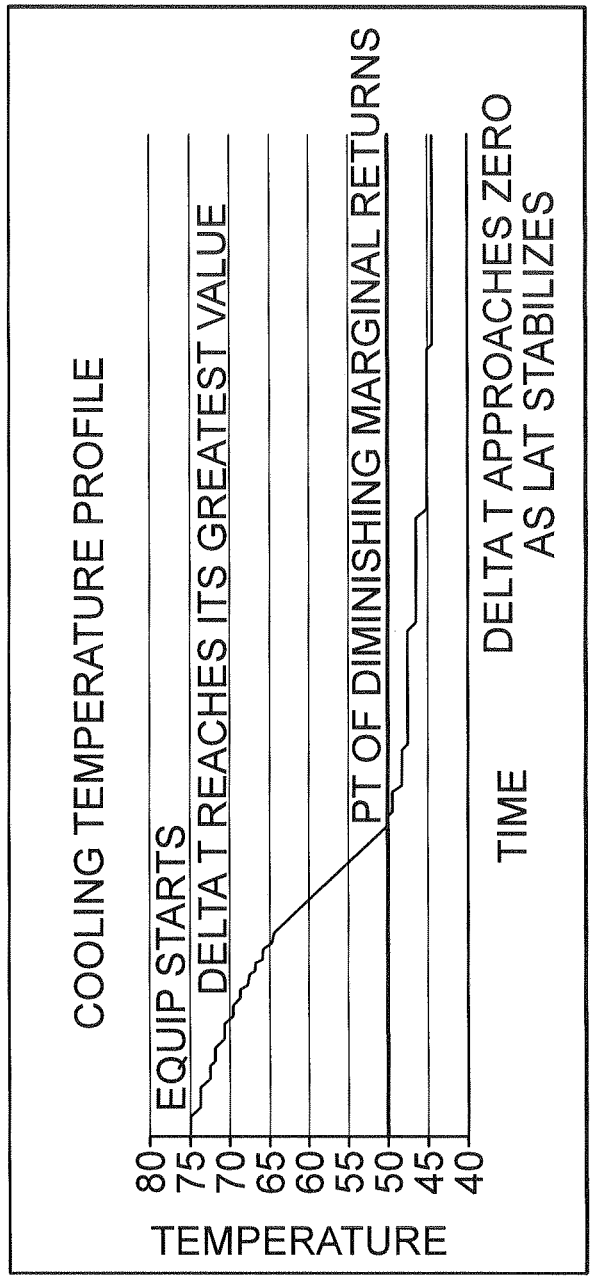

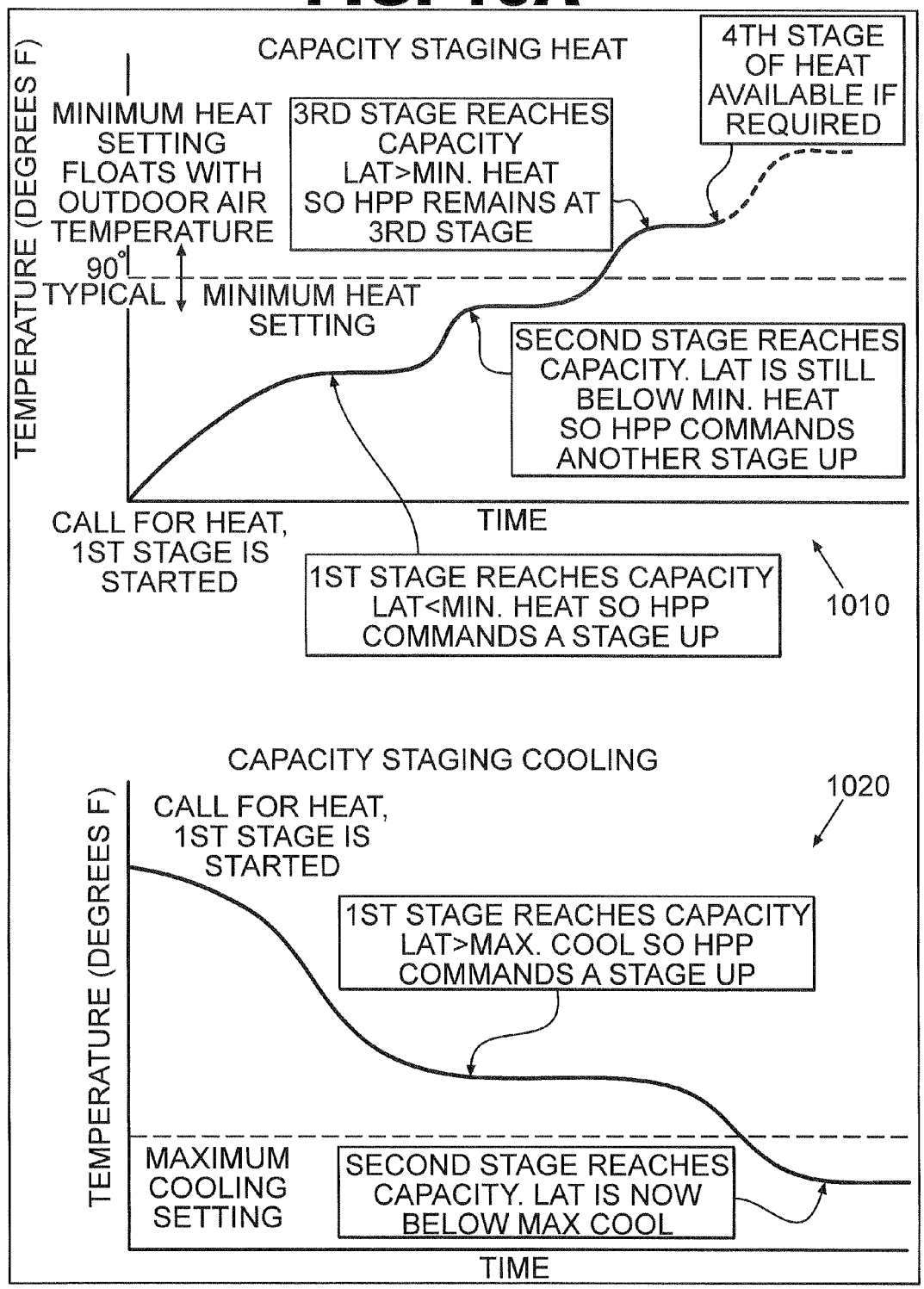

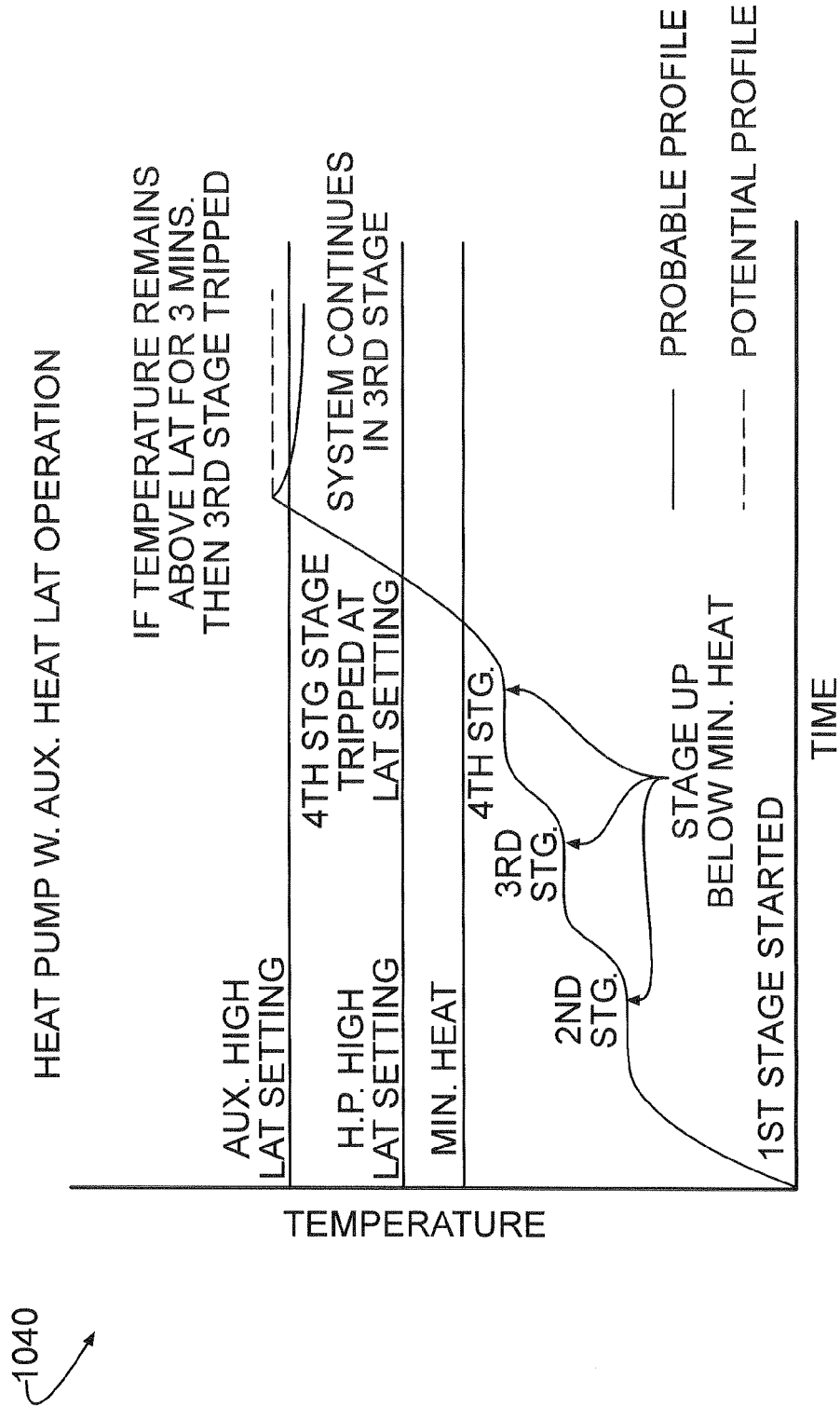

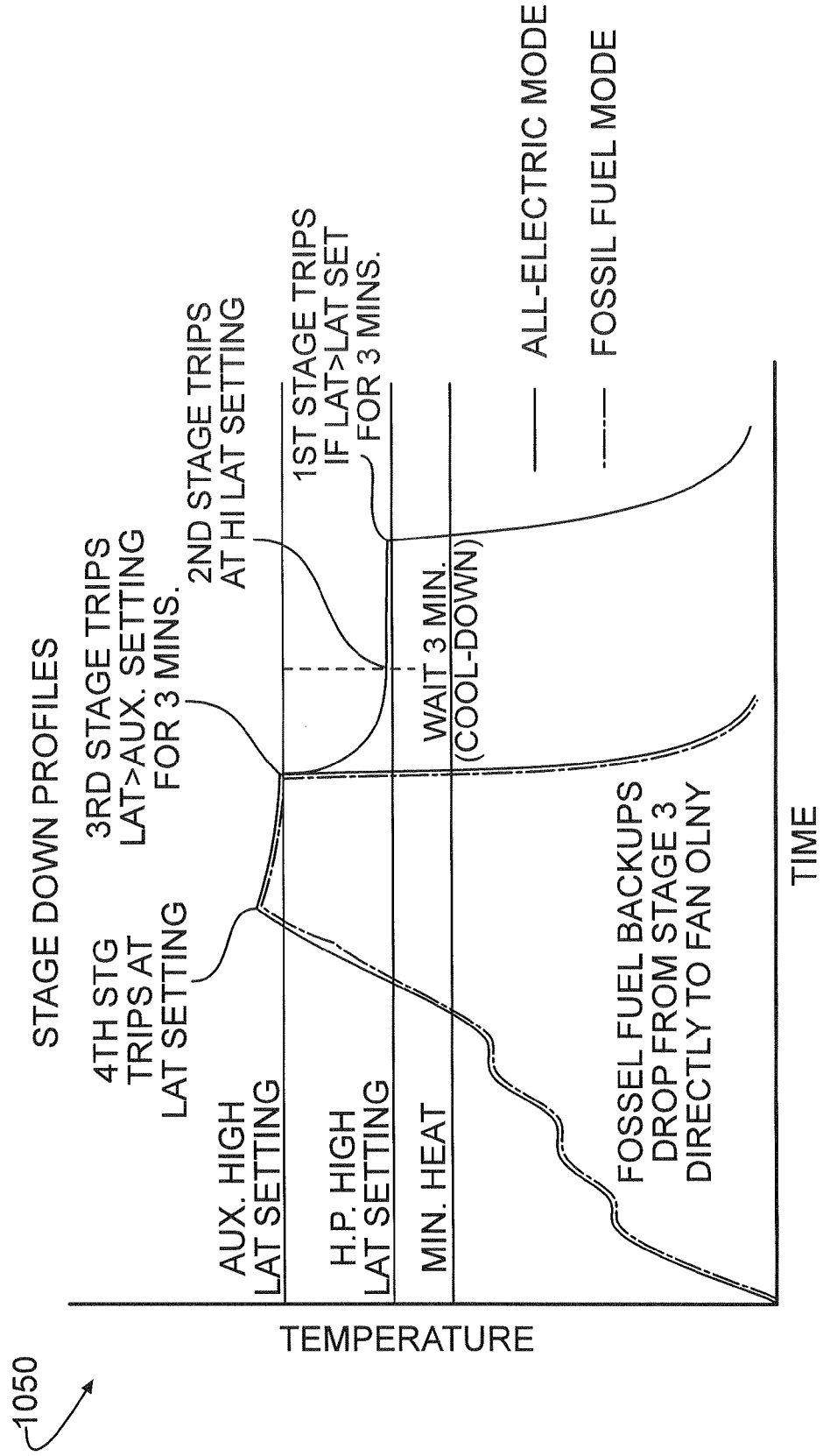

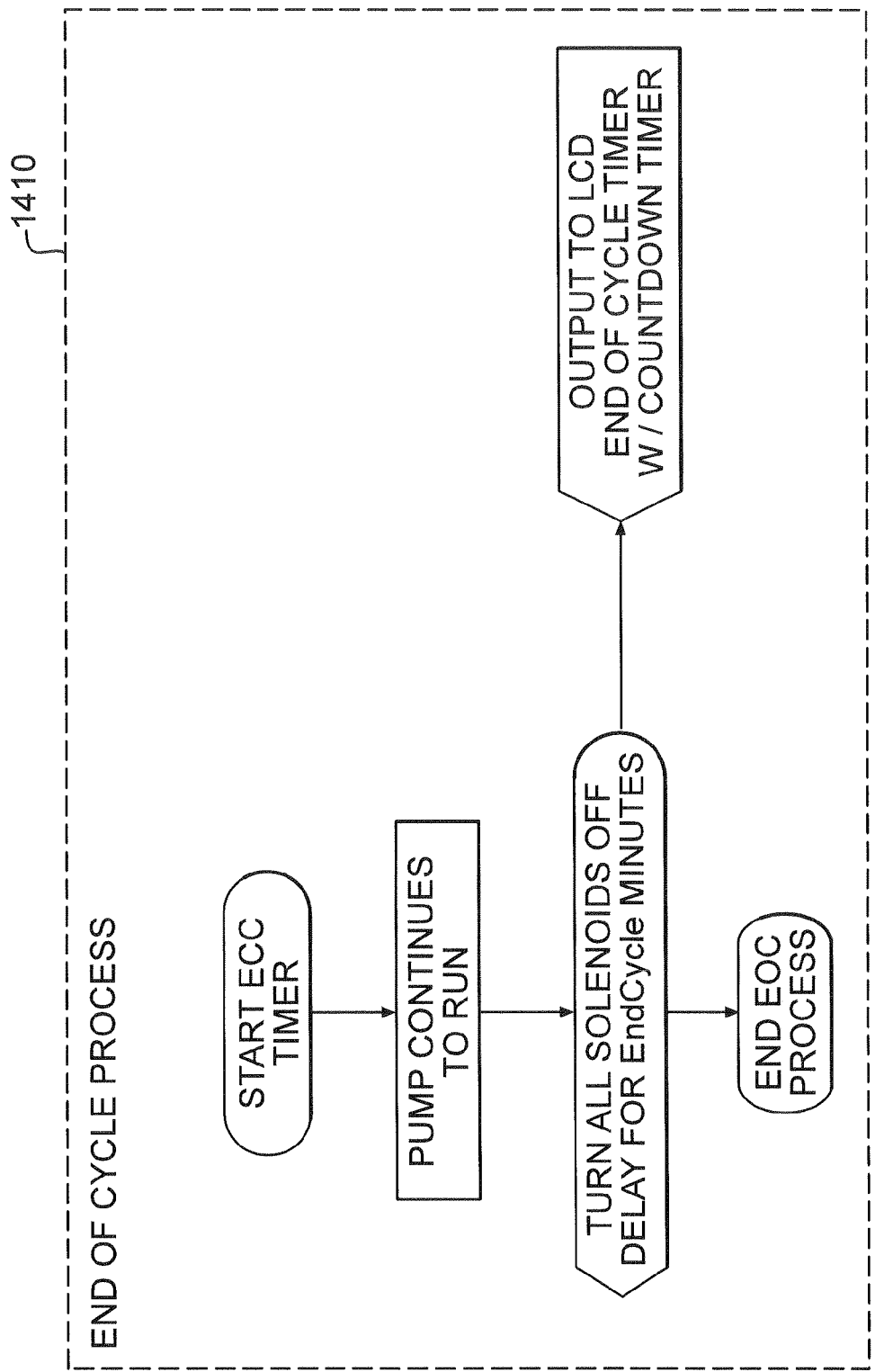

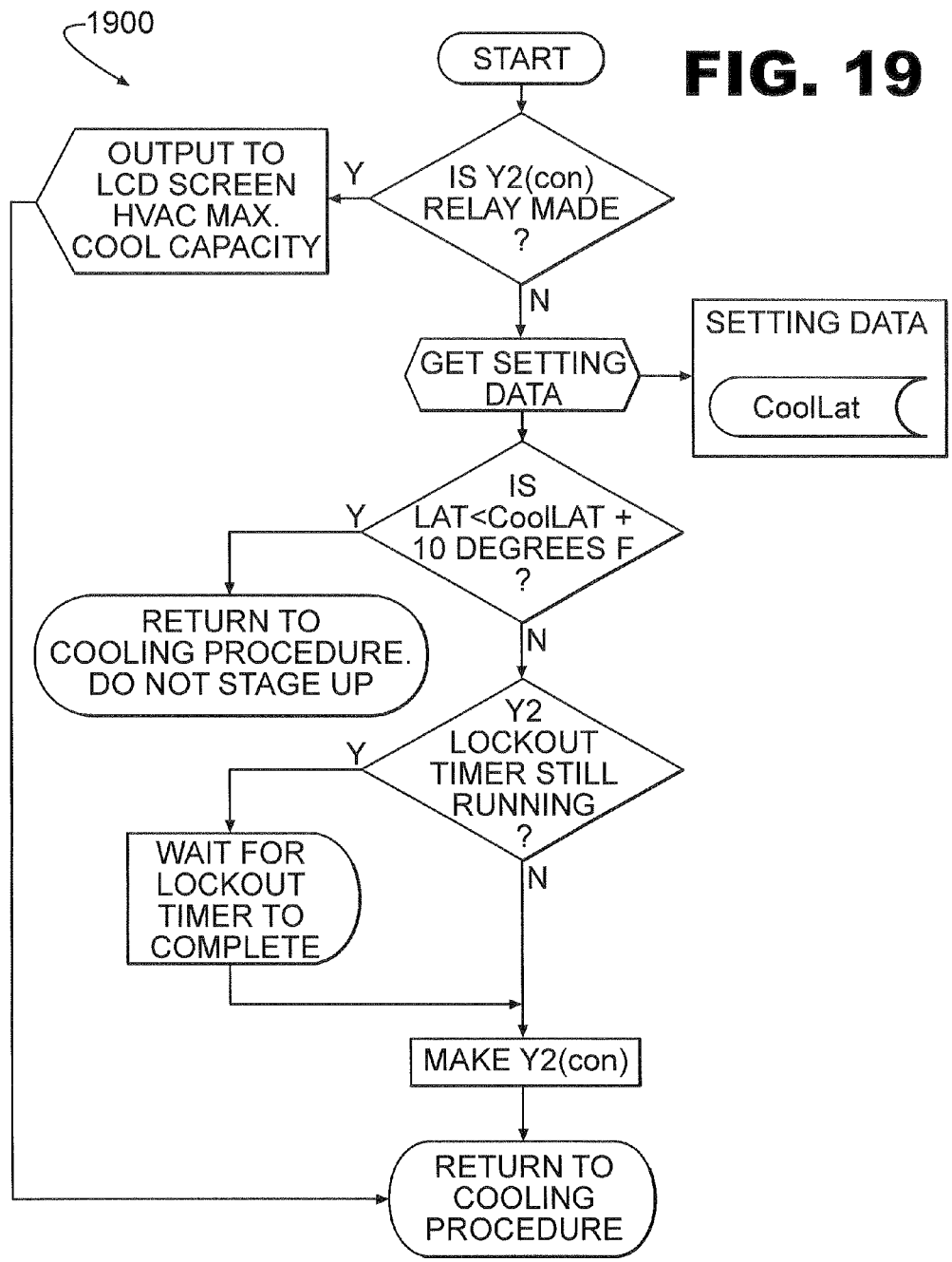

FIG. 23C

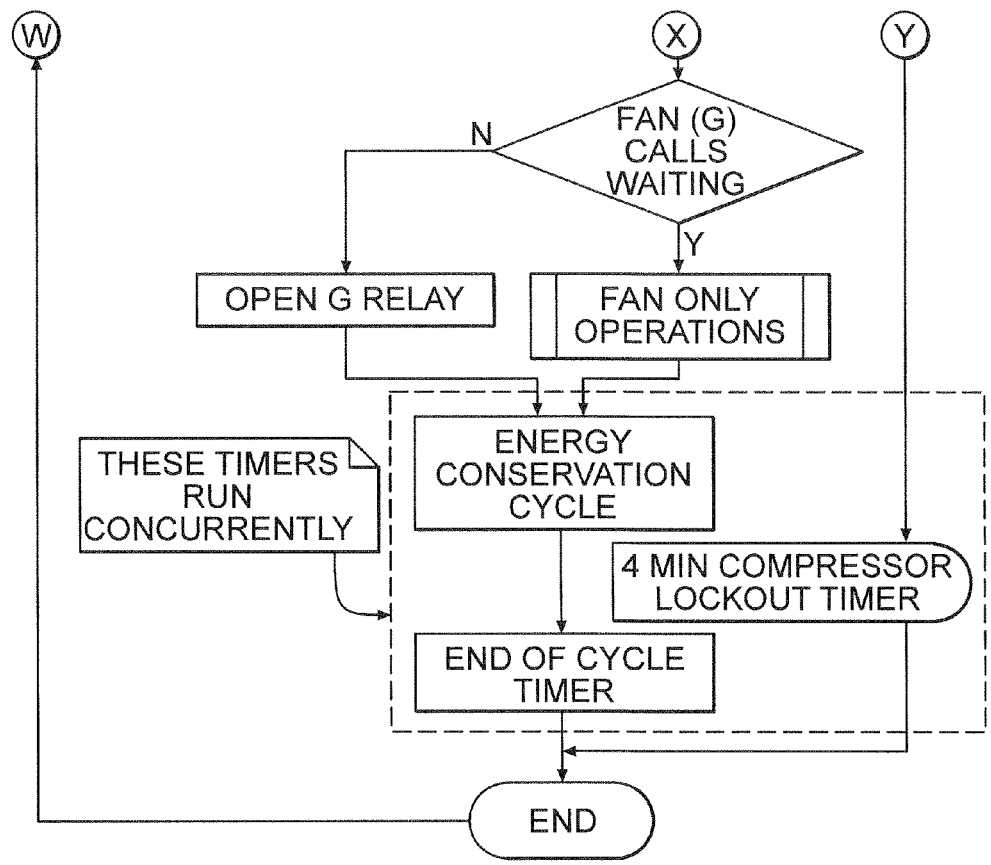

| VARIABLE | DESCRIPTION | SOURCE |
|---|---|---|
| BackSource | BACKUP HEAT SOURCE ELECTRIC HI STRIP ON FF FURNACE | SetWiz |
| MinHeat | MINIMUM HEATING STABILIZATION PT | SetWiz |
| ResetTemp | MODIFIES MIN HEAT FOR OAT | SetWiz |
| HeatLat | HIGH LIMIT FOR LEAVING AIR CONTROL | SetWiz |
| BalancePT | OAT WHERE HEAT PUMP LOCKED OUT AND FF FURNACE IS PRIMARY | SetWiz |
| ZoneW(X) | THE RELATIVE WEIGHT OF EACH ZONE (X=1 TO 4) | SetWiz |
| StgThreshold | THE THRESHOLD REQUIRED TO STAGE UP AIR HANDLER | SetWiz |

SYSTEM AND METHOD FOR HEAT PUMP ORIENTED ZONE CONTROL

CROSS-REFERENCE TO RELATED APPLICATIONS

This U.S. patent application claims priority to and is a continuation-in-part (CIP) patent application of pending U.S. patent application Ser. No. 11/469,971 filed on Sep. 5, 2006 which is incorporated herein by reference in its entirety and which claims priority to and is a continuation-in-part (CIP) patent application of pending U.S. patent application Ser. No. 11/226,165 filed Sep. 14, 2005 which is incorporated herein by reference in it entirety.

TECHNICAL FIELD

Certain embodiments of the present invention relate to zoned control of an environment. More particularly, certain embodiments of the present invention relate to a system and method to control environmental parameters of pre-defined zones within an environment using an electronic controller and weighted zones.

BACKGROUND

The cooling and heating of commercial buildings and residential homes is typically accomplished via forced air and forced hot or cooled water distribution systems. A furnace, heat pump, other fossil fuel furnace, and/or air conditioner are typically used to supply heated air or cooled air to areas of the building or home via ducts. Such distribution systems are often controlled by a single thermostat which is centrally located within the building or home. A person sets the thermostat to a particular temperature setting. When the temperature measured by the thermostat deviates a pre-defined amount from the set temperature, a furnace, heat pump, other fossil fuel furnace, or air conditioner is turned on to provide heated or cooled air to the various regions of the building or home via the duct work or water lines.

Even though the desired temperature may be achieved at the location of the thermostat, the resultant temperatures in the various other regions of the building or home may still deviate quite a bit from this desired temperature. Therefore, a single centrally located thermostat likely will not provide adequate temperature control for individual rooms and areas. In an attempt to address this problem, duct work and valves throughout the building or home are fitted with manually adjustable registers or dampers which help to control the flow of air to the various regions. The dampers and valves are typically each adjusted to a single position and left in that state. Such an adjustment may be fine for a particular time of year, outside temperature level, and humidity level, but is likely not optimal for most other times of the year and other temperature and humidity levels. Furthermore, such an adjustment may only be fine for a particular time of day due to the internal and external daily load variances that occur depending on, for example, the position of the sun, whether or not lights are on, and how many people are in a particular area. It is often time consuming and difficult to re-adjust the dampers and valves for optimal comfort level.

The industry has developed multi-zone control systems in an attempt to better control the environmental parameters in each room or region of a home or building, for example, by placing thermostats in each larger room or groups of rooms. However, such systems to date have not been flexible enough to be entirely successful. For example, if a thermostat in a first room calls for heat, a furnace may be turned on to provide the heat. However, some of this heat may still be getting distributed to other rooms which do not presently require heat. As a result, these other rooms may become uncomfortably warm. Having multiple furnaces, air conditioners, and/or heat pumps which are connected to different thermostats and service only certain rooms may help this problem, however, this tends to be an expensive solution due to the extra equipment required and resulting service charges.

Heat pumps are relatively inexpensive to operate and can both heat air and cool air. Heat pumps use a refrigeration system to cool air and use the same refrigeration system run in reverse to heat air. Environmental control of several zones via heat pumps typically calls for a separate heat pump and thermostat for each zone or installation of a multi-zone system as previously described.

In view of the foregoing discussion, it is apparent that there is a need for a more efficient way of controlling the distribution of air and environmental parameters for several zones in a building or home.

Further limitations and disadvantages of conventional, traditional, and proposed approaches will become apparent to one of skill in the art, through comparison of such systems and methods with the present invention as set forth in the remainder of the present application with reference to the drawings.

SUMMARY

An embodiment of the present invention comprises a method to control environmental parameters of pre-defined zones within a first environment using an electronic controller. The environmental parameters may include, for example, temperature, humidity, and air flow. The method includes the electronic controller monitoring a loop temperature of a loop field of a geo-thermal heat pump detected by a temperature sensor operatively connected to the loop field. The method further includes the electronic controller selecting a staging combination of the geo-thermal heat pump and an auxiliary HVAC equipment based on at least the loop temperature. The auxiliary HVAC equipment may include a gas furnace, a propane heater, an oil furnace, a resistive heating strip, an air conditioning unit, a humidifier, and a de-humidifier, for example. The method also includes the electronic controller activating the selected staging combination of the geo-thermal heat pump and the auxiliary HVAC equipment, to modify at least a portion of the environmental parameters, using non-proprietary activating signals provided by the electronic controller. Each of the pre-defined zones may have an associated duct work capacity, where the electronic controller stores a weighting value for each of the pre-defined zones representative of the associated duct work capacity of each of the pre-defined zones. The method may further include the electronic controller detecting any zone service calls from sensor devices associated with each of the pre-defined zones. The zone service calls may include, for example, a heating call, a cooling call, a humidification call, a de-humidification call, and a fan-only call. The sensor devices associated with each of the pre-defined zones may include, for example, at least one of a thermostat, a humidistat, and a de-humidistat. The method may also include the electronic controller transforming the detected zone service calls and the weighting value of each of the pre-defined zones associated with the detected zone service calls into a cumulative zone weighting value representative of a cumulative duct work capacity of the pre-defined zones associated with the detected zone service calls. The method may further include the electronic controller selecting an air handler stage of an air handler from at least two air handler stages in response to at least the cumulative zone weighting value, and activating the selected air handler stage. The method may also include the electronic controller activating at least one duct work air damper device of the pre-defined zones associated with the detected zone service calls. The method may further include the electronic controller selecting the staging combination of the geo-thermal heat pump and the auxiliary HVAC equipment based further on a change ($\Delta T$) in a leaving air temperature (LAT) of an air handler. The method may also include the electronic controller selecting the staging combination of the geo-thermal heat pump and the auxiliary HVAC equipment based further on an outside air temperature (OAT) of a second environment which is external to the first environment. The method may further include the electronic controller selecting the staging combination of the geo-thermal heat pump and the auxiliary HVAC equipment based further on the cumulative zone weighting value. The method may further include the electronic controller selecting the staging combination of the geo-thermal heat pump and the auxiliary HVAC equipment based further on a time-out signal derived from a clock of the electronic controller.

Another embodiment of the present invention comprises a forced air system to control environmental parameters of pre-defined zones within a first environment. The environmental parameters may include, for example, temperature, humidity, and air flow. The system includes an air handler providing at least two air handler stages, a geo-thermal heat-pump having a loop field and being operatively connected to the air handler, an auxiliary HVAC equipment being operatively connected to the air handler, and an electronic controller operationally connected to the air handler, the geo-thermal heat pump, and the auxiliary HVAC equipment. The auxiliary HVAC equipment may include a gas furnace, a propane heater, an oil furnace, a resistive heating strip, an air conditioning unit, a humidifier, and a de-humidifier, for example. The electronic controller is configured for monitoring a loop temperature of the loop field of the geo-thermal heat pump detected by a temperature sensor operatively connected to the loop field. The electronic controller is further configured for selecting a staging combination of the geo-thermal heat pump and the auxiliary HVAC equipment based on at least the loop temperature. The electronic controller is also configured for activating the selected staging combination of the geo-thermal heat pump and the auxiliary HVAC equipment, to modify at least a portion of the environment parameters, using non-proprietary activating signals provided by the electronic controller. Each of the pre-defined zones may have an associated duct work capacity where a weighting value is assigned for each of the pre-defined zones representative of the associated duct work capacity of each of the pre-defined zones. The electronic controller may be further configured for detecting any zone service calls from sensor devices associated with each of the pre-defined zones. The zone service calls may include, for example, a heating call, a cooling call, a humidification call, a de-humidification call, and a fan-only call. The sensor devices associated with each of the pre-defined zones may include, for example, at least one of a thermostat, a humidistat, and a de-humidistat. The electronic controller may also be configured for transforming the detected zone service calls and the weighting value of each of the pre-defined zones associated with the detected zone service calls into a cumulative zone weighting value representative of a cumulative duct work capacity of the pre-defined zones associated with the detected zone service calls. The electronic controller may also be configured for selecting an air handler stage from the at least two air handler stages in response to at least the cumulative zone weighting value, and activating the selected air handler stage. The system may further include at least one duct work air damper device associated with each of the pre-defined zones. The electronic controller may be further configured for activating the at least one duct work air damper device of the pre-defined zones associated with the detected zone service calls. The electronic controller may also be configured for selecting the staging combination of the geo-thermal heat pump and the auxiliary HVAC equipment based further on a change ($\Delta T$) in a leaving air temperature (LAT) of the air handler. The electronic controller may also be configured for selecting the staging combination of the geo-thermal heat pump and the auxiliary HVAC equipment based further on an outside air temperature (OAT) of a second environment which is external to the first environment. The electronic controller may also be configured for selecting the staging combination of the geo-thermal heat pump and the auxiliary HVAC equipment based further on the cumulative zone weighting value. The electronic controller may also be configured for selecting the staging combination of the geo-thermal heat pump and the auxiliary HVAC equipment based further on a time-out signal derived from a clock of the electronic controller.

A further embodiment of the present invention comprises an electronic controller for use in a forced air system to control environmental parameters of pre-defined zones within a first environment. The environmental parameters may include, for example, temperature, humidity, and air flow. The electronic controller includes a programmable microprocessor, sensor inputs, and at least one programmable dry contact relay providing interaction with HVAC systems. The electronic controller is configured for monitoring a loop temperature of a loop field of a geo-thermal heat pump detected by a temperature sensor operatively connected to the loop field. The electronic controller is further configured for selecting a staging combination of the geo-thermal heat pump and an auxiliary HVAC equipment based on at least the loop temperature. The auxiliary HVAC equipment may include a gas furnace, a propane heater, an oil furnace, a resistive heating strip, an air conditioning unit, a humidifier, and a de-humidifier, for example. The electronic controller is also configured for activating the selected staging combination of the geo-thermal heat pump and the auxiliary HVAC equipment, to modify at least a portion of the environmental parameters, using non-proprietary activating signals provided by the electronic controller. Each of the pre-defined zones has an associated duct work capacity. A weighting value is assigned and stored on the electronic controller for each of the pre-defined zones representative of the associated duct work capacity of each of the pre-defined zones. The electronic controller is further configured for detecting any zone service calls from sensor devices associated with each of the pre-defined zones. The zone service calls may include, for example, a heating call, a cooling call, a humidification call, a de-humidification call, and a fan-only call. The sensor devices associated with each of the pre-defined zones may include, for example, at least one of a thermostat, a humidistat, and a de-humidistat. The electronic controller is also configured for transforming the detected zone service calls and the weighting value of each of the pre-defined zones associated with the detected zone service calls into a cumulative zone weighting value representative of a cumulative duct work capacity of the pre-defined zones associated with the detected zone service calls. The electronic controller is further configured for selecting an air handler stage from at least two air handler stages of an air handler in response to at least the cumulative zone weighting value, and activating the selected air handler stage. The electronic controller may also be configured for activating at least one duct work air damper device of the pre-defined zones associated with the detected zone service calls. The electronic controller may further include a real-time clock providing for the logging of data and time duration monitoring. The electronic controller may also include at least one programmable dry contact relay providing interaction with a non-HVAC system. The electronic controller may further include a USB port interface providing flash drive reading/writing capability. The electronic controller may also be configured for selecting the staging combination of the geo-thermal heat pump and the auxiliary HVAC equipment based further on a change ($\Delta T$) in a leaving air temperature (LAT) of the air handler. The electronic controller may also be configured for selecting the staging combination of the geo-thermal heat pump and the auxiliary HVAC equipment based further on an outside air temperature (OAT) of a second environment which is external to the first environment. The electronic controller may also be configured for selecting the staging combination of the geo-thermal heat pump and the auxiliary HVAC equipment based further on the cumulative zone weighting value. The electronic controller may also be configured for selecting the staging combination of the geo-thermal heat pump and the auxiliary HVAC equipment based further on a time-out signal derived from a clock of the electronic controller.

In accordance with an embodiment of the present invention, an electronic controller has been designed to optimize the operation of heating and air conditioning equipment. The electronic controller refines control of the equipment by bringing on only specific subsystem stages of the heating and cooling equipment, depending on the demand from the environmental sensors, the loop temperature, the outside air temperature, the temperature of the air leaving the equipment, and the electric utility efficiency programs. The electronic controller allows the available airflow to be concentrated to the areas where there is a current demand for heating, cooling, or ventilation by controlling a set of air-driven zone dampers.

Embodiments of the present invention provide the ability to choose between more distinct operating modes for the heating and cooling equipment than has typically been contemplated in the past. Embodiments of the present invention provide algorithms to incorporate humidification and dehumidification equipment and techniques that have not typically been a part of a zoning system.

In accordance with an embodiment of the present invention, a plain English "setup wizard" is provided as part of the controller which allows HVAC installers to configure the system quickly and easily for any system. That is, the controller is a non-proprietary controller that is designed to be configured for and useable with any standard forced air system. In accordance with an embodiment of the present invention, simple and inexpensive standard heat/cool thermostats are used on predefined zones 2 through 4 to make installation easier (e.g., single stage thermostats). Zones 2-4, using simple thermostats, depend more on the controller for zone control. That is, the simple single stage thermostats can only tell the controller if its zone needs heating or cooling. The simple thermostats cannot tell the controller how much heating or cooling is needed or that a zone still needs more heating or cooling. Embodiments of the present invention allow installers to use any thermostat, either heat pump or heat/cool on a predefined zone 1 (e.g., a smarter more complex multi-stage thermostat with emergency or auxiliary heat capability, or a simple thermostat as used on zones 2-4). As a result, the installer is able to take advantage of certain advanced features built into today's modern thermostats. Installers may also use wireless, auto changeover, single- or two-stage thermostats, or any thermostat that provides installer with the level of control which they desire.

These and other advantages and novel features of the present invention, as well as details of illustrated embodiments thereof, will be more fully understood from the following description and drawings.

BRIEF DESCRIPTION OF THE DRAWINGS

FIG. 1C illustrates a second example embodiment of a schematic wiring diagram of the system of FIG. 1A, in accordance with various aspects of the present invention;

FIG. 5B illustrates a flowchart of a second embodiment of a method to control environmental parameters of pre-defined zones within a first environment using the system of FIG. 1A which includes the electronic controller of FIGS. 2A and 2B, in accordance with various aspects of the present invention;

FIGS. 8a-8b show example embodiments of setting options that may be displayed to an operator of the electronic controller via a display device, in accordance with various aspects of the present invention;

FIG. 9A illustrates graphs of heating temperature profiles, in accordance with an embodiment of the present invention;

FIG. 9B illustrates a graph of a cooling temperature profile, in accordance with an embodiment of the present invention;

FIG. 10A illustrates two example graphs of temperature vs. time for heating capacity staging and cooling capacity staging, in accordance with an embodiment of the present invention;

FIG. 10C is a graph that illustrates staging up for heating with a heat pump and auxiliary heat available, allowing four stages of heating, in accordance with an embodiment of the present invention;

FIG. 10D is a graph that illustrates two staging down profiles, one for an all-electric mode and one for a fossil fuel mode, in accordance with an embodiment of the present invention;

FIGS. 14a-14c illustrate flowcharts of an example embodiment of methods for performing end of cycle purges, in accordance with various aspects of the present invention;

FIG. 19 illustrates a flowchart of an example embodiment of a method for performing a cooling stage-up procedure, in accordance with various aspects of the present invention;

FIGS. 23a-23c illustrate a flowchart of an example embodiment of a method for performing a heating procedure, in accordance with various aspects of the present invention;

DETAILED DESCRIPTION

Figure 1A:
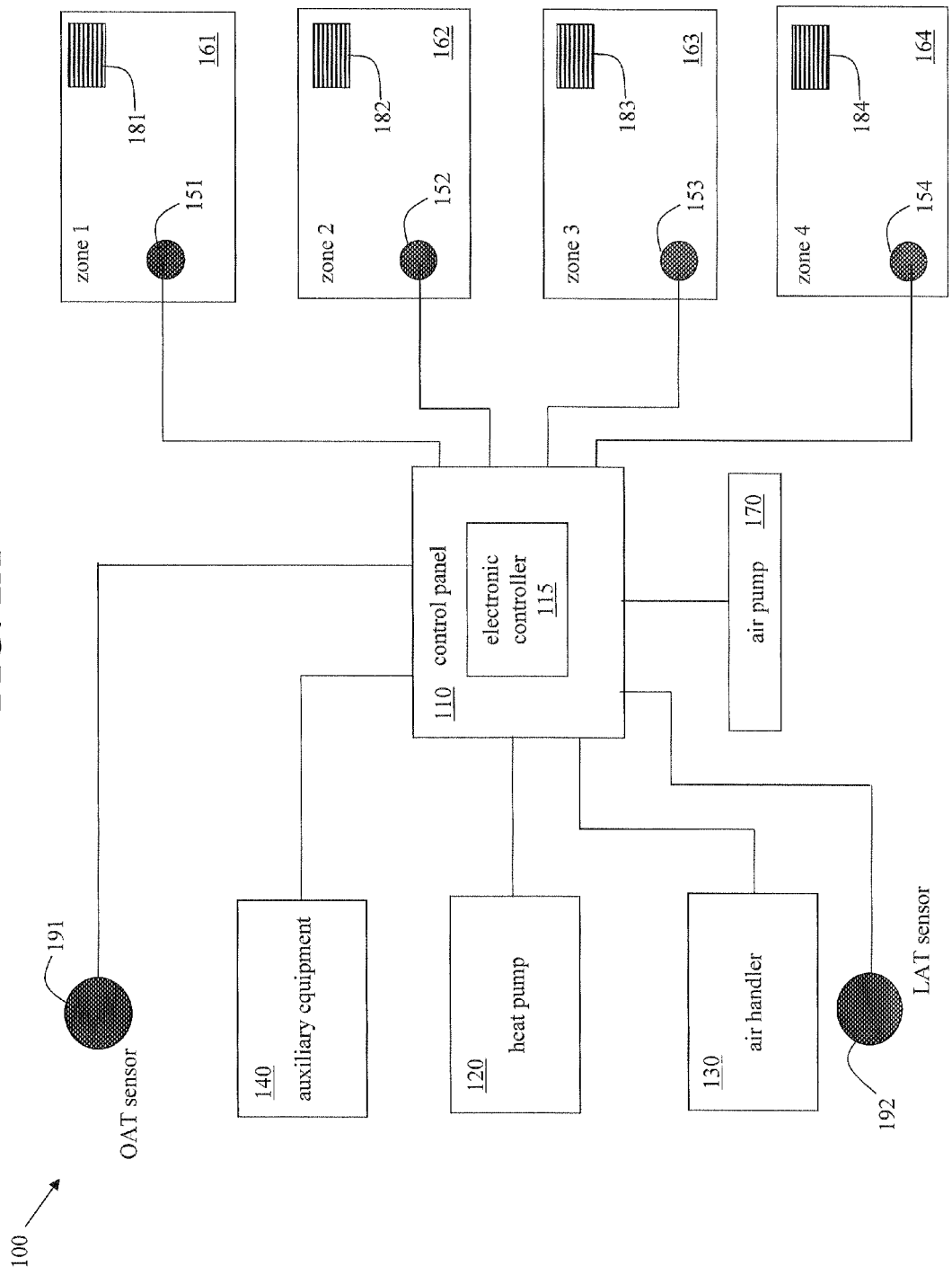
FIG. 1A illustrates a schematic block diagram of an example embodiment of a system to control environmental parameters of pre-defined zones within a first environment, in accordance with various aspects of the present invention.

As used herein, the term "non-proprietary" means useable with any standard commercial forced air system (e.g., any standard commercial heat pump system). FIG. 1A illustrates a schematic block diagram of an example embodiment of a system 100 to control environmental parameters of pre-defined zones within a first environment, in accordance with various aspects of the present invention. The system 100 includes a control panel 110, at the heart of the system 100, which includes an electronic controller 115. The system 100 further includes a heat pump 120 and an air handler 130 both operationally connected to the control panel 110 such that the operation of the heat pump 120 and the air handler 130 may be controlled by the electronic controller 115 of the control panel 110. The system 100 also includes auxiliary equipment 140 operationally connected to the control panel 110 such that the operation of the auxiliary equipment 140 may be controlled by the electronic controller 115 of the control panel 110.

The system 100 further comprises sensor devices 151-154 each operationally connected to the electronic controller 115 with each one of the sensor devices occupying a zone (161-164) of an environment to be environmentally controlled. The sensor devices are used to call for service. The system 100 also includes at least one air pump device 170 operationally connected to the control panel 110 such that the distribution of air may be controlled by the electronic controller 115 of the control panel 110. The system 100 further includes at least one air damper 181-184 associated with each of the zones 161-164 and being operationally connected to the air pump device 170. In accordance with an alternative embodiment of the present invention, the dampers 181-184 may be electro-mechanical dampers or any other type of damper. The system also includes an outside air temperature (OAT) sensor 191 and a leaving air temperature (LAT) sensor 192 each operationally connected to the electronic controller 115 of the control panel 110. The OAT sensor measures the temperature of the outside air in a second external environment which is external to the first indoor environment. Each zone may comprise a separate room or connected areas in a house or other building, for example. Zones may also be defined by a time of day. For example, a bedroom zone may only be dynamically controlled at night when the bedroom is in use, and left closed off during the day when the bedroom is not in use. Similarly, an office building or restaurant not used at night may be closed off at certain hours of the night and dynamically controlled during the day.

In accordance with an embodiment of the present invention, the control panel 110 includes not only the electronic controller 115 but other components, as well, such as solenoids, relays, and a power supply for providing power and/or control air to the various system elements (i.e., the heat pump 120, the air handler 130, the air dampers 181-184, etc.) through activation by the electronic controller 115. For example, to turn on the heat pump 120, the electronic controller 115 activates relays in the control panel 110 to switch electrical power to the heat pump 120. As another example, to provide air from the air pump device 170 to one of the air dampers 181-186, the electronic controller 115 activates (via an activation signal) a solenoid on the control panel 110 to switch air to an air damper (e.g., 181). In general, the electronic controller 115 is a non-proprietary controller and independently controls activation of the heat pump 120, air handler 130, auxiliary equipment 140, and the air dampers 181-184 when properly configured to a particular forced air system having such components.

The electronic controller 115 also receives input signals from the various sensor devices 151-154, 191, and 192. The sensor devices 151-154 may include, for example, thermostats and/or humidistats for monitoring temperature and/or humidity of the corresponding zones 161-164. The electronic controller 115 uses these input signals to determine when and how to activate the various equipment (120, 130, 140, 170).

The auxiliary equipment 140 may include an auxiliary heating source such as a fossil fuel system. Such an auxiliary heating source may include a gas, propane, or oil furnace, or a resistive heat strip, for example. Other auxiliary equipment such as, for example, auxiliary cooling equipment (e.g., an air conditioner) and a humidifier are possible as well, in accordance with various embodiments of the present invention.

In general, the heat pump 120, air handler 130, and auxiliary equipment 140 may include one or more stages of operation. Since, the controller 115 is non-proprietary, the controller 115 may be configured to work with any standard forced air system having any standard number of stages. For example, the heat pump 120 may include two compressor stages of operation where either only the first compressor stage is activated, or both the first and second compressor stages are activated (e.g., when more cooling is needed). The air handler 130 may include two stages or speeds of operation such as, for example, a low fan speed stage and a high fan speed stage. The auxiliary equipment 140 may include, for example, two heat strip stages of operation where either only the first heat strip stage is activated, or both the first and second heat strip stages are activated (e.g., when more heat is needed). In accordance with an embodiment of the present invention, the activation of the various stages of the equipment may be controlled independently by the electronic controller 115 based on the determined need for heating, cooling, humidification, dehumidification, and/or air capacity (air volume).

Figure 1B:
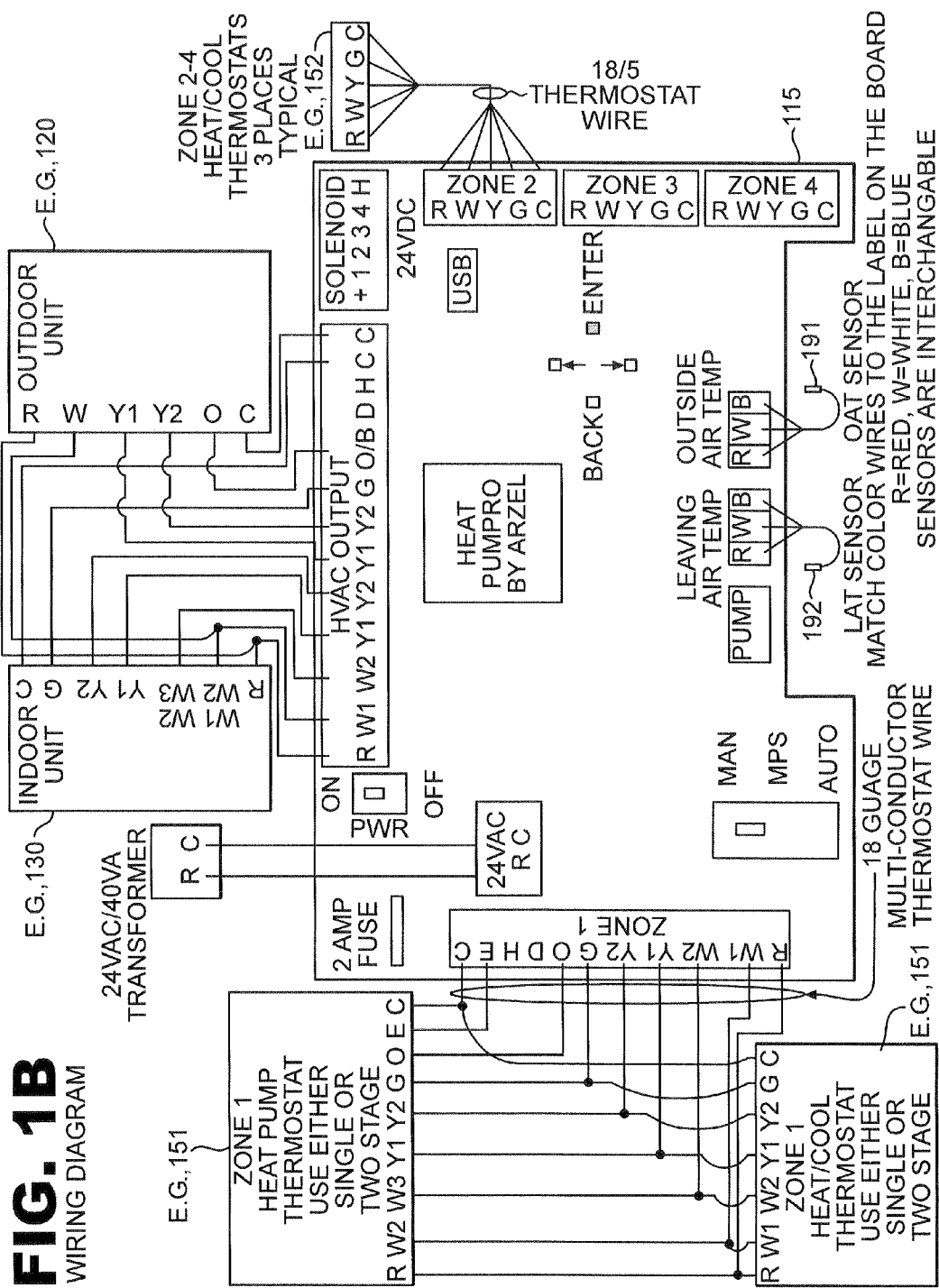
FIG. 1B illustrates a first example embodiment of a schematic wiring diagram of the system of FIG. 1A, in accordance with various aspects of the present invention.

FIG. 1B illustrates a first example embodiment of a schematic wiring diagram of the system 100 of FIG. 1A, in accordance with various aspects of the present invention. For example, the connections are shown for how to wire a sensor 151 for zone 1, which may be a complex heat pump thermostat or a heating/cooling thermostat (single stage or two-stage), to the controller 115. Also, the connections are shown for how to wire the OAT sensor 191 and the LAT sensor 192 to the controller 115. Further, the connections are shown for how to wire a sensor 152 for zone 2, which may be a simple thermostat, to the controller 115. Also, the connections are shown for how to wire a combination of a heat pump 120 and an air handler 130, which may break down into an outdoor unit and an indoor unit, to the controller 115.

FIG. 1C illustrates a second example embodiment of a schematic wiring diagram of the system 100 of FIG. 1A, in accordance with various aspects of the present invention. For example, the connections are shown for how to wire a sensor 151 for zone 1, which may be a complex heat pump thermostat or a humidistat or a de-humidistat, to the controller 115. Also, the connections are shown for how to wire the OAT sensor 191 and the LAT sensor 192 to the controller 115. Further, the connections are shown for how to wire a sensor 154 for zone 4, which may be a simple thermostat, to the controller 115. Also, the connections are shown for how to wire a combination of a heat pump 120 and an air handler 130, which may break down into an outdoor unit and an indoor unit, to the controller 115. Further, the connections are shown for how to wire a humidifier 140 to the controller 115. A solenoid 199 may also be wired and is dedicated to automatically operating a damper for the humidifier, as will be explained later herein.

Figure 2A:
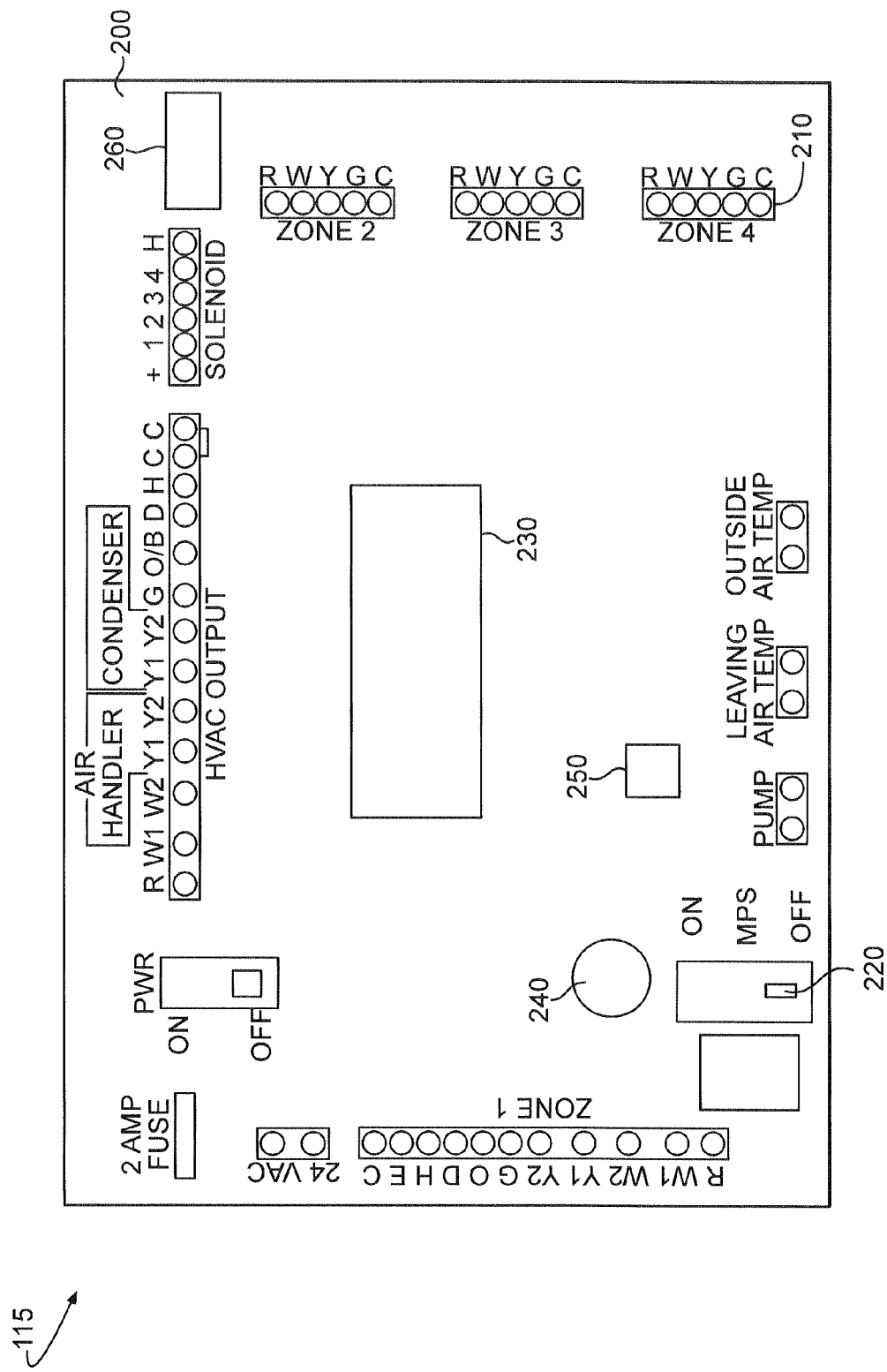
FIG. 2A is a first illustration of an example embodiment of an electronic controller used in the system of FIG. 1A, in accordance with various aspects of the present invention.

FIG. 2A is a first illustration of an example embodiment of an electronic controller 115 used in the system 100 of FIG. 1A, in accordance with various aspects of the present invention. The electronic controller 115 comprises a circuit board 200 with various components and devices mounted to the circuit board 200 including terminals (e.g., 210), switches (e.g., 220), a microprocessor, an LCD display device 230, resistors, capacitors (e.g., 240), integrated circuit chips (e.g., 250), as well as other components.

In accordance with an embodiment of the present invention, the display device 230 may be used by an operator to aid the operator in manually selecting setting options (a first, a second, a third set of options, etc.) which are pre-programmed into the electronic controller 115. Such manual selecting includes the steps of powering up the electronic controller 115, displaying a first set of options on the display device 230, selecting at least one of the options from the first set of options using at least one switching device on the electronic controller 115, displaying a second set of options on the display device 230, and selecting at least one of the options from the second set of options using at least one switching device on the electronic controller 115. The process of displaying a next set of options and selecting from the next set of options may continue until all available selections are made. A list of selections and associated setting options are presented later herein. Also, the LCD display device 230 functions as an input/output indicator by displaying each thermostat call and the service currently being provided, in accordance with an embodiment of the present invention.

The electronic controller 115 further includes a USB (universal serial bus) port 260. The USB port 260 allows a personal computer (PC), for example, to interface to the electronic controller 115. In accordance with an embodiment of the present invention, the electronic controller 115 stores a history of operational data (a data log) which may be read out of the electronic controller 115 by the PC via the USB port 260. The history of operational data may include, for example, a listing of zone service calls that occurred over the last 24 hours or more, and a listing of stage activations initiated by the electronic controller 115 over the last 24 hours or more. Such historical information may be used by a technician to trouble-shoot the system 100. Also, in accordance with an embodiment of the present invention, a set of default options may be reloaded from the PC into the electronic controller 115 via the USB port 260. Reloading the set of default options overrides any manual option selections that were previously made via the display device 230.

Also, in accordance with an embodiment of the present invention, the USB port 260 may be used to allow the electronic controller 115 to interface with home automation equipment (e.g., a home automation device). The software of the electronic controller 115 is designed with "hooks" for integration with home automation packages. Data that may be output via the USB port to a home automation package include the last five events, the current damper states, the current service being provided, the current LAT, the current OAT, and any current thermostat or sensor requests. The home automation equipment may include a separate device with software that takes the data provided by the controller 115 and reports the data to a remote user via a dialer capability, email, or a web-based interface, for example. The user may have the capability to respond to the report in a similar manner in order to, for example, change the temperature in the home or turn off part of the HVAC system. The interface between the controller 115 and the home automation equipment may be wired or wireless, in accordance with various embodiments of the present invention.

Figure 2B:
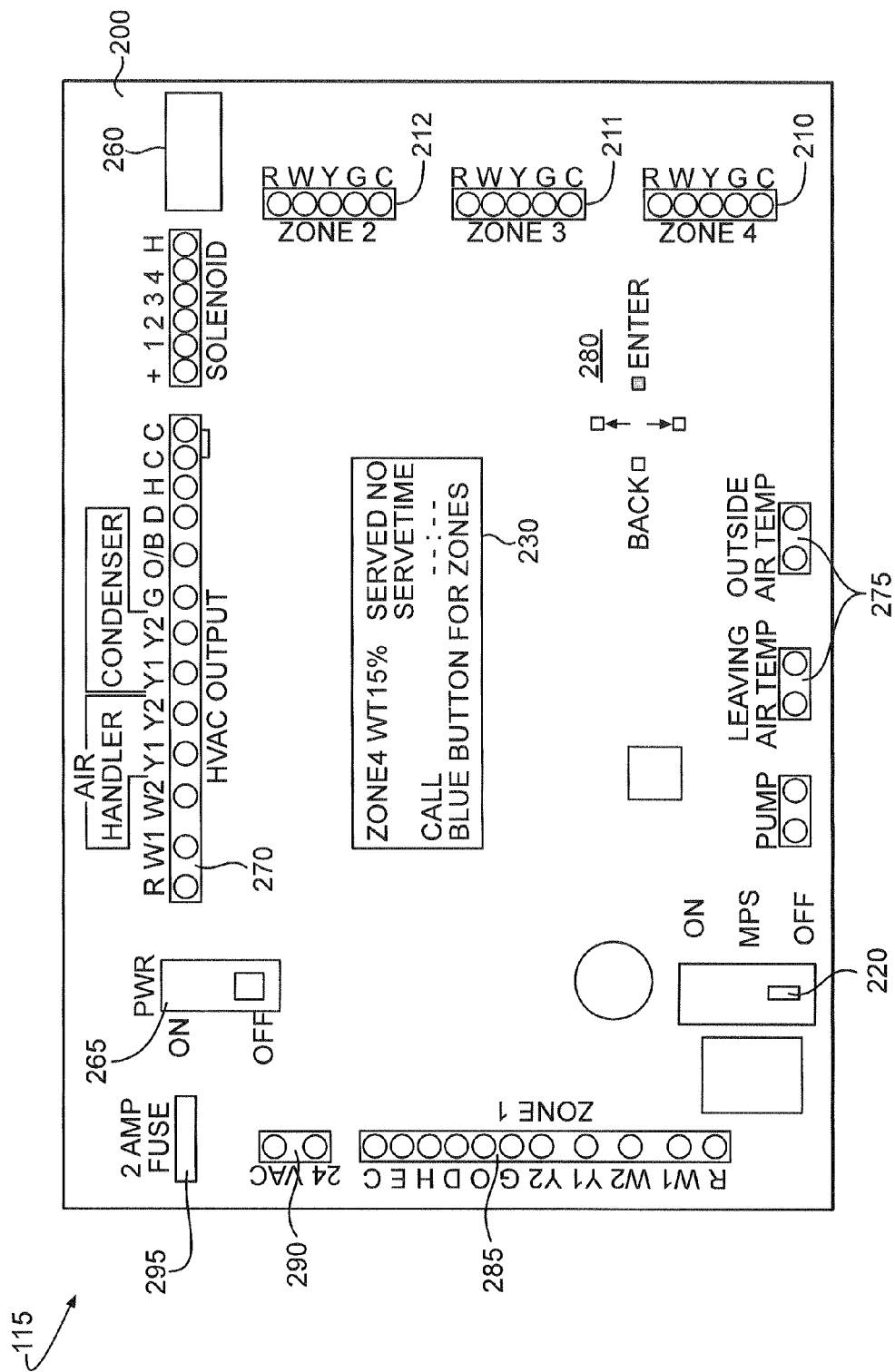
FIG. 2B is a second illustration of the example embodiment of the electronic controller used in the system of FIG. 1A, in accordance with various aspects of the present invention.

FIG. 2B is a second illustration of the example embodiment of the electronic controller 115 used in the system 100 of FIG. 1A, in accordance with various aspects of the present invention. The power switch 265 is used to control 24 VAC power to the control panel 110. The HVAC outputs 270 are the dry contacts to control the HVAC equipment. The terminals 210, 211, and 212 are the thermostat inputs for zone 4, zone 3, and zone 2, respectively. The sensor inputs 275 are the inputs for the LAT sensor and OAT sensor. Control buttons 280 provide a programming interface with components of the controller 115. The switch 220 is used to control power for the micro pump (air pump device 170). The zone 1 input terminal 285 accepts inputs from any 24 VAC thermostats (heat pump or heat/cool). The 24 VAC power input 290 is provided via transformer connections "R" and "C". The 2-amp fuse 295 protects the board 200 against thermostat shorts.

Figure 3:
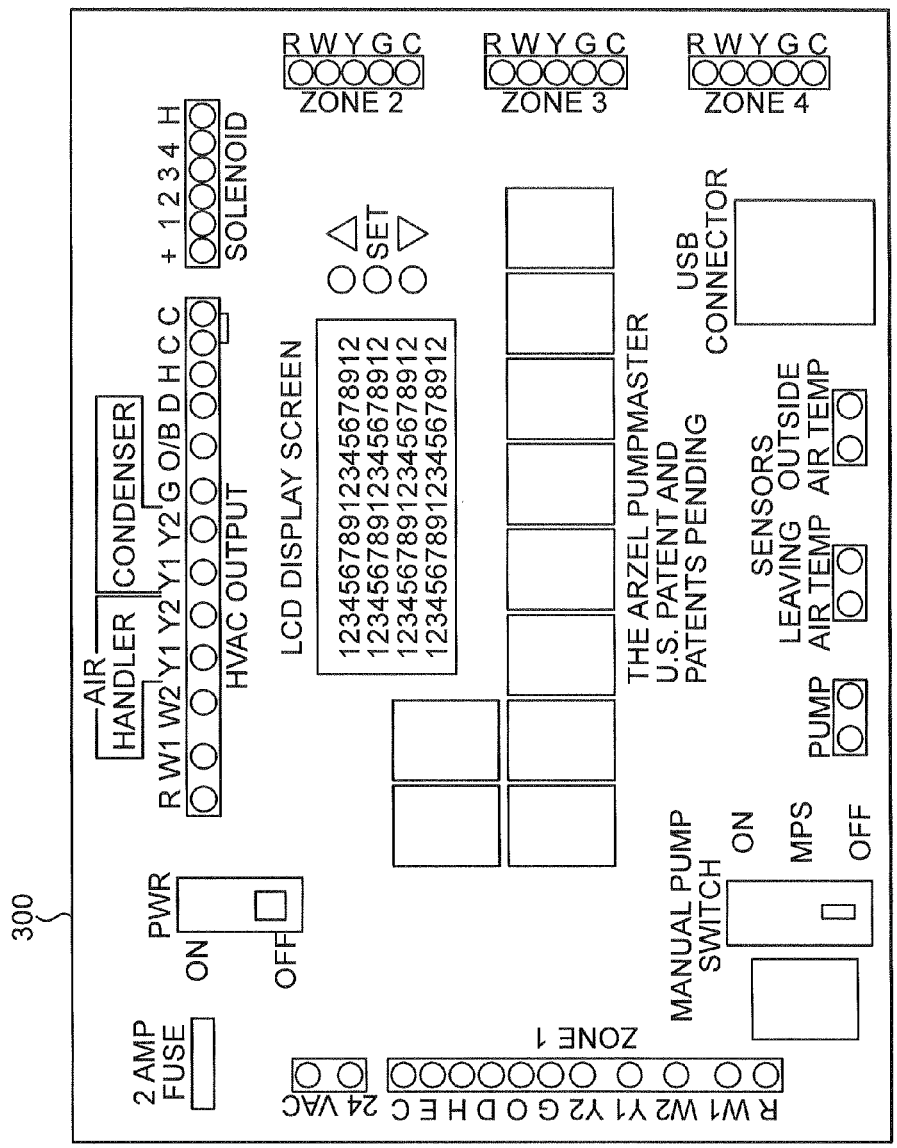
FIG. 3 is a schematic illustration of an embodiment of the layout of terminals, switches, and certain other components of an electronic controller used in the system of FIG. 1A, in accordance with various aspects of the present invention.

FIG. 3 is a schematic illustration of an embodiment of the physical layout 300 of terminals, switches, and certain other components of the electronic controller 115 used in the system 100 of FIG. 1A, in accordance with various aspects of the present invention.

Figure 4:
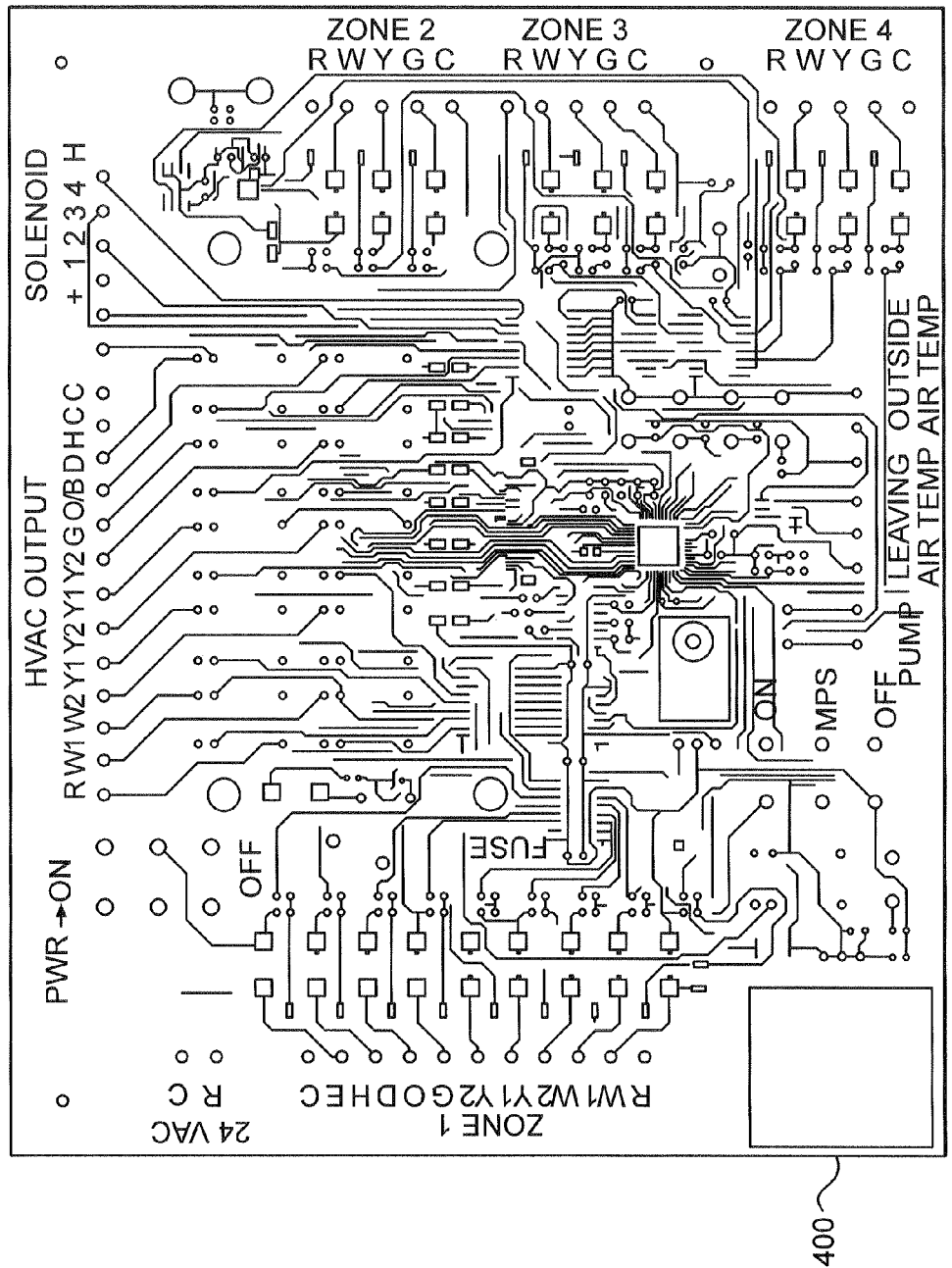
FIG. 4 is a schematic illustration of an embodiment of a circuit board layout of the electronic controller of FIGS. 2A and 2B, in accordance with various aspects of the present invention.

FIG. 4 is a schematic illustration of an embodiment of a circuit board layout 400 of the electronic controller 115 of FIGS. 2A and 2B, in accordance with various aspects of the present invention.

Figure 5A:
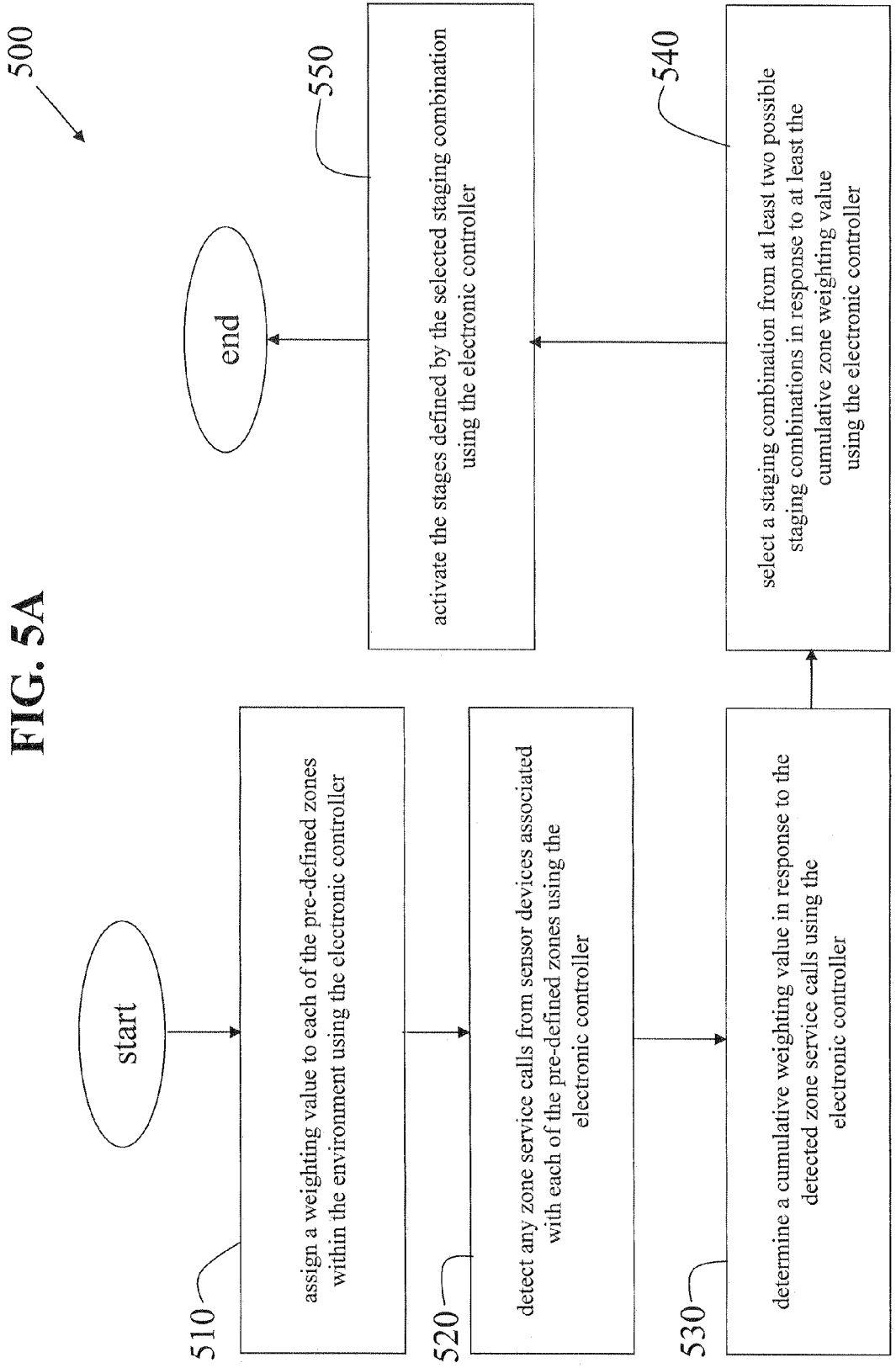
FIG. 5A illustrates a flowchart of a first embodiment of a method to control environmental parameters of pre-defined zones within a first environment using the system of FIG. 1A which includes the electronic controller of FIGS. 2A and 2B, in accordance with various aspects of the present invention.

FIG. 5A illustrates a flowchart of an embodiment of a method 500 to control environmental parameters of pre-defined zones within a first environment using the system 100 of FIG. 1A which includes the electronic controller 115 of FIGS. 2A and 2B, in accordance with various aspects of the present invention. In step 510, a weighting value is assigned to each of the pre-defined zones within a first environment using an electronic controller. In step 520, any zone service calls from sensor devices associated with each of the pre-defined zones are detected using the electronic controller. In step 530, a cumulative weighting value is determined in response to the detected zone service calls using the electronic controller. In step 540, an equipment staging combination is selected from at least two possible equipment staging combinations in response to at least the cumulative zone weighting value using the electronic controller. In step 550, the stages defined by the selected equipment staging combination are activated using the electronic controller.

As an example, referring to FIG. 1A, zone 1 161 may be assigned a weighting value of 35%, zone 2 162 may be assigned a weighting value of 10%, zone 3 163 may be assigned a weighting value of 20%, and zone 4 164 may be assigned a weighting value of 45%. These weighting values may be assigned based on the square footage area (i.e., floor space) of the zones or the separate spatial volumes of the zones, for example. In general, a larger zone may receive a higher weighting value. Also, weighting values may be based on the criticality of protecting equipment or produce in a zone (e.g., protecting expensive computer equipment or perishable food).

The weighting values for the various zones are programmed into the electronic controller 115 by an operator using the LCD display 230 and associated switches as a user interface. Next, zone service calls are detected by the electronic controller 115 from thermostat 151 in zone 1 161 and thermostat 154 in zone 4 164. Both zones are calling for heat. Since the weighting value associated with zone 1 161 is 35% and the weighting value associated with zone 4 164 is 45%, the cumulative weighting value is the sum of the two which is 80%, which is a fairly high cumulative weighting value, and is higher than a pre-defined zone weighting threshold of, for example, 60%.

As a result, the electronic controller 115 selects an equipment staging combination which includes two or more compressor stages of the heat pump 120 and a second higher air blower speed of the air handler 130. The selected stages are activated by the electronic controller 115 via the control panel 110, and the electronic controller 115 directs air from the air pump device 170 to the air dampers 181 and 184 in zone 1 161 and zone 4 164 in order to open these air dampers. As a result, the heat pump 120 provides heat to the air handler 130 which blows heated air to zone 1 161 and zone 4 164. The dampers 182 and 183 in zone 2 162 and zone 3 163 remain closed. Once the servicing of the zones is completed, the air dampers may be closed by the electronic controller 115.

A zone service call may include any of a heating call, a cooling call, a humidification call, a de-humidification call, and a fan-only call, in accordance with an embodiment of the present invention.

Continuing with the example, once zone 1 161 and zone 4 164 are properly heated, the electronic controller 115 closes the dampers 181 and 184 and de-activates the two stages of the heat pump 120 and the air handler 130. Next, the electronic controller 115 receives and detects a new zone service call from the thermostat 152 of zone 2 162. The weighting value associated with zone 2 162 is 10%. Since zone 2 162 is the only zone calling, the cumulative weighting value is also 10% which is below the threshold of 60%. As a result, the electronic controller 115 selects a new equipment staging combination which includes a first compressor stage of the heat pump 120 and a first lower air blower speed of the air handler 130. The selected stages are activated by the electronic controller 115 via the control panel 110, and the electronic controller 115 directs air from the air pump device 170 to the air dampers 182 in zone 2 162 in order to open this air damper. As a result, the heat pump 120 provides heat to the air handler 130 which blows heated air to zone 2 162. The dampers 181, 183 and 184 in zone 1 161, zone 3 163, and zone 4 164 remain closed.

As may be seen from the previous example, the weighting of the zones, the determination of a cumulative weighting value, and the independent control and activation of the heat pump stages and the air handler stages allow the system 100 to select the best combination of equipment stages to be activated in order to properly heat the calling zones in a more efficient manner. Similarly, other types of zone service calls such as cooling, humidification, dehumidification, and fan-only may be effected in the same way by allowing the system 100 to select, via the electronic controller 115, the best combination of stages of the heat pump 120, the auxiliary equipment 140, and the air handler 130. For example, for certain applications, it has been found that the best staging combination involves using the zone weighting values only to stage the air handler 130, independent of the staging of the other equipment. The controller 115 allows the air handler and the other equipment to be controlled and staged independently. For example, the heat pump may be staged based on LAT and OAT, but not zone weightings, and the air handler is staged based on the zone weightings. That is, the air handler staging, in this embodiment, is based strictly on zone weighting and not temperature. In this way, airflow may be better matched to duct capacity. The zone weightings for the air handler are based on the amount of ductwork being served at any one time for the calling zones.

In accordance with an embodiment of the present invention, one or more of the sensors 151-154 may include a humidistat for measuring a humidity level in a zone, or may be a combination thermostat/humidistat for measuring temperature and humidity level in a zone. When a zone calls for lowering the humidity level, two or more stages of the heat pump may be employed to provide maximum cooling capacity but only the first stage (i.e., lower speed) of the air handler may be activated such that the lower speed of the air passing over the cooling coils in the heat pump will allow more moisture to condense out of the air, for example.

Various staging combinations are provided by the electronic controller 115 in an attempt to better control the environmental parameters (e.g., temperature, humidity, air flow) within the various zones. In accordance with an embodiment of the present invention, the allowable staging combinations may be as follows:

1) a first stage of a heat pump and a first stage (low speed) of an air handler;
2) a first stage and a second stage of a heat pump and a first stage (low speed) of an air handler;
3) a first stage and a second stage of a heat pump and a second stage (high speed) of an air handler;
4) a first stage and a second stage of a heat pump, a second stage (high speed) of an air handler, and a first stage of an auxiliary heat source;
5) a first stage and a second stage of a heat pump, a second stage (high speed) of an air handler, and a first stage and a second stage of an auxiliary heat source.

Each of the staging combinations includes a unique, predefined combination of heat pump and/or auxiliary equipment stages that may be activated by the electronic controller along with different air handler stages that may be activated by the electronic controller for servicing the calling zones. Other staging combinations are possible as well, in accordance with various embodiments of the present invention. For example, a staging combination may include turning on a fan of the air handler 130 without activating any stages of the heat pump 120 or auxiliary equipment 140. This may be desirable simply to move air around a zone or zones, or to bring outside air in from outside of the house or building (i.e., from an external environment), for example. Again, in accordance with another embodiment of the present invention, only the air handler may be staged based on zone weighting, as will be elaborated upon later herein with reference to FIG. 5B.

The outside-air-temperature (OAT) sensor 191 may be used to report a temperature of the outside (i.e., external) environment to the electronic controller 115. As a result, the electronic controller 115 may use the outside-air-temperature as another input in the process to decide which stages to activate when a zone or zones is calling for service. For example, if it is the middle of winter and a user of the system 100 is entertaining a large number of people within a building such as, for example, a home, a restaurant, or a hotel, the temperature within the building may start to increase to an uncomfortable level. The outside-air-temperature as measured by the OAT sensor 191 and reported to the electronic controller 115 may be, for example, 40 degrees F. When the temperature inside a zone of the building reaches an uncomfortably warm level, the electronic controller 115 may open a damper to the outside and activate the air handler 130 to allow the cool outside air to be brought into the building instead of turning on an air conditioner or activating the heat pump 120 for cooling. Furthermore, the measured OAT may be used to determine whether or not any auxiliary equipment is allowed to be activated.

In accordance with an embodiment of the present invention, if the OAT is below a balance point threshold value, then any backup auxiliary heating will be used. If the OAT is below a low ambient threshold value, then cooling calls are served with the fan only. If the OAT is above a high ambient threshold value, then heating calls are served with the fan only. If the OAT is above an auxiliary heat lockout threshold value, then auxiliary heat is not allowed.

The leaving-air-temperature (LAT) sensor 192 may be used to report a temperature of the air leaving the air handler 130 to the electronic controller 115. As a result, the electronic controller 115 may use the leaving-air-temperature as another input in the process of deciding which stages to activate when a zone or zones is calling for service. That is, the system stages on thermal capacity, not just demand from one or more zones. The system does not have to wait for a thermostat to fall below or rise above a set temperature within a zone and call for more heating or cooling before reacting by changing the staging. For example, a first stage of the heat pump 120 may be used to cool zones within a house when the outside-air-temperature is around 80 degrees F. In such a scenario, the leaving-air-temperature from the air handler 130 may typically be around 70 degrees F. and does a fine job of cooling the calling zones to 74 degrees F. within a reasonable period of time. However, on a very hot day when the outside-air-temperature is above 95 degrees F., with only the first stage of the heat pump 120 activated, the leaving-air-temperature may only cool down to 75 degrees F., which is not suitable if the desired zone temperature is 74 degrees F. Therefore, under such conditions, the electronic controller 115 would detect that the leaving-air-temperature was too high and would activate both the first and second stages of the heat pump 120 in an attempt to reduce the leaving-air-temperature. Many other scenarios are possible as well which may be handled by embodiments of the present invention.

Whenever one or more of the sensed parameters (e.g., temperature, humidity), from a sensor sensing a present status of at least one of the environmental parameters, changes within a zone, or OAT or LAT changes, the electronic controller 115 may select a new staging combination which is more appropriate for the new conditions. The electronic controller 115 provides the flexibility needed to better control environmental parameters within a home, building, or other environment, for example. That is, multiple controls (functions) are built into the controller 115, eliminating the need for separate control devices. In accordance with an embodiment of the present invention, the controller 115 includes built-in controls for resistance heat lock-out capability, outdoor reset capability, outdoor temperature balance point capability, discharge temperature (LAT) controls (two independent high limits and one low limit), and selectable O/B outputs. As a result, the controller 115 could be used simply as, for example, a heat pump controller and not a zone controller. The two independent LAT high limits include a first limit for setting the maximum allowable temperature for heat-pump only operation, and a second limit for setting the maximum temperature for heat-pump plus some form of backup or auxiliary heat. The low LAT limit is for setting the minimum allowable temperature across the coil for cooling. Staging decisions are made based on these limits being exceeded or not, for example.

In general, the various methods described herein with reference to the various flow charts are performed by the electronic controller 115. The electronic controller 115 accepts various input signals, performs various logic functions and calculations based on, at least in part, those input signals, and outputs various output signals to control the various equipment of the system 100.

In accordance with another embodiment of the present invention, the zone weighting values are used only to stage the air handler 130. The staging of the heating and cooling equipment is done based on capacity and/or demand.

FIG. 5B illustrates a flowchart of a second embodiment of a method 555 to control environmental parameters of pre-defined zones within a first environment using the system 100 of FIG. 1A which includes the electronic controller 115 of FIGS. 2A and 2B, in accordance with various aspects of the present invention. In step 560, a weighting value is assigned to each of the pre-defined zones within the environment, using the non-proprietary electronic controller, based on at least duct work capacity for each pre-defined zone. In step 570, the non-proprietary electronic controller detects any zone service calls from sensor devices associated with each of the pre-defined zones. In step 580, the non-proprietary electronic controller determines a cumulative zone weighting value in response to the detected zone service calls. In step 590, the non-proprietary electronic controller selects an air handler stage from at least two possible air handler stages in response to at least the cumulative zone weighting value.

For example, referring to FIG. 1, the system 100 may presently be servicing only a previous heating call from zone 1 161. The weighting of zone 1 is 35 percent and is based on the ductwork capacity associated with zone 1. The air handler weighting threshold is currently set to 50%. Since only zone 1 has called for service, the cumulative zone weighting value is 35 percent which is below the 50% threshold. As a result, the selected air handler stage is the first lower speed stage, which is adequate to handle the zone 1 heating call.

During the servicing of zone 1 161, zone 3 163 calls to the non-proprietary electronic controller 115 for heat (a new zone service call). The weighting for zone 3 is 20% and is based on the ductwork capacity associated with zone 3. Since both zone 1 and zone 3 are to be serviced, the cumulative zone weighting value is now 35%+20%, or 55%, which is above the 50% threshold. As a result, the selected air handler stage is the different second higher speed stage, which is adequate to handle the zone 1 and zone 3 heating calls. Based on the 50% threshold setting, the first lower speed stage of the air handler is no longer adequate to handle both calls. The particular equipment staging combination (e.g., staging of the heat pump 120) is selected independently of the air handler staging and zone weightings (e.g., selected based on LAT and/or OAT).

Figure 6:
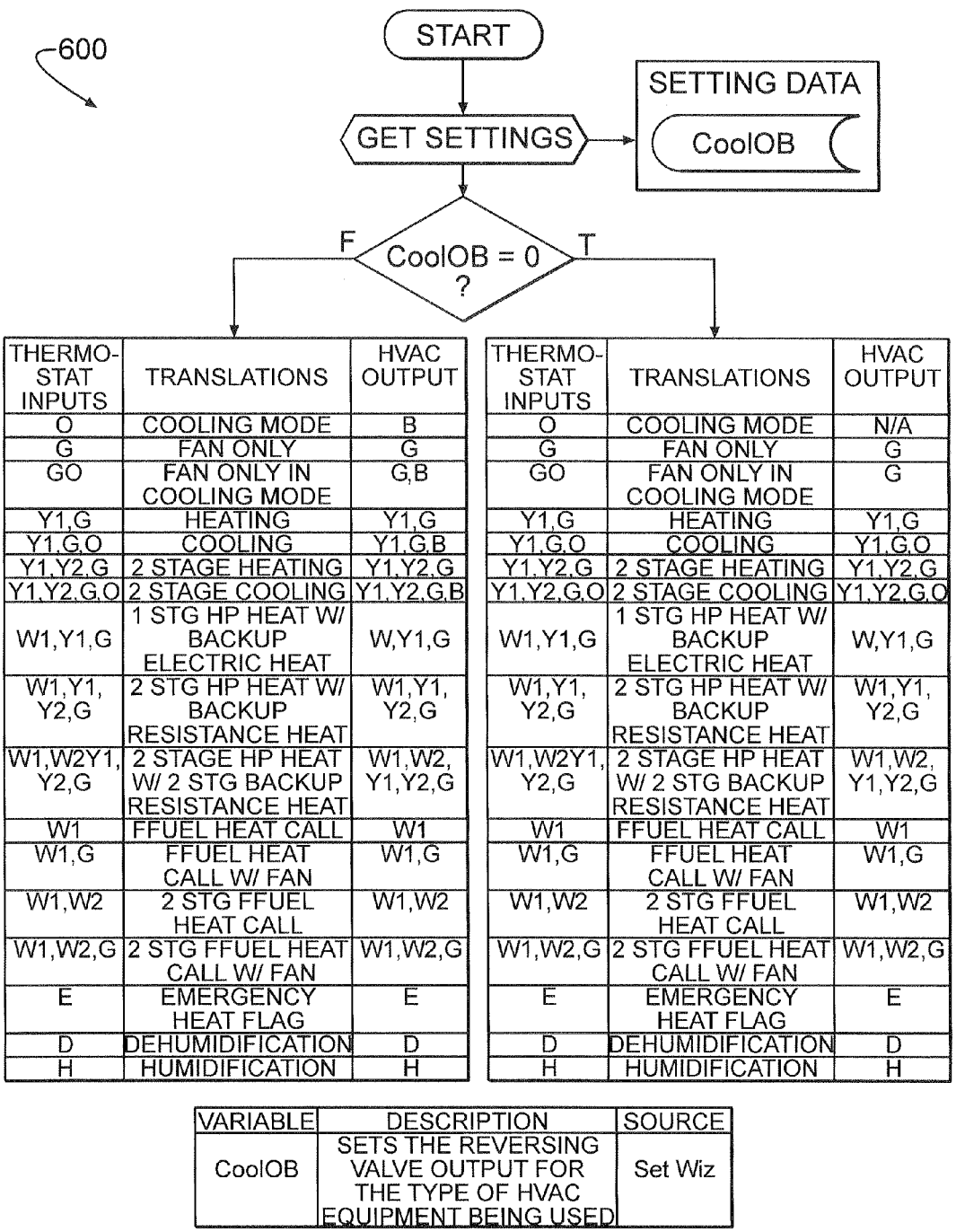
FIG. 6 is a flowchart of an example embodiment of a method for translating thermostat inputs to HVAC outputs based on the type of HVAC equipment being used, in accordance with various aspects of the present invention.

FIG. 6 is a flowchart of an example embodiment of a method 600 for translating thermostat inputs to HVAC outputs based on the type of HVAC equipment being used, in accordance with various aspects of the present invention. Such a translation demonstrates the non-proprietary nature of the controller 115. In the method 600, a reversing valve output is set based on the type of HVAC equipment being used. In accordance with an embodiment of the present invention, the electronic controller 115 performs the translation.

Figure 7:
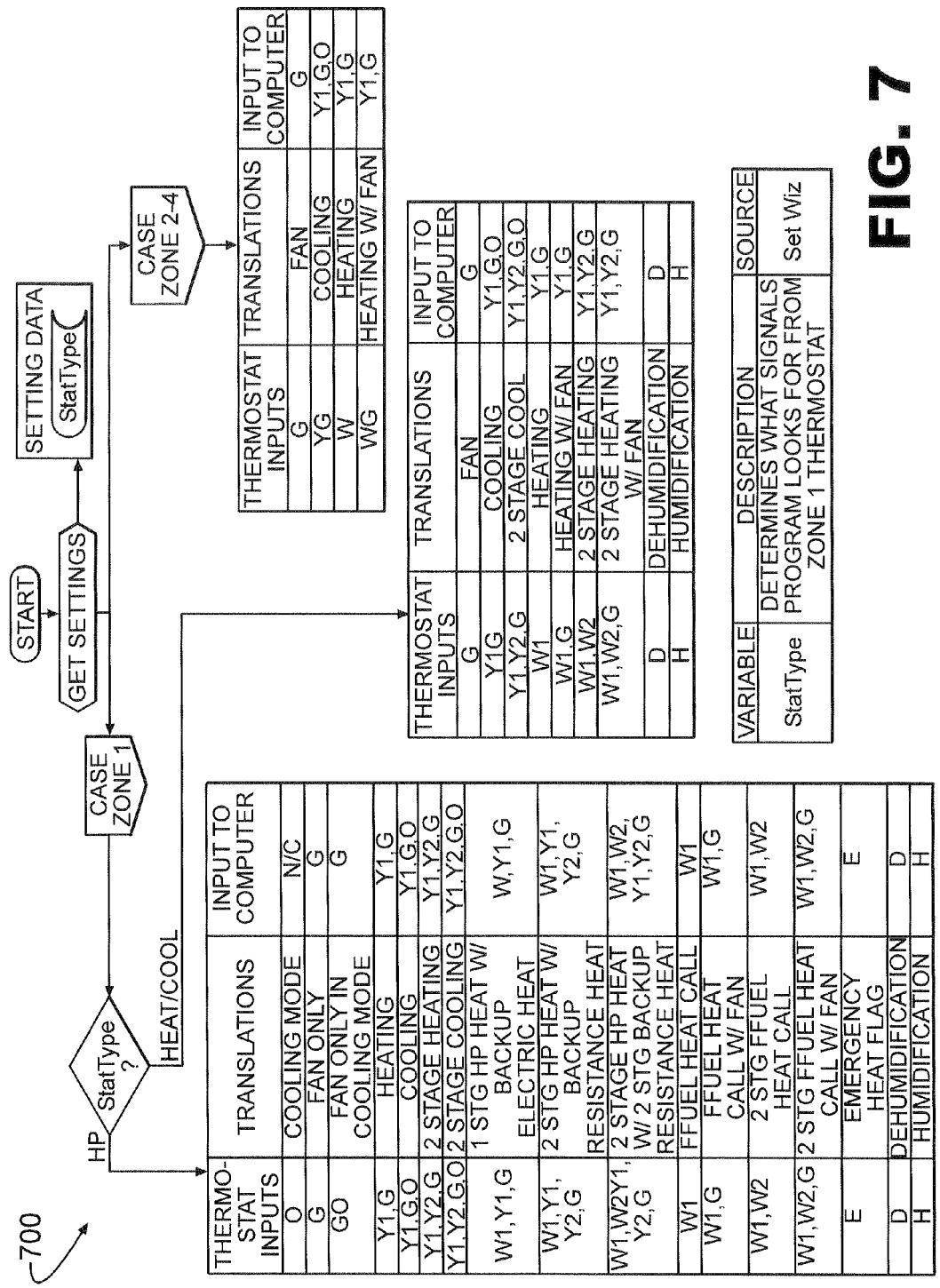
FIG. 7 is a flowchart of an example embodiment of a method for translating thermostat inputs to electronic controller inputs based on zone, in accordance with various aspects of the present invention.

FIG. 7 is a flowchart of an example embodiment of a method 700 for translating thermostat inputs to electronic controller inputs based on zone, in accordance with various aspects of the present invention. Such a translation demonstrates the non-proprietary nature of the controller 115. The method 700 determines which inputs the electronic controller 115 looks for from the zone 1 thermostat.

FIGS. 8a-8b show example embodiments of setting options that may be displayed to an operator of the electronic controller 115 via the display device 230, in accordance with various aspects of the present invention. For example, the weighting values associated with each zone (e.g., zones 1-4) may be selected in 10% increments for each zone from anywhere between 10% to 90% inclusive. Other setting options than those shown in FIGS. 8a-8b are possible as well, in accordance with alternative embodiments of the present invention.

FIG. 9A illustrates graphs of heating temperature profiles 900, in accordance with an embodiment of the present invention. Once a sensor (e.g., a thermostat) calls for heat, the equipment (e.g., heat pump) is activated and begins to warm up. The leaving air temperature (LAT) increases and then levels off at some point. The change in LAT over a given unit of time is defined as $\Delta T$. In accordance with an embodiment of the present invention, the LAT sensor 192 is used to determine $\Delta T$. $\Delta T$ indicates the change in temperature from one unit of time to the next and indicates whether or not the heat pump is keeping up with demand. In accordance with an embodiment of the present invention, $\Delta T$ is the basis of all equipment staging decisions. That is, the system stages, at least in part, based on thermal capacity.

$\Delta T$ starts out small as the coil and condenser of the heat pump start to work. Then $\Delta T$ increases as the equipment gets up to speed. Finally, $\Delta T$ decreases and eventually goes to zero as the temperature levels out. In accordance with an embodiment of the present invention, $\Delta T$ is used as a flag for making staging decisions. That is, the system stages, at least in part, based on thermal capacity. It is typically known, apriori, how the equipment has been designed to operate with respect to equipment profiles. Therefore, a decision can be made as to when the current operating mode of the equipment is sufficient or when heating capacity should be increased. A minimum desired temperature is also known. If $\Delta T$ goes to zero but is still below the desired temperature, then the equipment is not generating enough heat to get the job done. As a result, the equipment will be upstaged to provide the additional heat. In accordance with an embodiment of the present invention, the electronic controller 115 checks to ensure that $\Delta T$ starts out with a strong magnitude to prove that the heat pump is operating.

FIG. 9B illustrates a graph of a cooling temperature profile 910, in accordance with an embodiment of the present invention. Cooling works in a similar manner to heating, except in the opposite direction. As the coolant reaches its most efficient speed for heat transfer, the temperature starts to fall more quickly. Therefore $|\Delta T|$ reaches its highest point. Once the temperature profile proceeds below the point of diminishing marginal returns, the $|\Delta T|$ starts to decrease. As the equipment continues to run and remove all the heat it can, the leaving air temperature (LAT) reading stabilizes and $\Delta T$ becomes very close to zero. Such temperature characteristics may be monitored and used to stage at the appropriate time (i.e., staging based on thermal capacity).

In accordance with an embodiment of the present invention, the system 100 provides four stages for heating and two stages for cooling. FIG. 10A illustrates two example graphs 1010 and 1020 of temperature vs. time for heating capacity staging and cooling capacity staging. The two graphs of FIG. 10A illustrate how capacity is staged up for heating or cooling if needed, in accordance with an embodiment of the present invention.

Figure 10B:
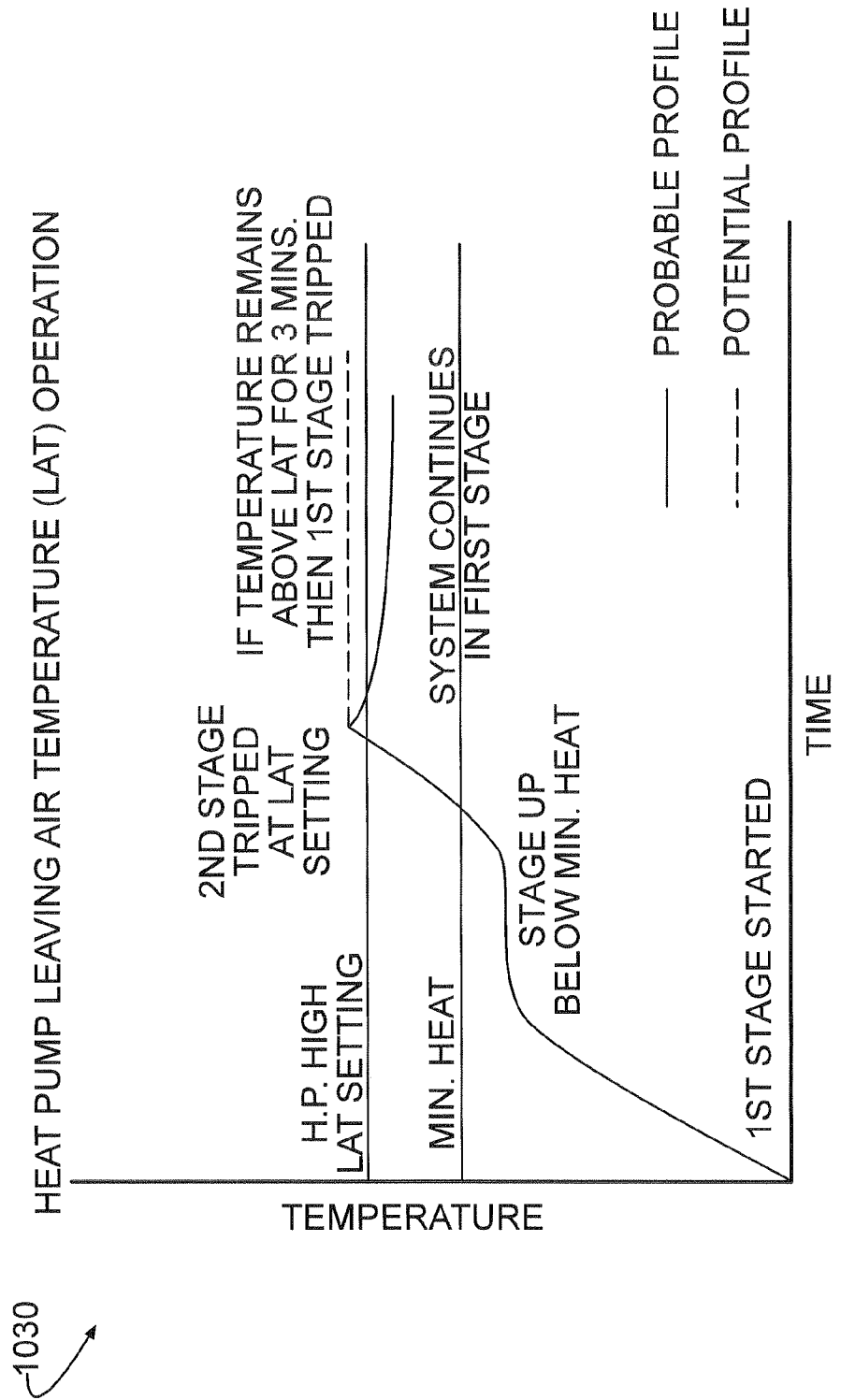
FIG. 10B is a graph that illustrates staging up for heating with only a two-stage heat pump, in accordance with an embodiment of the present invention.

FIGS. 10B-10D illustrate the basic operation of the system 100 with respect to leaving air temperature (LAT), in accordance with an embodiment of the present invention. The graph 1030 of FIG. 10B illustrates staging up for heating with only a two-stage heat pump. The graph 1040 of FIG. 10C illustrates staging up for heating with a heat pump and auxiliary heat available, allowing four stages of heating. The graph 1050 of FIG. 10D illustrates two staging down profiles, one for an all-electric mode and one for a fossil fuel mode.

Figure 11A:
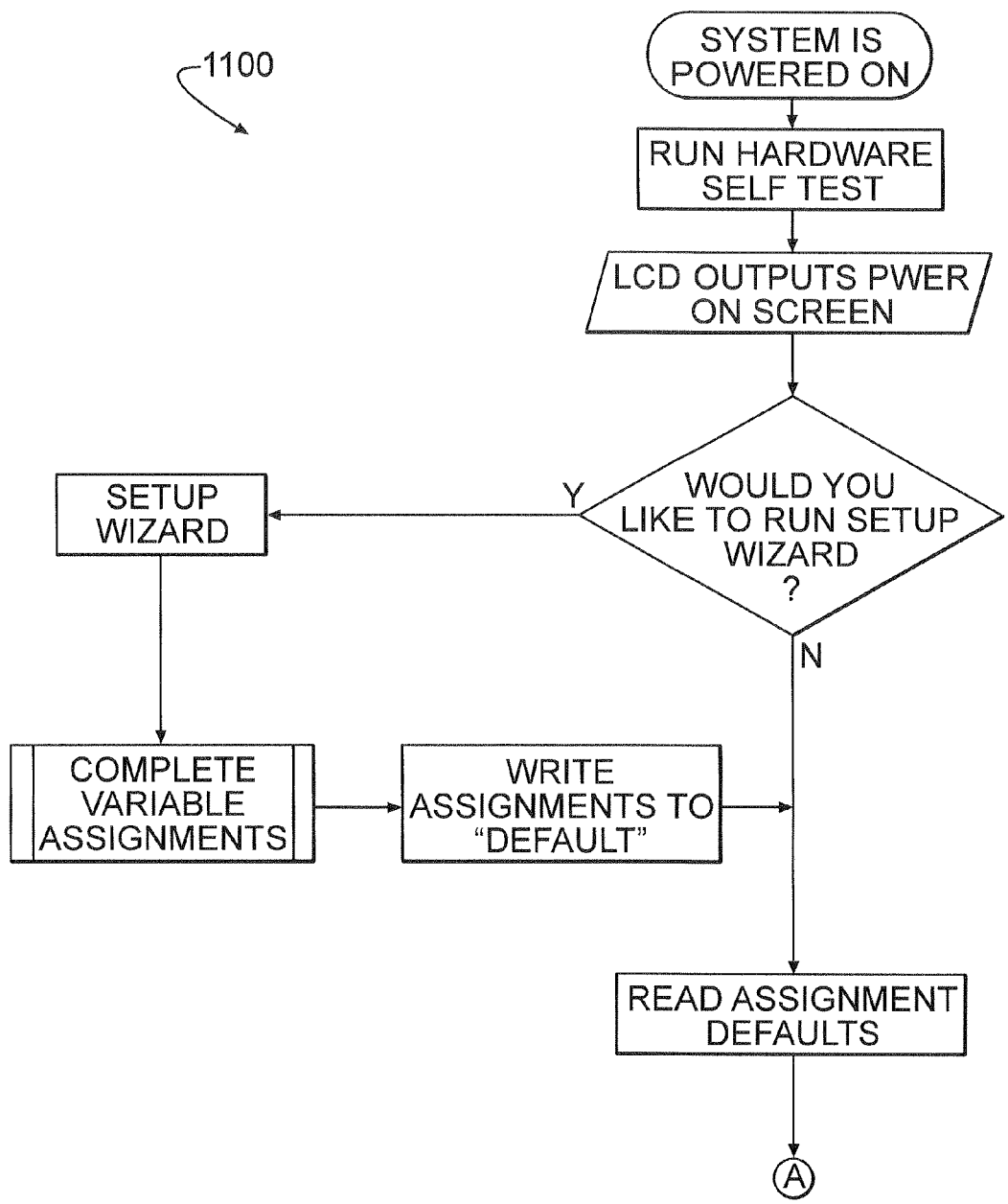
FIGS. 11a-11b illustrate a flowchart of an example embodiment of a method of general system operation of the system of FIG. 1A, in accordance with various aspects of the present invention.
Figure 11B:
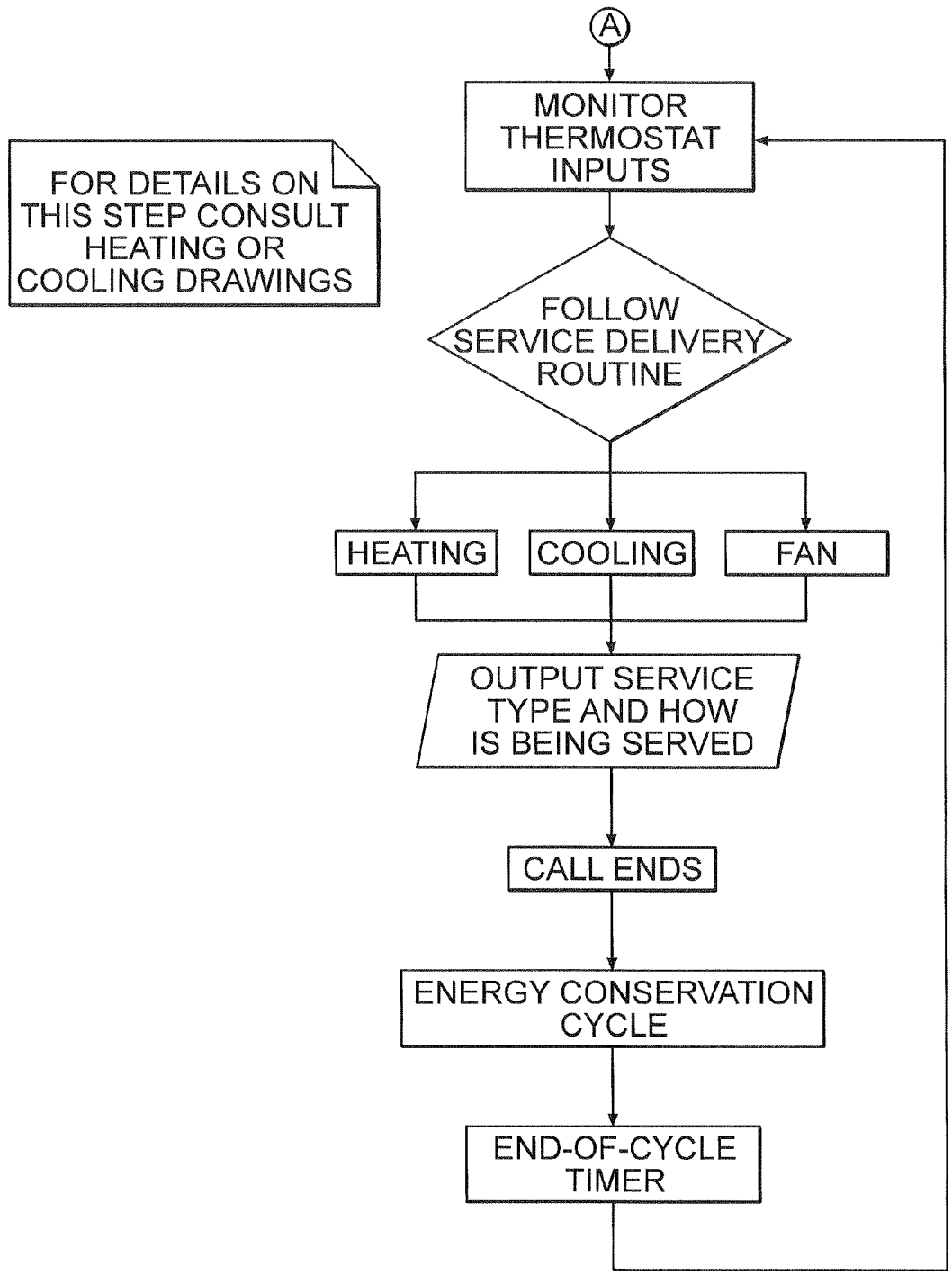

FIGS. 11a-11b illustrate a flowchart of an example embodiment of a method 1100 of general system operation of the system 100, in accordance with various aspects of the present invention. The method 1100 includes running a "Setup Wizard" which includes selecting the various setting options displayed to an operator on the display device 230. The method 1100 also includes monitoring sensor (e.g., a thermostat and/or a humidistat) inputs and selecting an appropriate service routine to run (e.g., heating, cooling, fan-only).

In general, the electronic controller 115 monitors the progress of the heating or cooling process and adjusts the staging to produce enough heat transfer to get the job done in an efficient manner while minimizing airflow when only small zones are calling. ΔT is the difference between two temperature readings over a given time increment and is the basis for monitoring system performance. In accordance with an embodiment of the present invention, when the electronic controller 115 starts to service a call, the electronic controller 115 will wait approximately one minute and then start to take temperature readings (LAT readings). The electronic controller 115 averages enough readings to effectively filter out any anomalous readings.

The process is monitored in three ways, in accordance with an embodiment of the present invention. First, the rate at which the temperature is rising or falling during the initial heating or cooling process is monitored. Second, the final temperature is recorded when ΔT decreases to nearly zero. The final recorded temperature value should be above (for heating) or below (for cooling) a minimum setting which should feel comfortable to end users. Third, if ΔT changes from a positive value to a negative value, then this means that the heat pump, for example, is not keeping up with demand and the thermostat will soon start to move away from setpoint rather than toward it. ΔT is monitored to see if it changes sign and this information is also used to decide whether or not to stage up.

The decision to stage up is checked against the cumulative zone weighting value. If the cumulative zone weighting value does not exceed a zone weight threshold, the staging up is delayed until the LAT has drifted 5 degrees F. below (for heating) or above (for cooling) the minimum heat or maximum cooling settings. The decision to stage up is also checked against the OAT, in accordance with an embodiment of the present invention. For heating, if the OAT is above 45 degrees F., for example, then the system is not allowed to stage up until the LAT has drifted 5 degrees F. below the minimum heat settings. For cooling, if the OAT is below 75 degrees F., then the system is not allowed to stage up until the LAT has drifted 5 degrees F. above the maximum cooling settings.

Figure 12A:
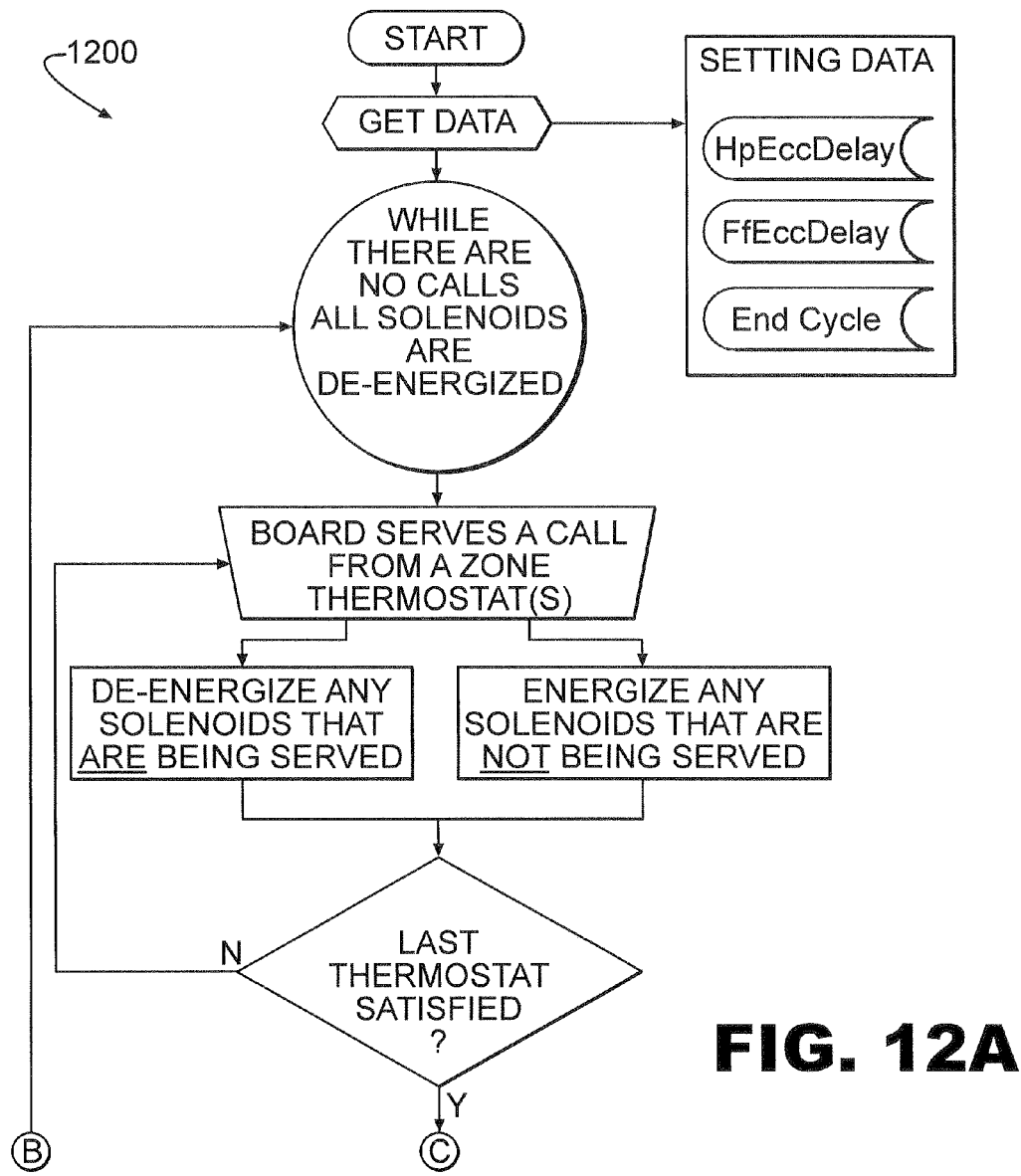
FIGS. 12a-12b illustrate a flowchart of an example embodiment of a method of solenoid operation on the control panel of the system of FIG. 1A, in accordance with various aspects of the present invention.
Figure 12B:
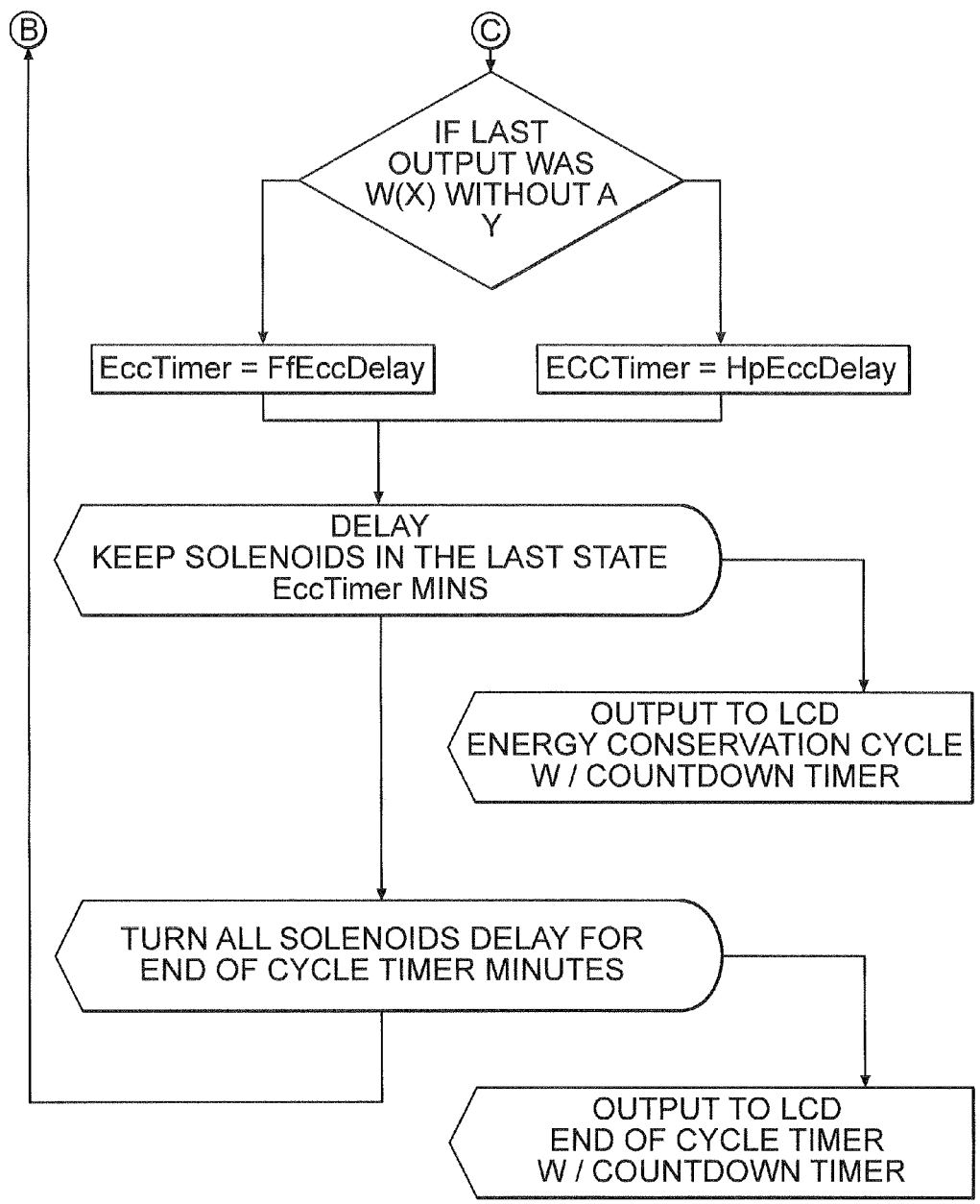

FIGS. 12a-12b illustrate a flowchart of an example embodiment of a method 1200 of solenoid operation on the control panel 110 of the system 100, in accordance with various aspects of the present invention. In accordance with an embodiment of the present invention, the solenoids of the control panel 110 are controlled by 24 VDC. The electronic controller 115 provides sufficient power to drive six solenoids. Solenoids which are used to open and close air dampers are High (24 VDC) when the dampers are to be closed and Low (0 VDC) when the dampers are to be opened. When the electronic controller 115 is idle, all solenoids are off (0 VDC).

Figure 13A:
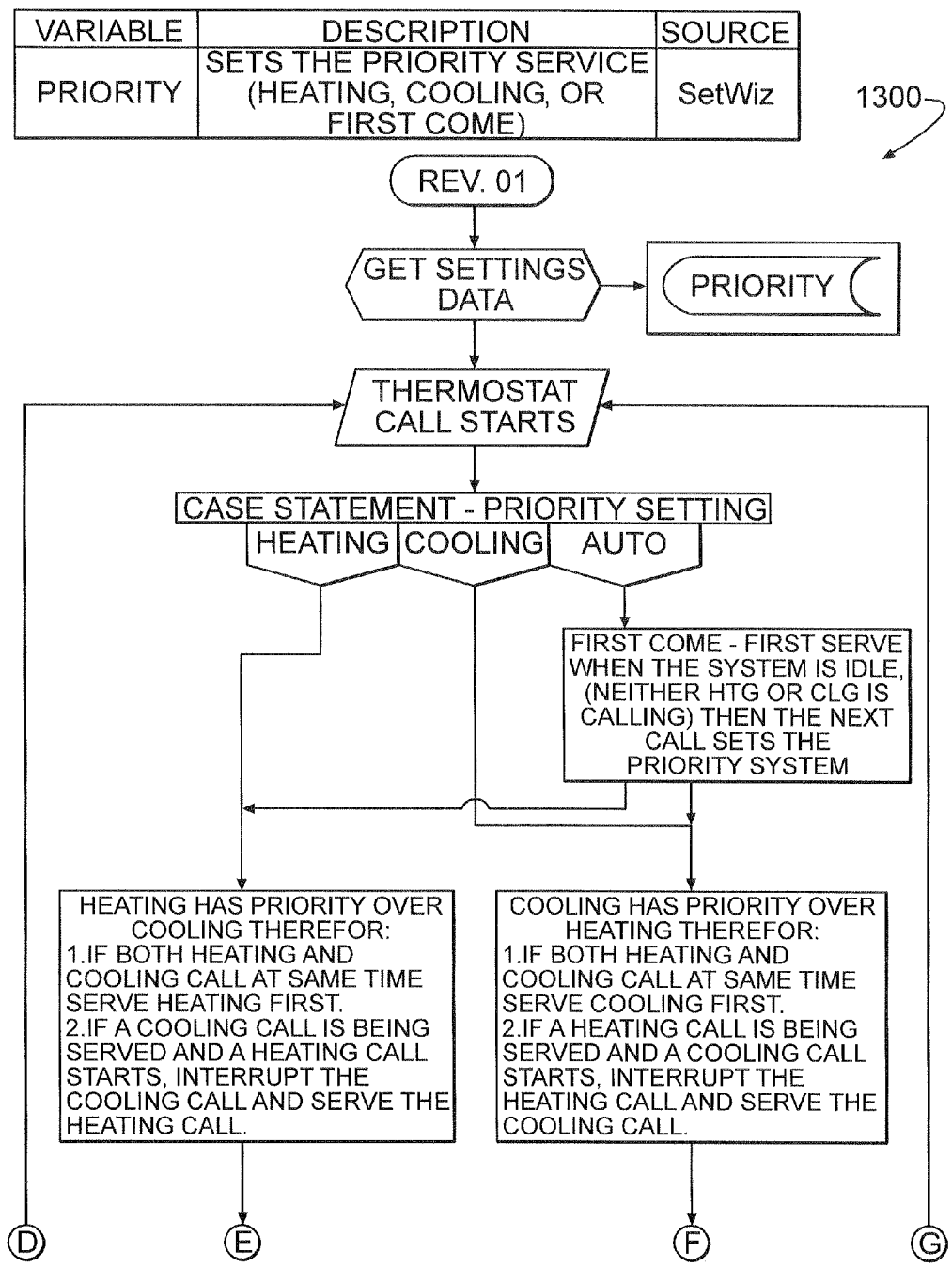
FIGS. 13a-13b illustrate a flowchart of an example embodiment of a method of a priority select function, in accordance with various aspects of the present invention.
Figure 13B:
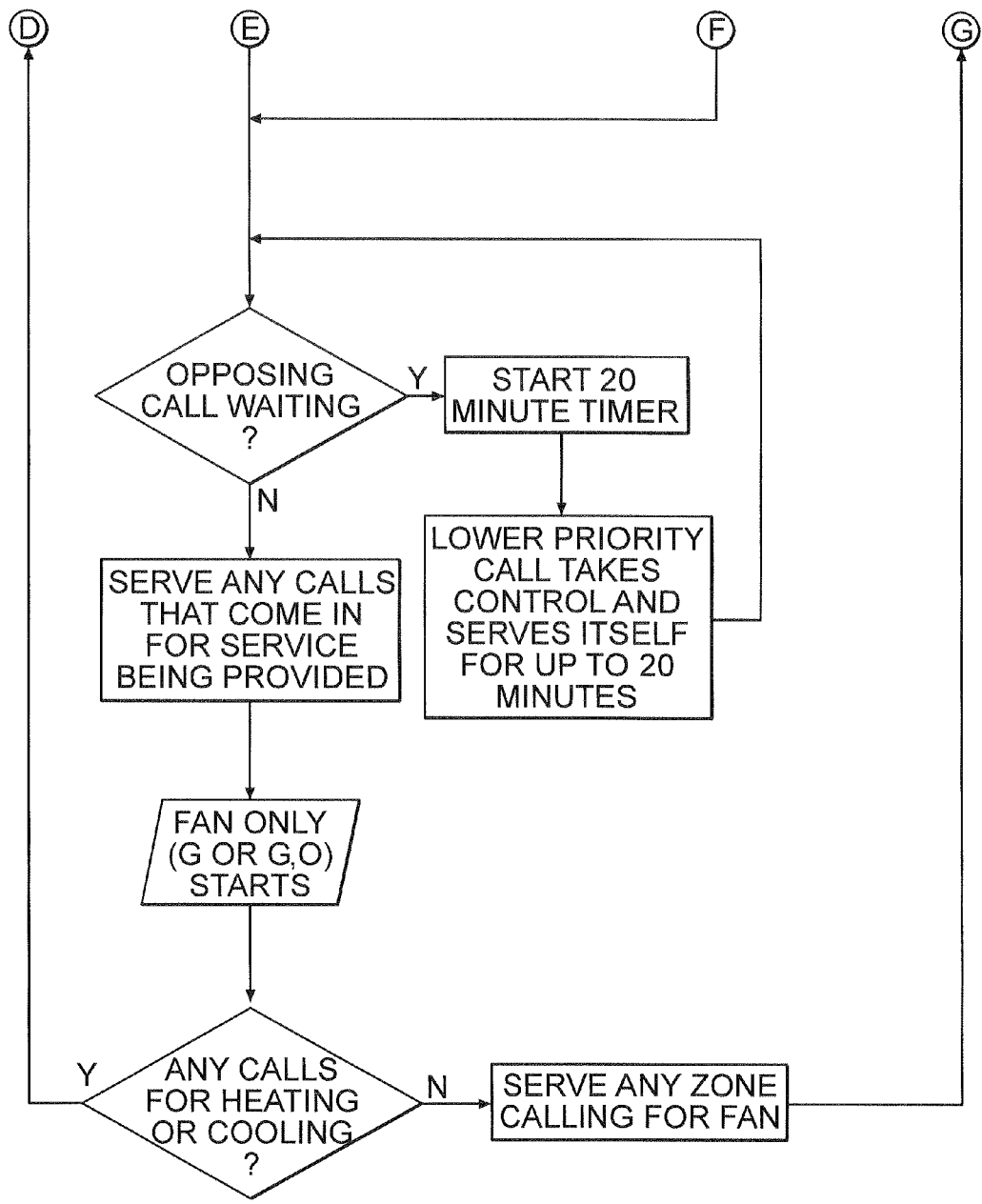

FIGS. 13a-13b illustrate a flowchart of an example embodiment of a method 1300 of a priority select function, in accordance with various aspects of the present invention. The priority select function determines the priority given to heating, cooling, and fan-only calls based on the current circumstances (e.g., current zone service calls). For example, when "heating" has priority, heating calls have priority over cooling and fan calls. Heating calls interrupt any lower priority calls and a purge cycle commences immediately (as described later herein). Upon completion of the purge cycle, the electronic controller 115 serves the heating call. Any other zone that calls for heating may have it. When "cooling" has priority, cooling calls have priority over heating and fan calls. Cooling calls interrupt any lower priority calls and the purge cycle commences immediately. Upon completion of the purge cycle, the electronic controller serves the cooling call. Any other zone that calls for cooling may have it. In the "Auto" or "First Come, First Served" mode, the call (either heating or cooling) currently being served has priority over any other calls. The current call is not interrupted. The fan is always a lower priority than heating or cooling. In accordance with an embodiment of the present invention, if a non-priority call (heating or cooling) waits for 20 minutes, this call will take control and serve itself for up to 20 minutes. This is to preclude orphan zones (i.e., some zones never being served).

Figure 14A:
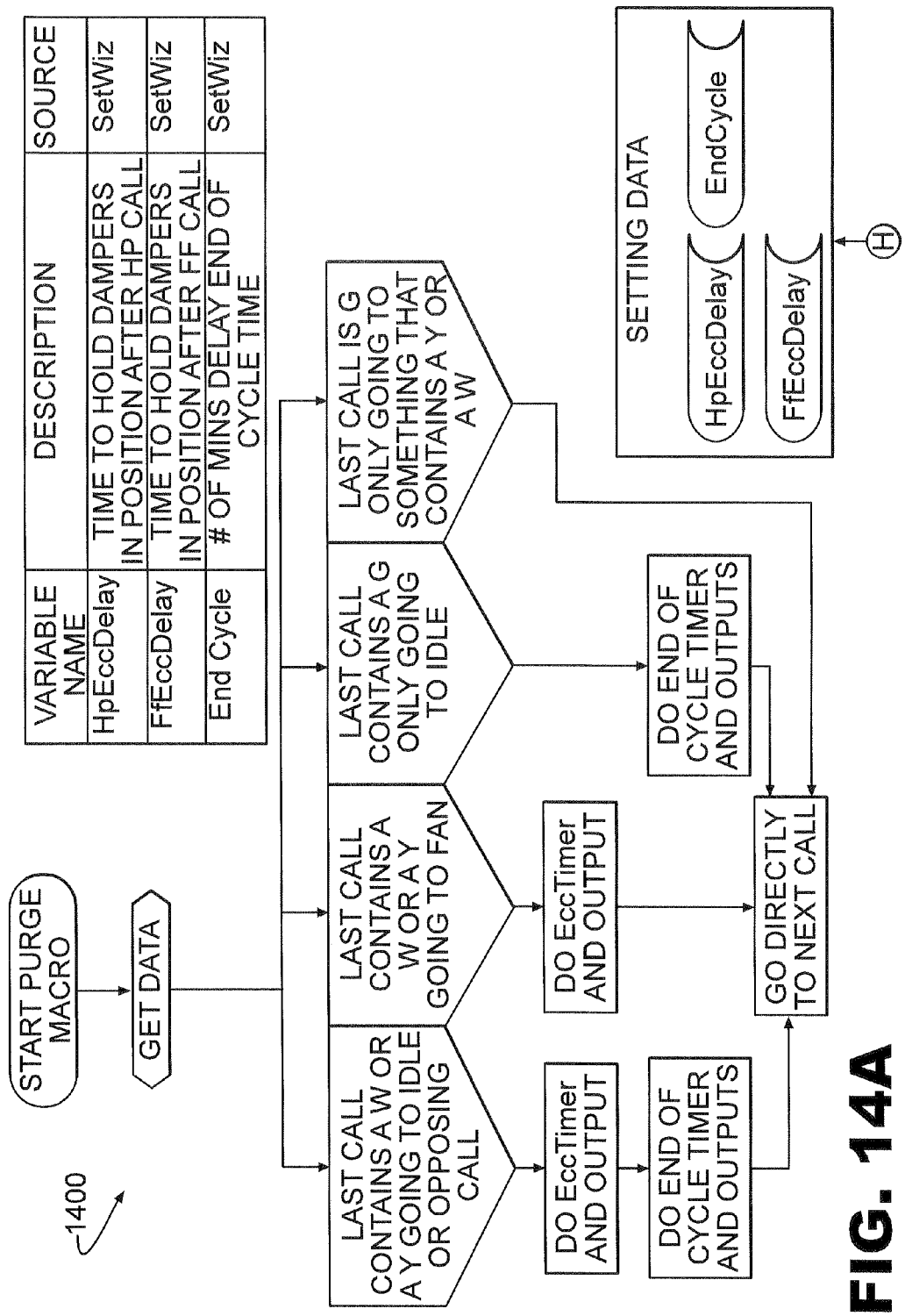
Figure 14B:
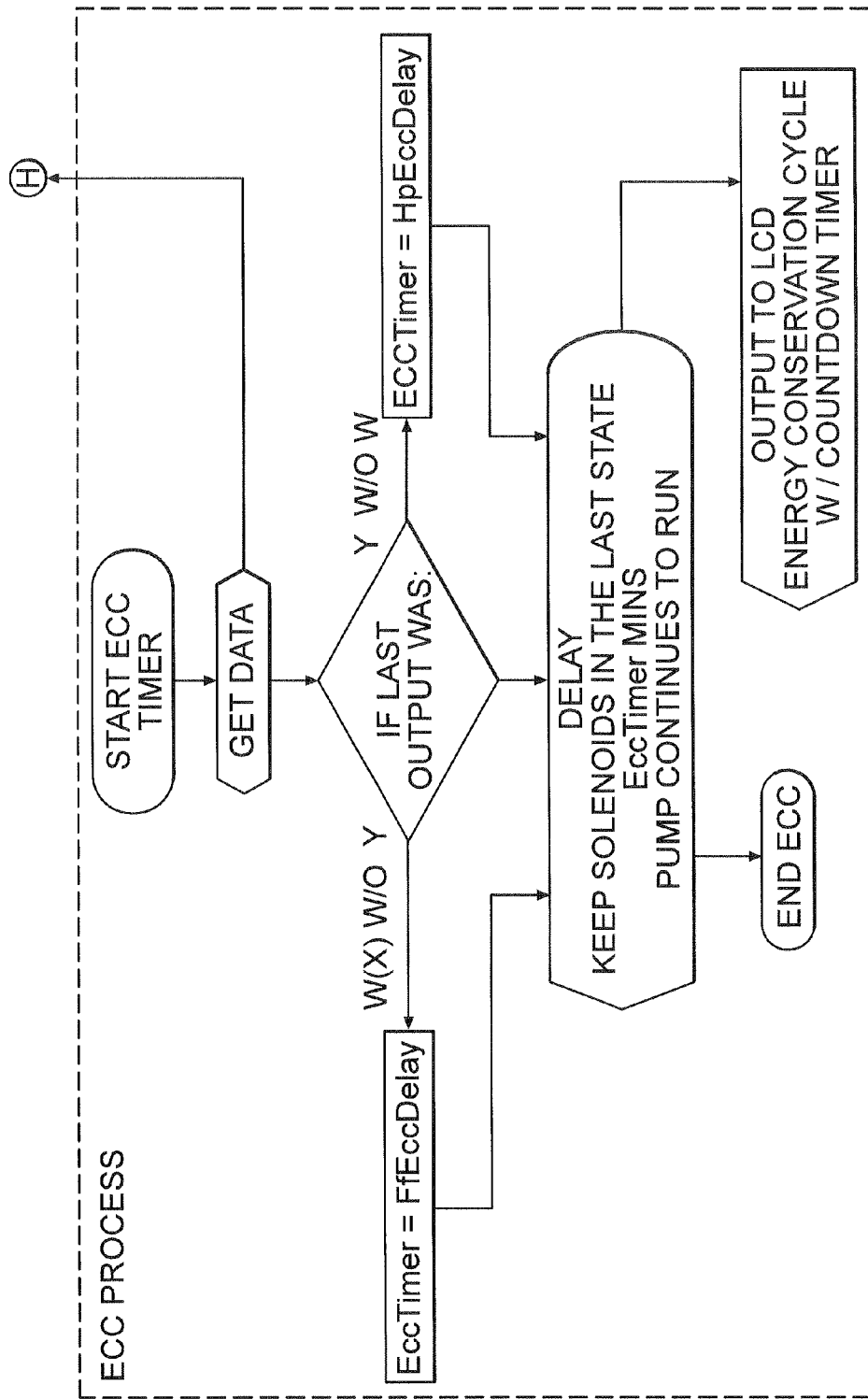

FIGS. 14a-14c illustrate flowcharts of an example embodiment of methods 1400 and 1410 for performing end of cycle purges, in accordance with various aspects of the present invention. At the end of calls which contain a "Y" (primary heating/cooling source), turn off all solenoids and run the air pump device 170 for one minute. Then run the pre-cycle timer for a length of time previously set up by the operator. At the end of calls that contain a "W" (auxiliary heating/cooling source), hold the dampers in position for two minutes, then turn off all of the solenoids and run the air pump device 170 for the duration of the End-of-Cycle timer. The End-of-Cycle time is the amount of time that the air pump device 170 will run at the conclusion of a call and any purge cycle to open the dampers in preparation for the next call and is adjustable for zero to three minutes. If there is a fan call waiting, allow the fan to continue running during the post-purge and any end-of-cycle damper timing.

Figure 15A:
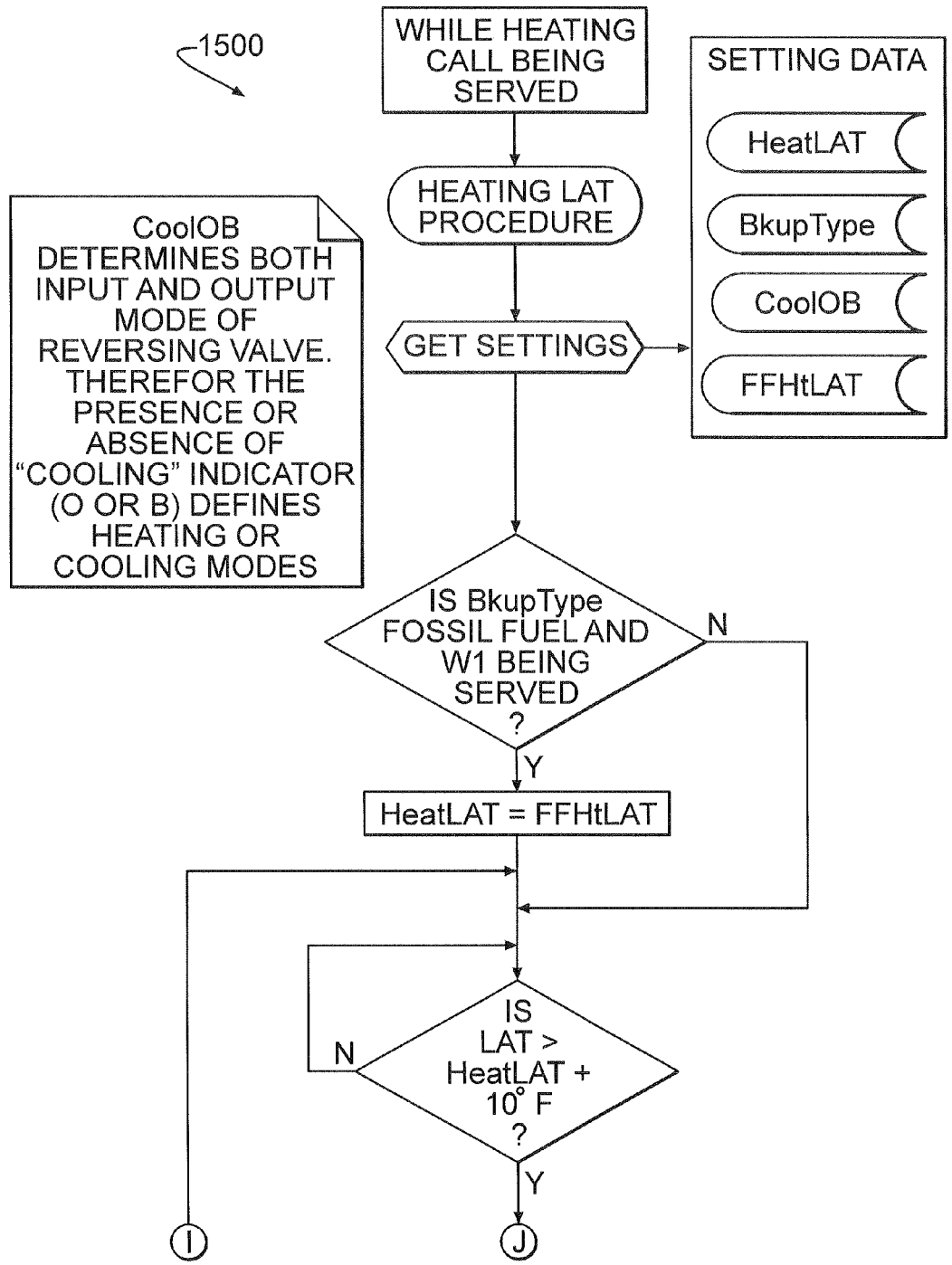
FIGS. 15a-15c illustrate a flowchart of an example embodiment of a method for performing a heating LAT procedure, in accordance with various aspects of the present invention.
Figure 15B:
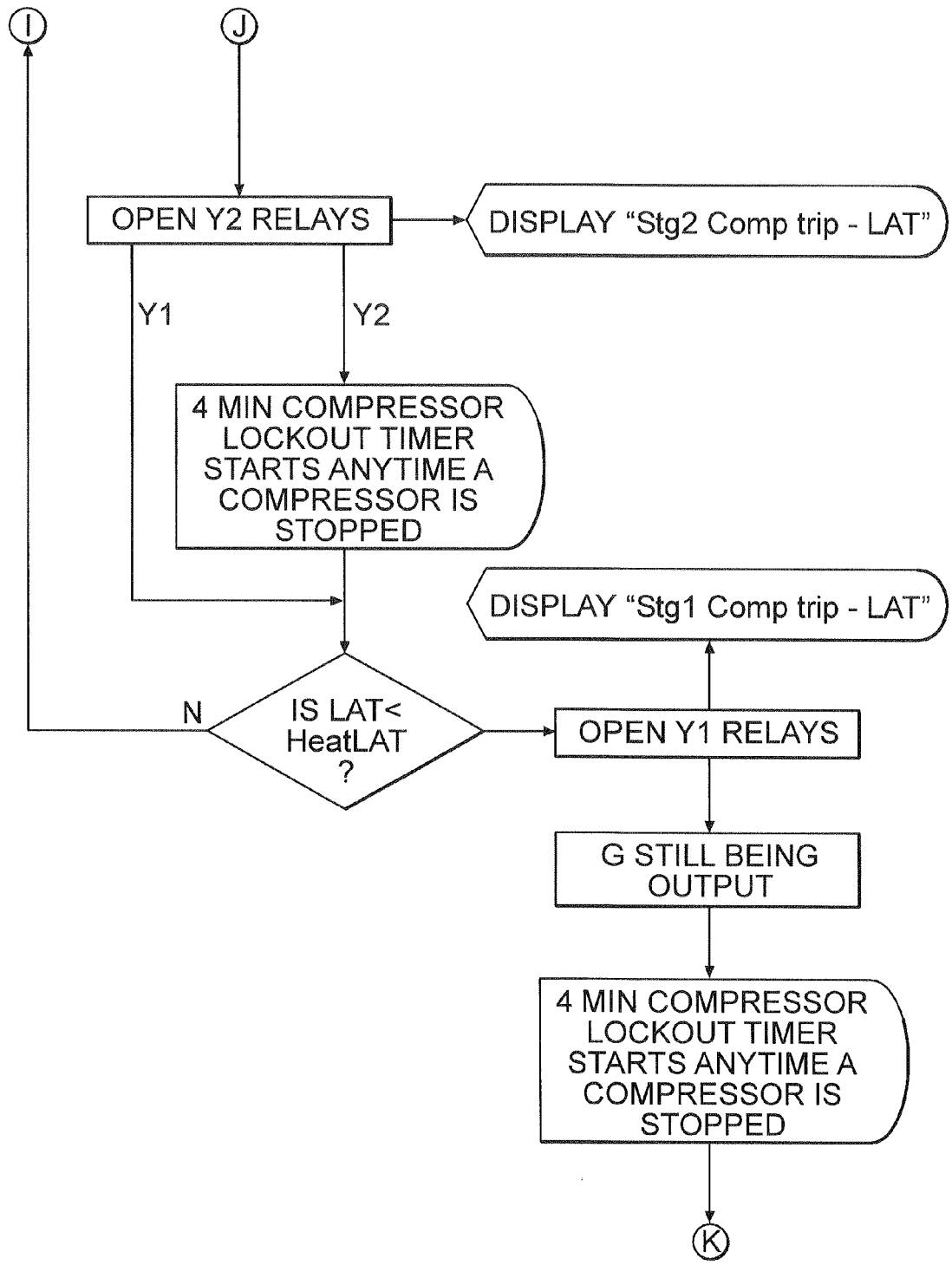
Figure 15C:
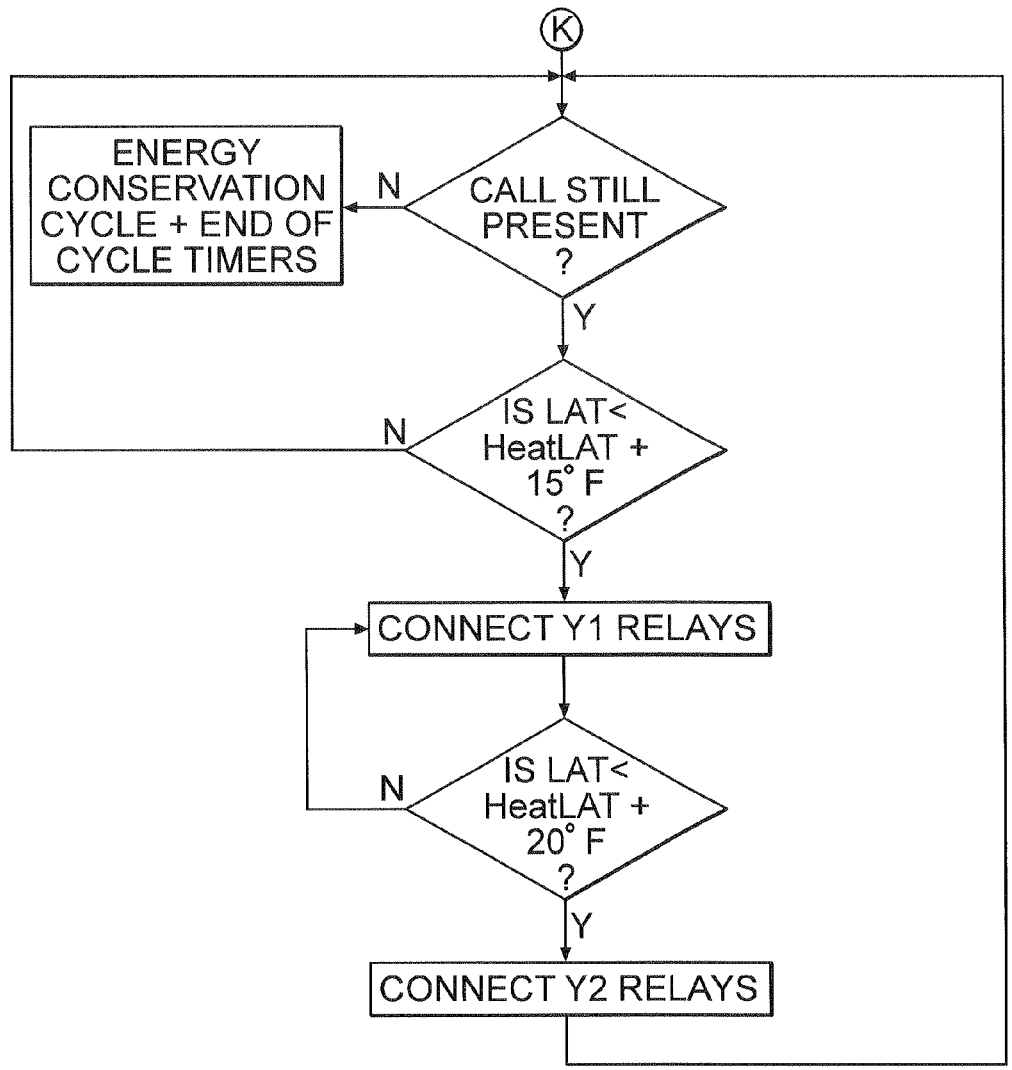

FIGS. 15a-15c illustrate a flowchart of an example embodiment of a method 1500 for performing a heating LAT procedure, in accordance with various aspects of the present invention. While in the heating mode with the heat pump being served, if the LAT rises above the heating LAT setting minus 10 degrees F., then open the relays associated with Y2(*hp*) second stage signal to the condenser, and Y2(*ah*) second stage signal to the furnace/air handler. Also, if the LAT rises above the heating LAT setting, then open the relays associated with Y1(*hp*) first stage signal to the condenser, and Y1(*ah*) first stage signal to the furnace/air handler. While in the heating mode with auxiliary equipment (e.g., a furnace) being served, if the LAT rises above the heating LAT setting minus 10 degrees F., then open the relay associated with the W2 second stage auxiliary or backup heat. Also, if the LAT rises above the heating LAT setting, then open the relay associated with the W1 first stage auxiliary or backup heat. The method 1500 is part of the heating method 2300 of FIGS. 23a-23c.

Figure 16:
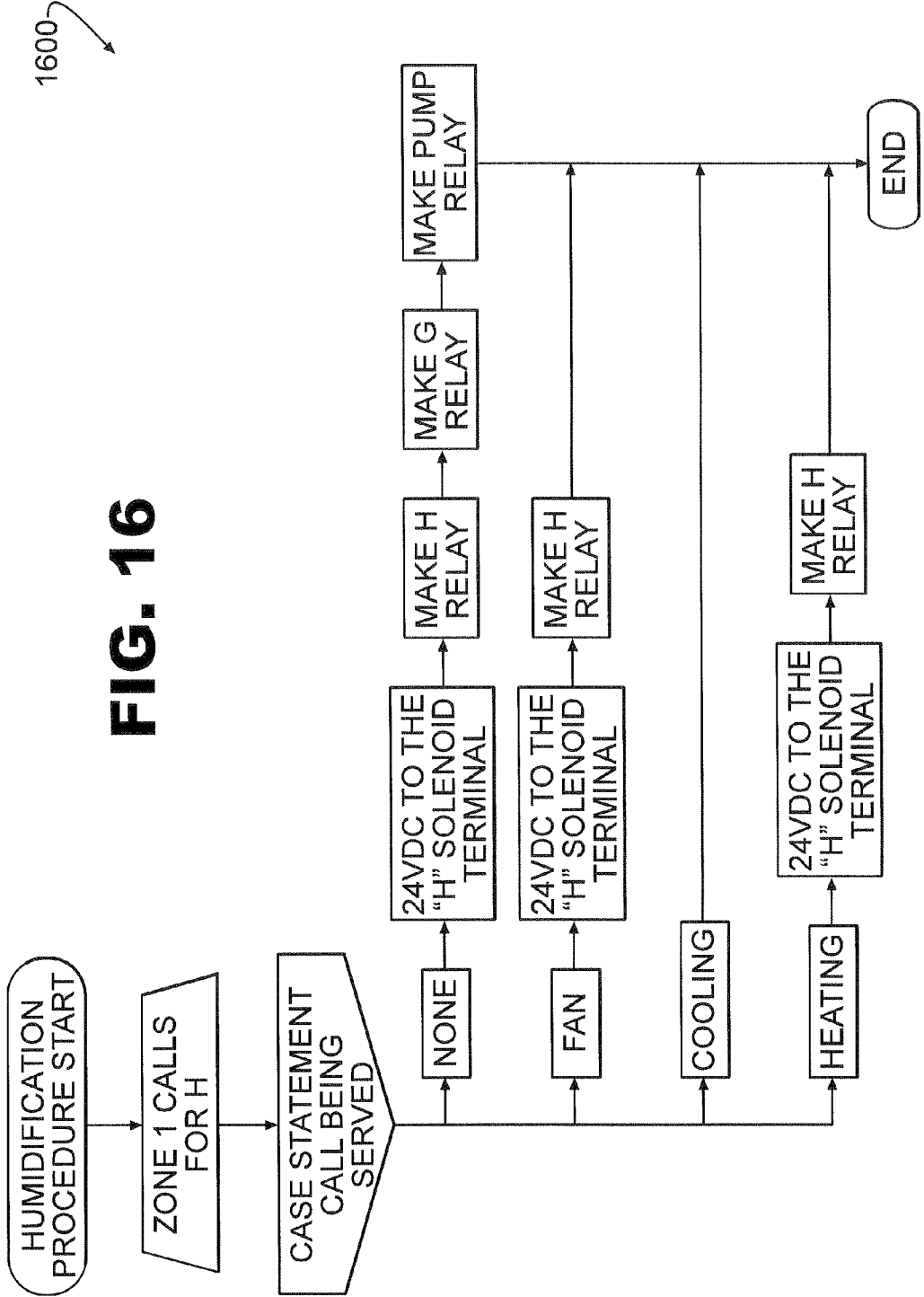
FIG. 16 illustrates a flowchart of an example embodiment of a method for performing a humidification procedure, in accordance with various aspects of the present invention.

FIG. 16 illustrates a flowchart of an example embodiment of a method 1600 for performing a humidification procedure, in accordance with an embodiment of the present invention. In accordance with an embodiment of the present invention, zone 1 will have an "H" terminal on the electronic controller 115 for humidification calls which is for powered humidifiers. Any time there is an "H" call, it will pass directly to the "H" output relay regardless of anything else that is happening on the electronic controller 115. There is also an "H" 24 VDS terminal that goes hot when the "H" output terminal goes hot. This allows humidify calls to be handled from any source. A DC terminal provides for a humidifier damper and also provides a flexible built-in auxiliary relay for use in custom operations sequences.

In accordance with an embodiment of the present invention, an automatic humidification mode is provided. A humidifier is integrated into the HVAC system (i.e., the indoor air quality comfort system) such that a damper is automatically opened when the controller 115 receives a humidification call. An additional solenoid is provided on the control panel 110 to operate the damper via the controller 115 (e.g., see the wiring of solenoid 199 in FIG. 1C). The humidifier is typically located, for example, on the forced air system (e.g., at a furnace) and the damper is located between the humidifier and the ductwork to the forced air system. The open damper allows humidified air to pass into the forced air system such that the humidified air may be distributed to calling zones. The non-proprietary electronic controller automatically closes the humidifier damper when servicing of the zone associated with the humidification zone service call is complete. In this way, a home owner does not have to remember to manually open the damper in the Winter and close the damper in the Spring, for example.

For a de-humidification call, if the electronic controller 115 is currently serving a cooling call, then the electronic controller will turn off the highest stage of the air handler 130. If the electronic controller is idle (not presently serving a call), then when a de-humidification call is received, the electronic controller 115 will activate a first cooling stage of the heat pump 120 and a first stage of the air handler 130 with all dampers open and run for X minutes on and X minutes off where X is pre-defined during setup. In general, the humidity in the air may be decreased by slowing down the fan speed of the air handler 130 on a call for dehumidification from a thermidistat or other humidity monitoring controls. By slowing down the fan, the air is given more contact time with the coil allowing more water to be condensed out of the air.

Figure 17:
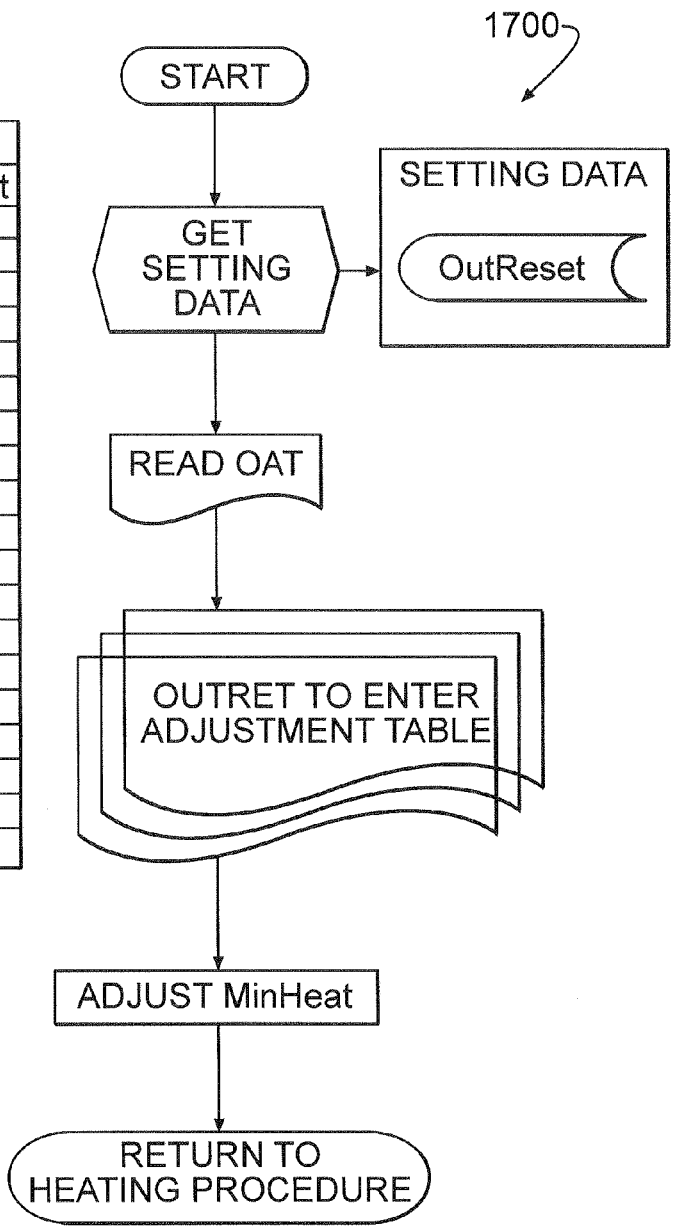
FIG. 17 illustrates a flowchart of an example embodiment of a method for performing outside reset calculations, in accordance with various aspects of the present invention.
Figure 18:
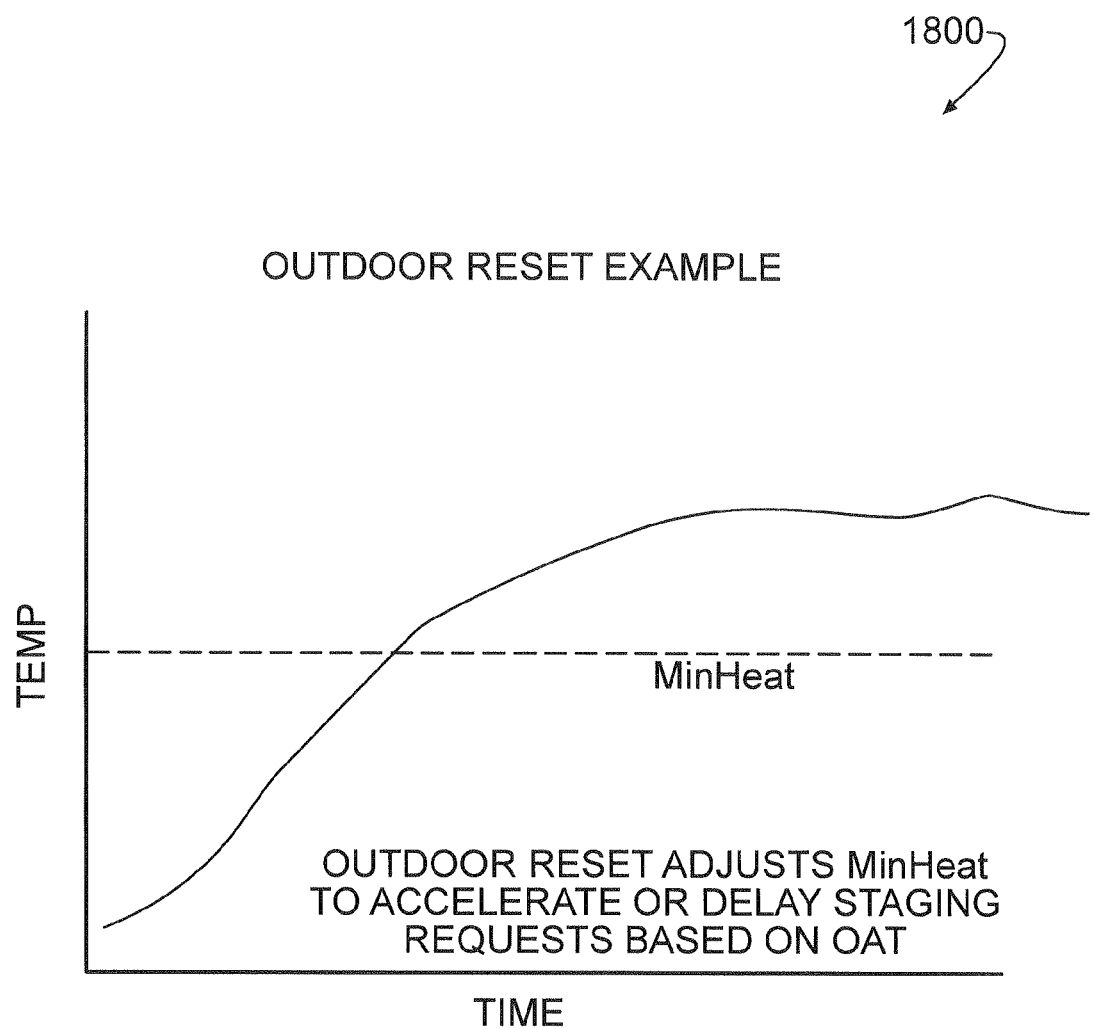
FIG. 18 illustrates a graph of an outdoor reset example using the method of FIG. 17, in accordance with an embodiment of the present invention.

FIG. 17 illustrates a flowchart of an example embodiment of a method 1700 for performing outside reset calculations, in accordance with various aspects of the present invention. The outside reset method 1700 adjusts a minimum heat threshold to accelerate or delay staging requests based on OAT (outside air temperature). FIG. 18 illustrates a graph 1800 of an outdoor reset example using the method 1700 of FIG. 17, in accordance with an embodiment of the present invention.

FIG. 19 illustrates a flowchart of an example embodiment of a method 1900 for performing a cooling stage-up procedure, in accordance with various aspects of the present invention. The method 1900 checks for current stage operation and compares LAT to a threshold value to determine whether or not to stage up during a cooling cycle. The cooling stage-up procedure is a part of the cooling procedure of FIGS. 20a-20b.

Figure 20A:
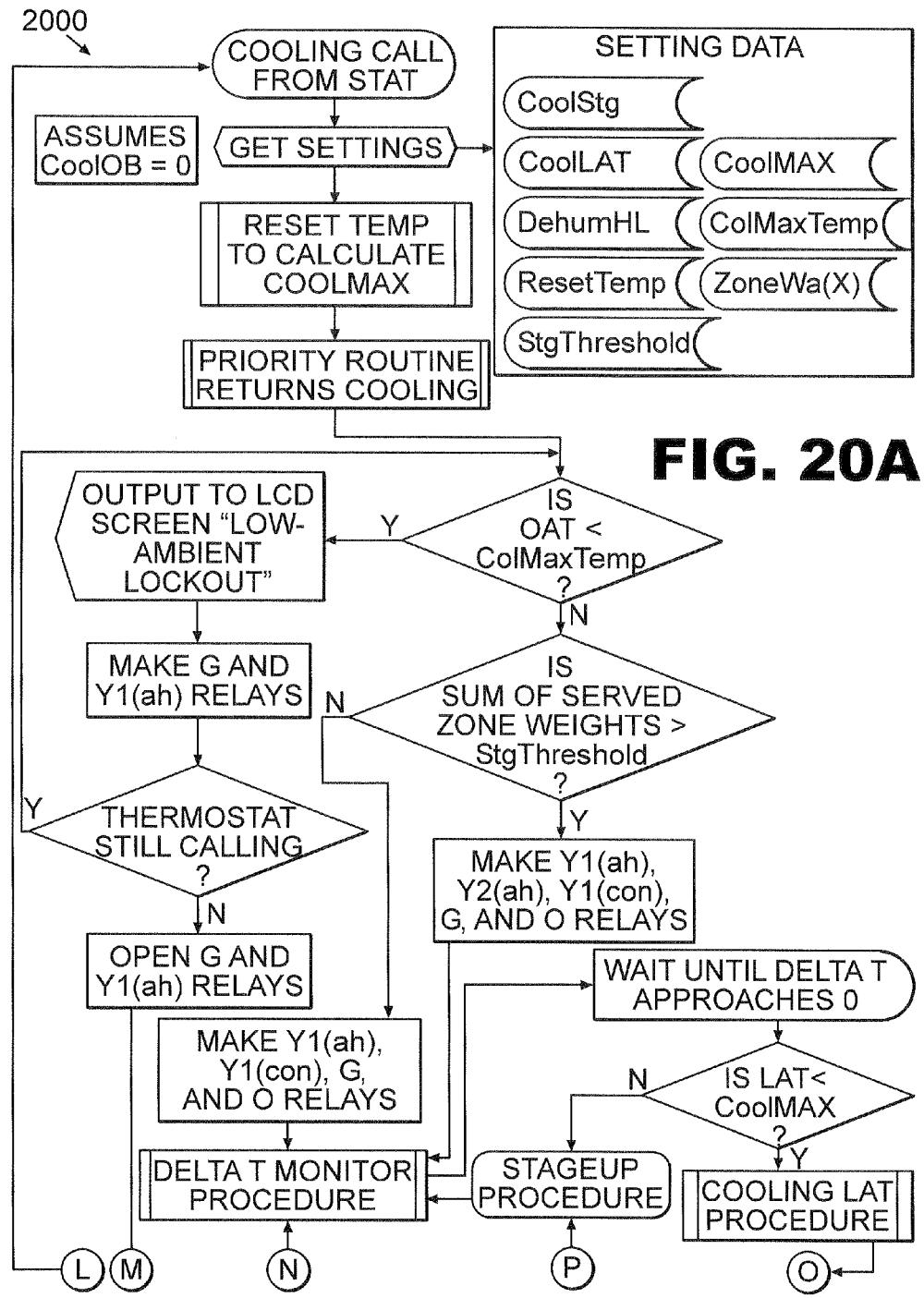
FIGS. 20a-20b illustrate a flowchart of an example embodiment of a method for performing a cooling procedure, in accordance with various aspects of the present invention.
Figure 20B:
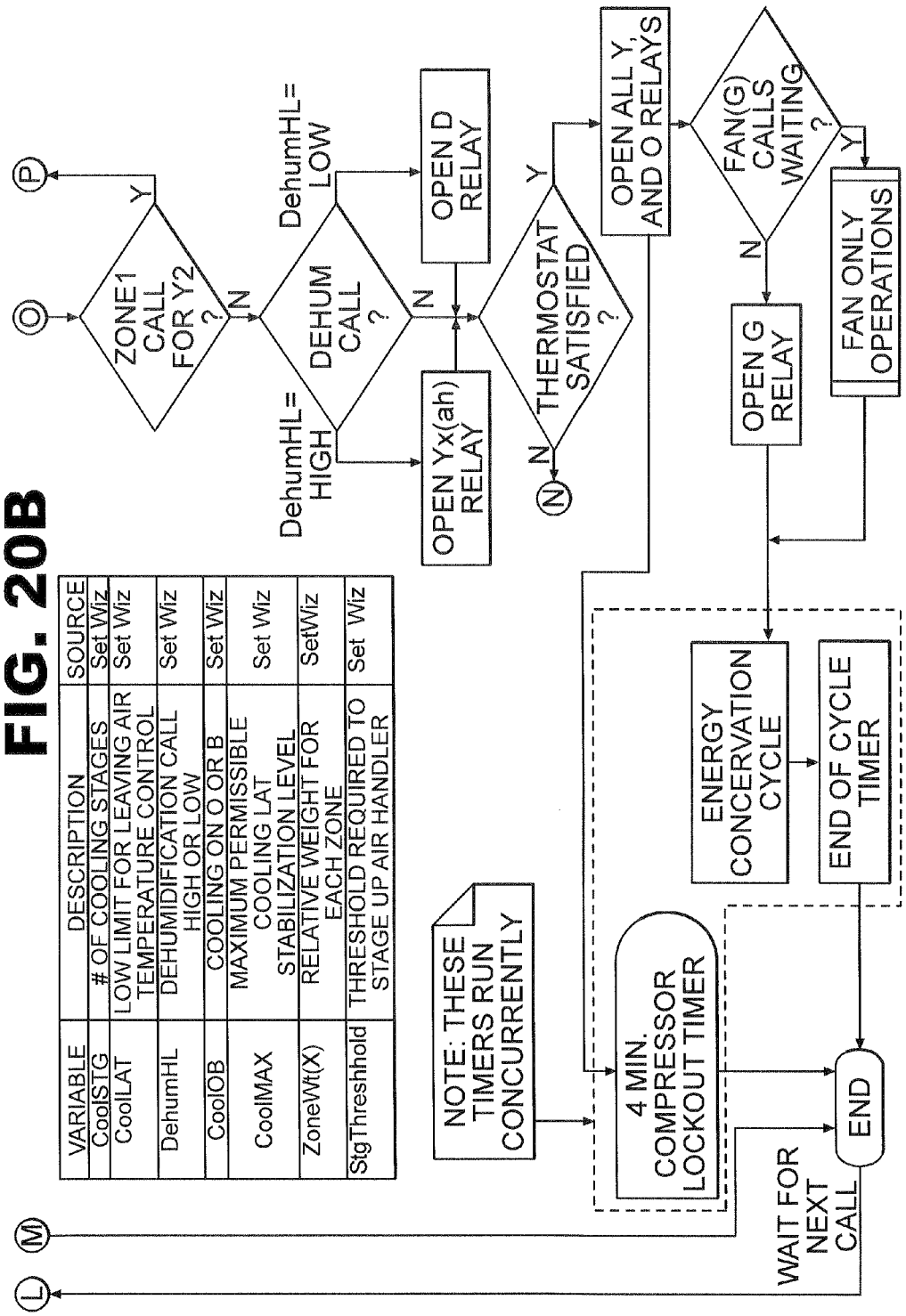

FIGS. 20a-20b illustrate a flowchart of an example embodiment of a method 2000 for performing a cooling procedure, in accordance with various aspects of the present invention. The method 2000 takes into account OAT, LAT, ΔT, zone service calls, the cumulative weighting value, and other parameters as part of providing cooling to the calling zones in an efficient manner.

Figure 21A:
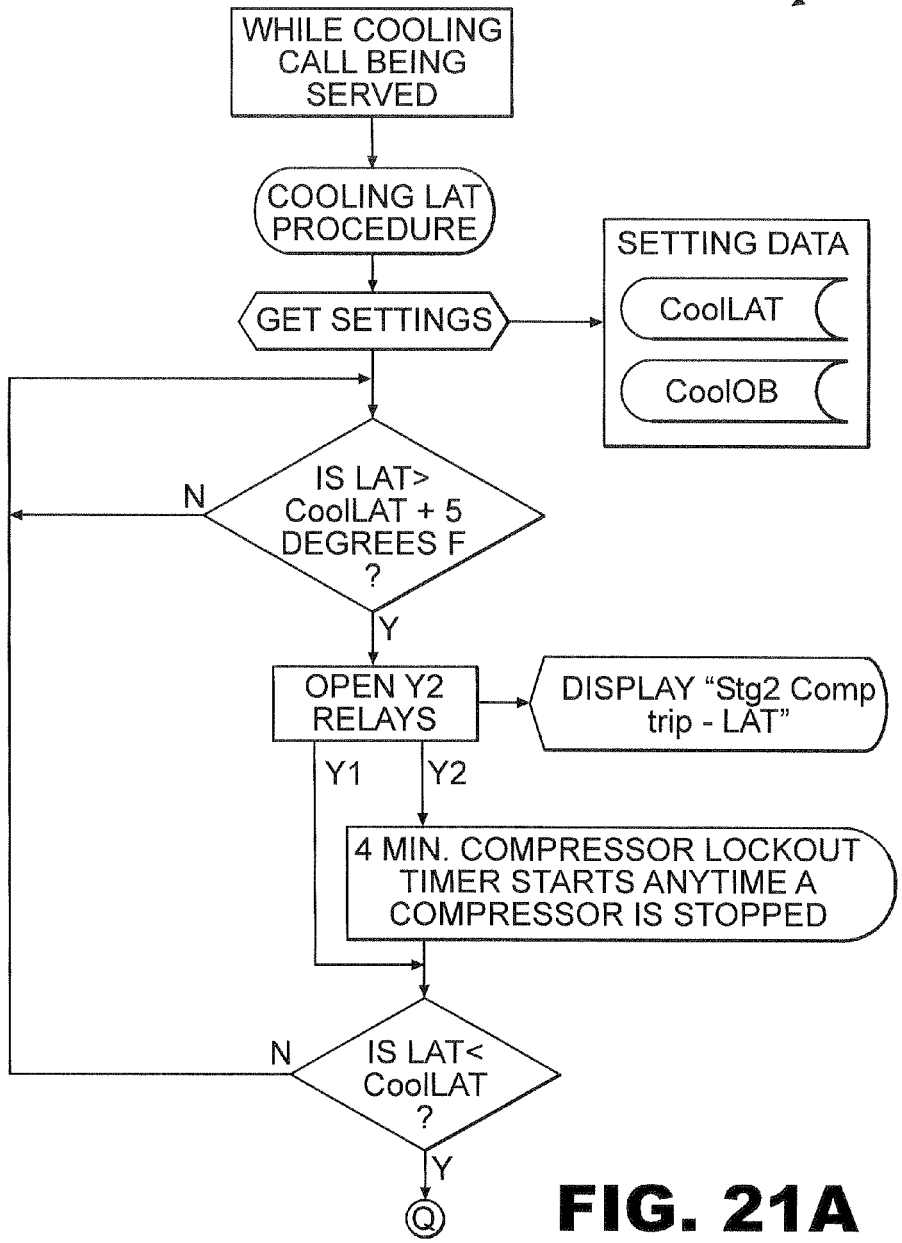
FIGS. 21a-21b illustrate a flowchart of an example embodiment of a method for performing a cooling LAT procedure, in accordance with various aspects of the present invention.
Figure 21B:
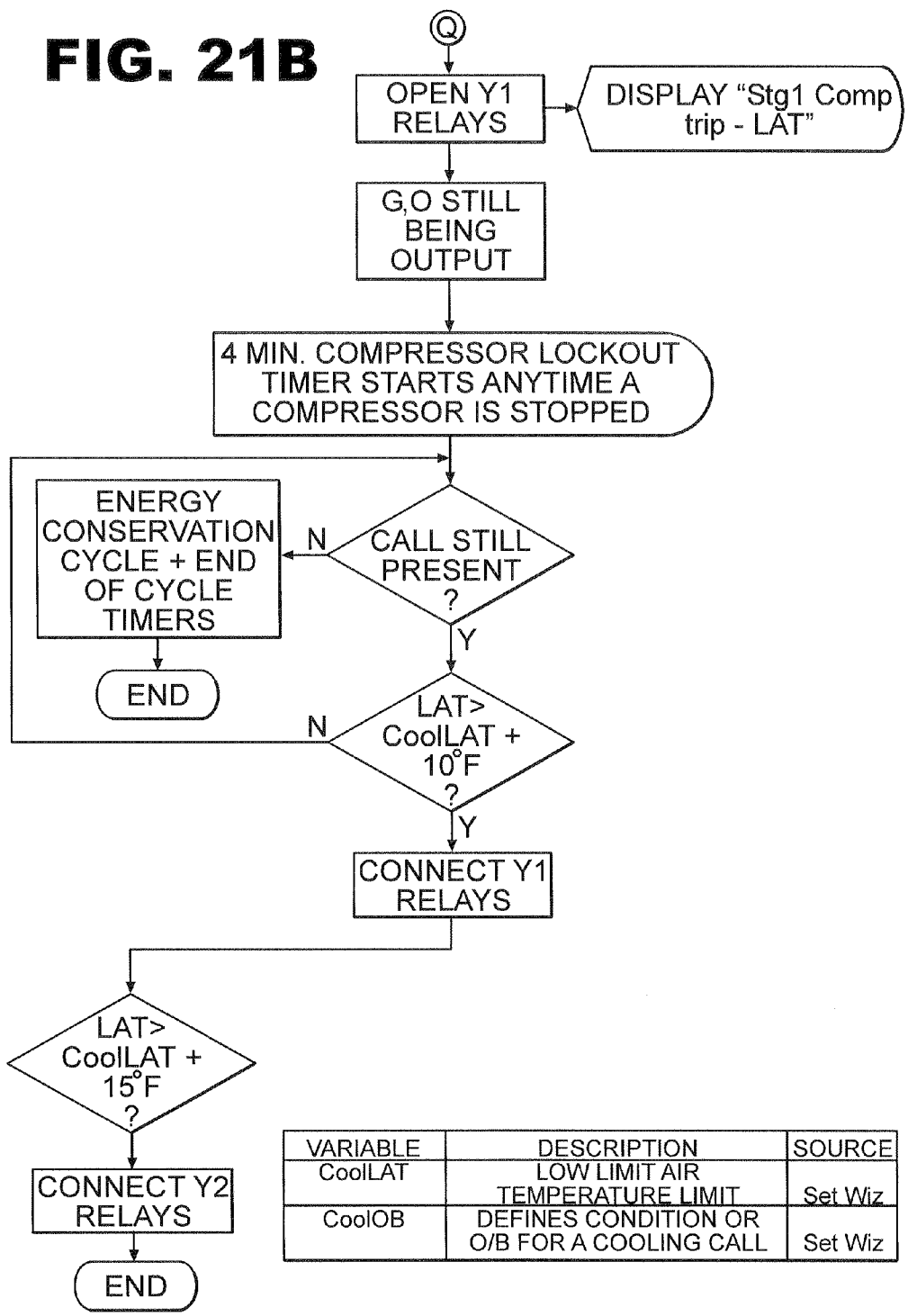

FIGS. 21a-21b illustrate a flowchart of an example embodiment of a method 2100 for performing a cooling LAT procedure, in accordance with various aspects of the present invention. The method 2100 is a part of the cooling method 2000 of FIGS. 20a-20b. While in the cooling mode, if the LAT drops below the cooling LAT setting plus 5 degrees F., then the relays associated with the Y2($hp$) second stage cooling signal to the condenser and the Y2($ah$) second stage cooling signal to the furnace/air handler are opened. If the LAT drops below the cooling LAT setting, then the relays associated with the Y1($hp$) first stage cooling signal to the condenser and the Y1($ah$) first stage cooling signal to the furnace/air handler are opened.

Figure 22:
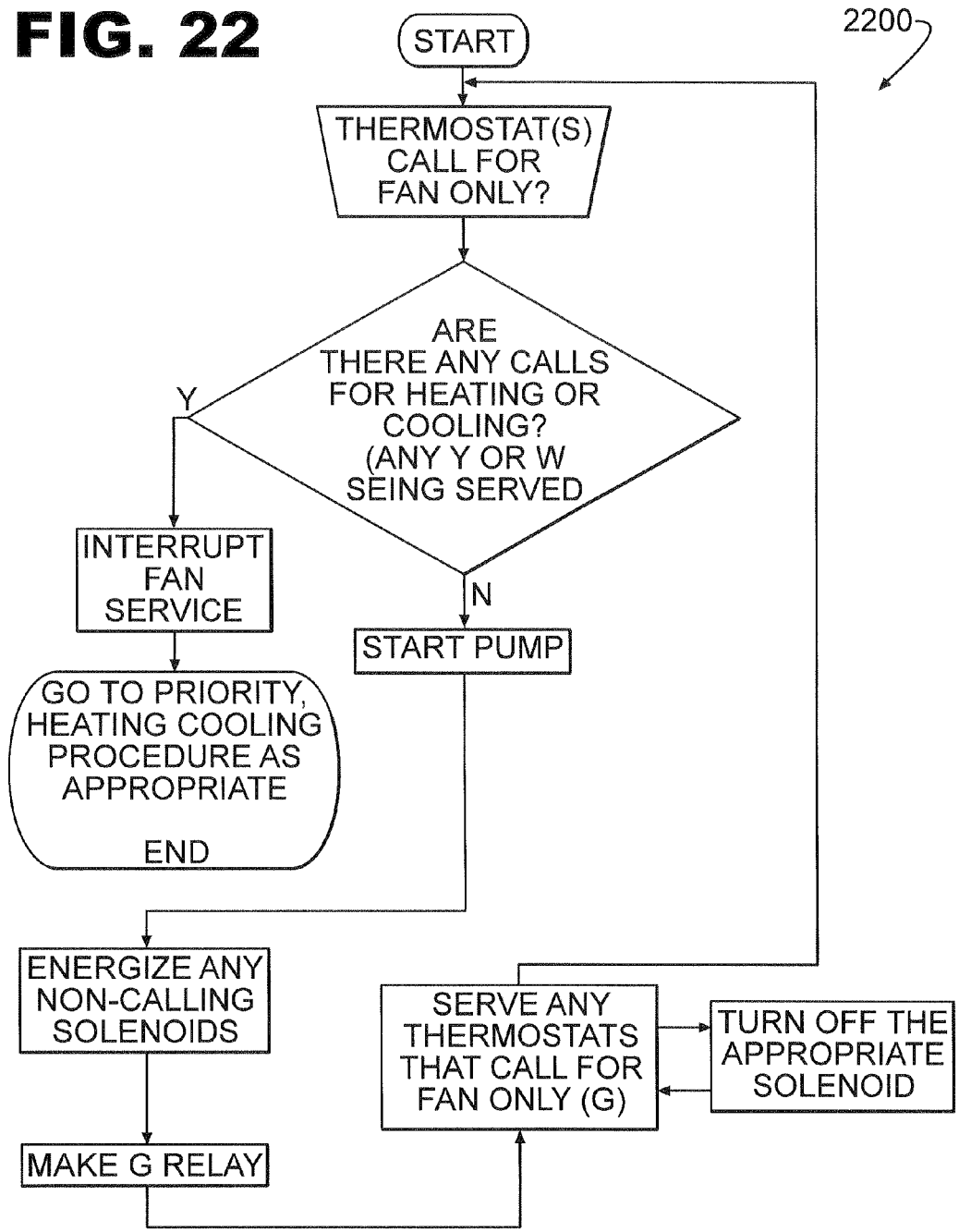
FIG. 22 illustrates a flowchart of an example embodiment of a method for performing fan-only operations, in accordance with various aspects of the present invention.

FIG. 22 illustrates a flowchart of an example embodiment of a method 2200 for performing fan-only operations, in accordance with various aspects of the present invention. In this method 2200, the fan is activated for blowing air to the appropriate calling zones. No heating or cooling is being performed.

Figure 23A:
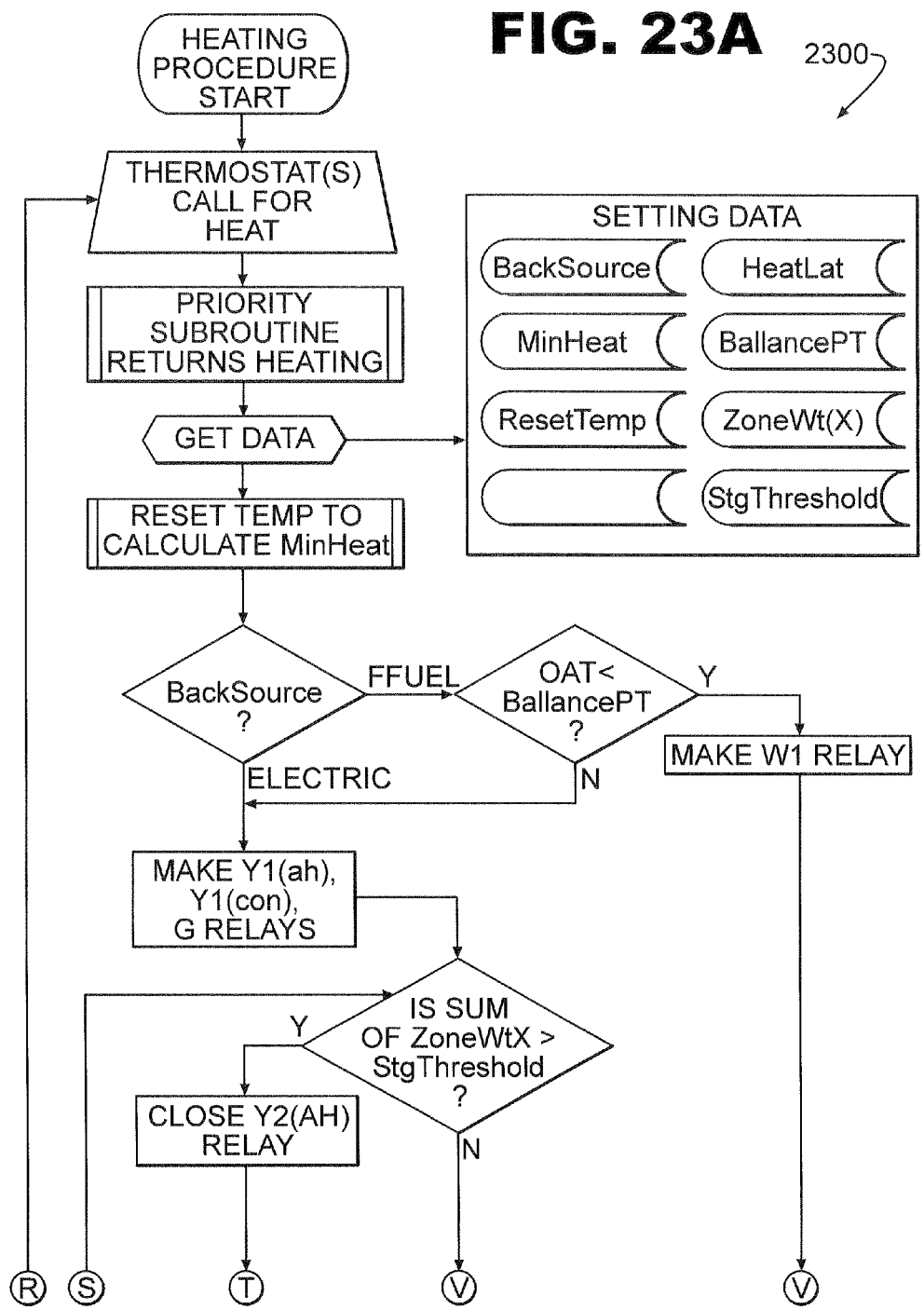
Figure 23B:
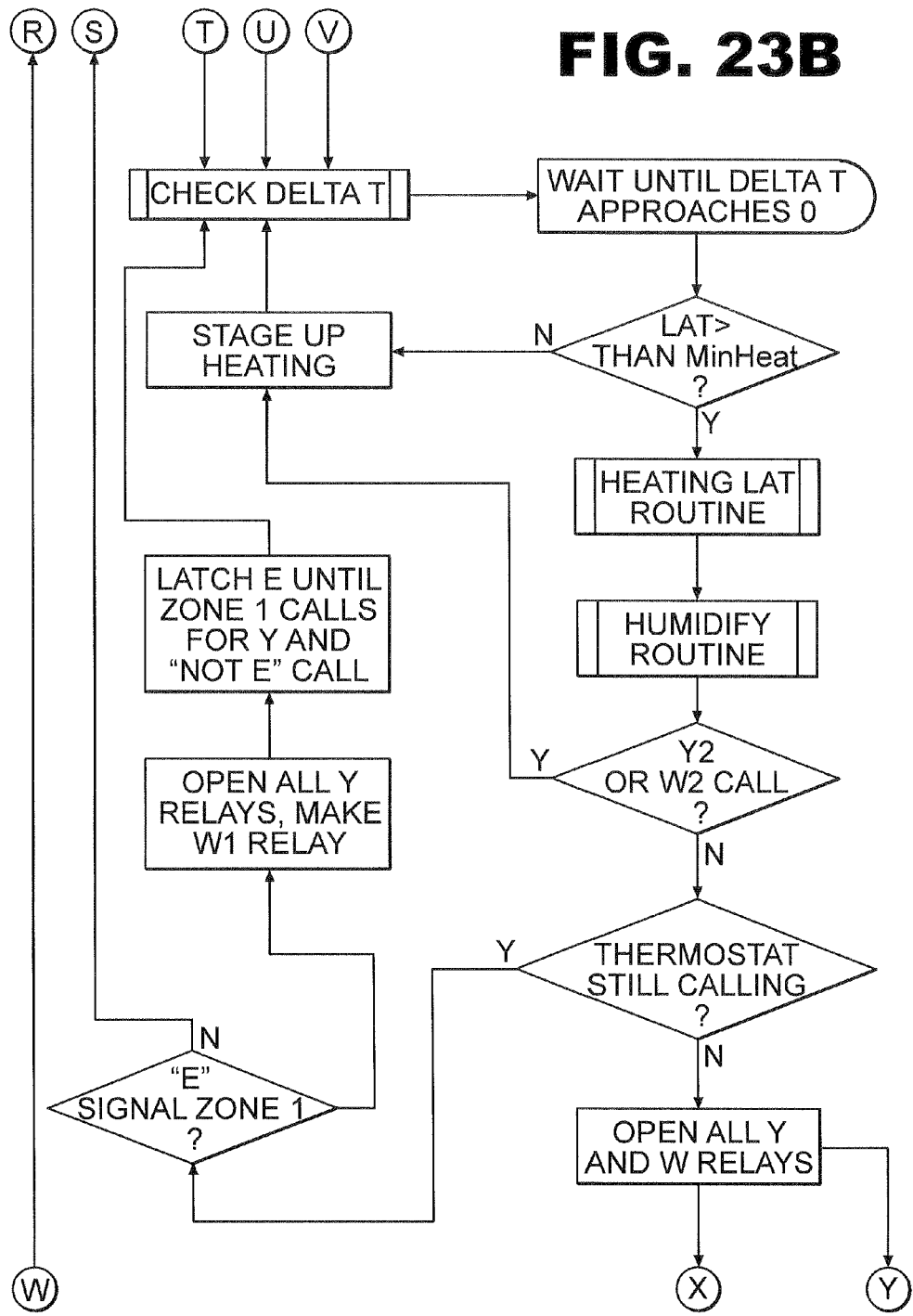

FIGS. 23a-23c illustrate a flowchart of an example embodiment of a method 2300 for performing a heating procedure, in accordance with various aspects of the present invention. The method 2300 takes into account OAT, LAT, ΔT, zone service calls, the cumulative weighting value, and other parameters as part of providing heating to the calling zones in an efficient manner.

Figure 24A:
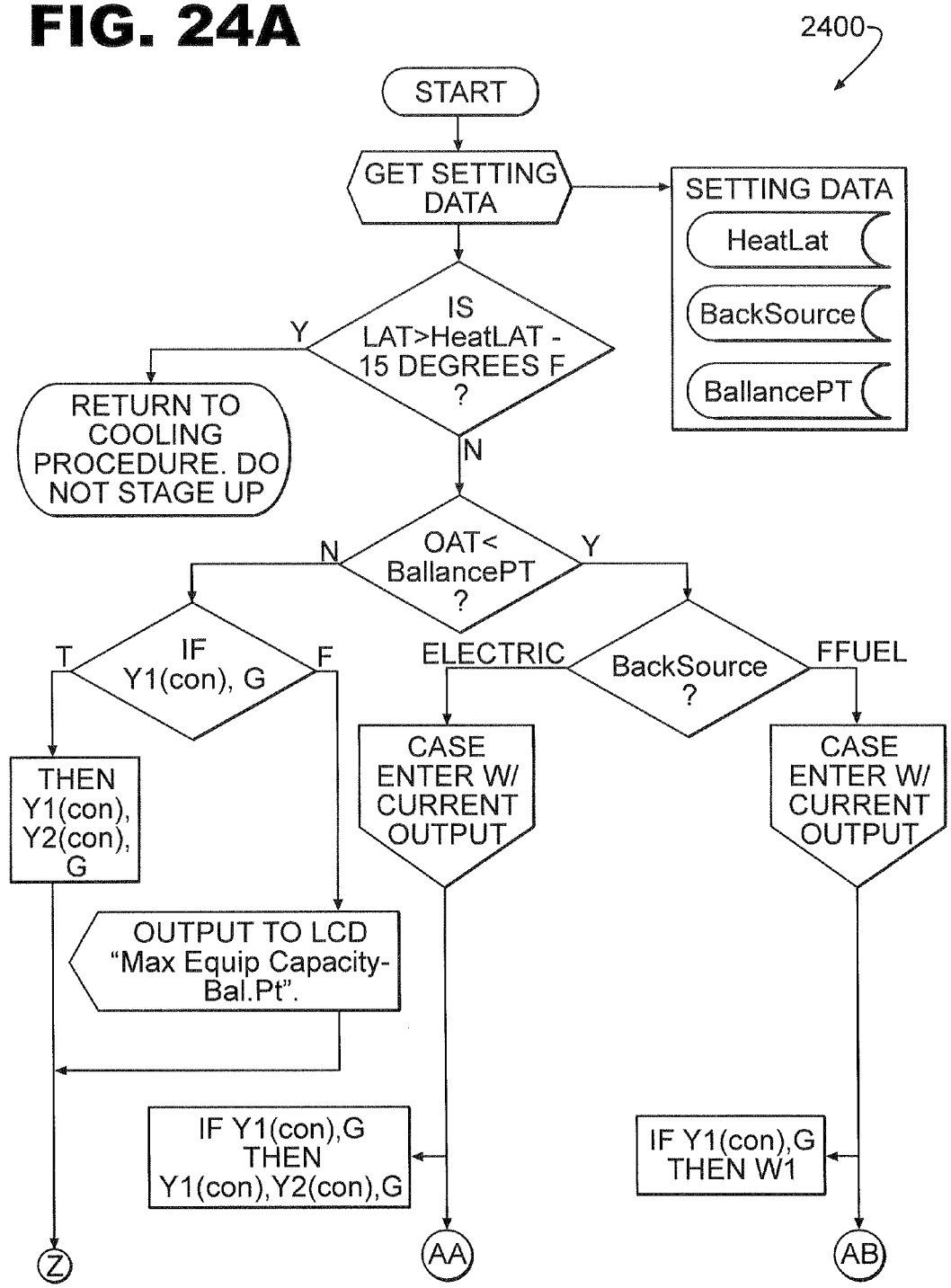
FIGS. 24a-24b illustrate a flowchart of an example embodiment of a method for performing a heating stage-up procedure, in accordance with various aspects of the present invention.
Figure 24B:
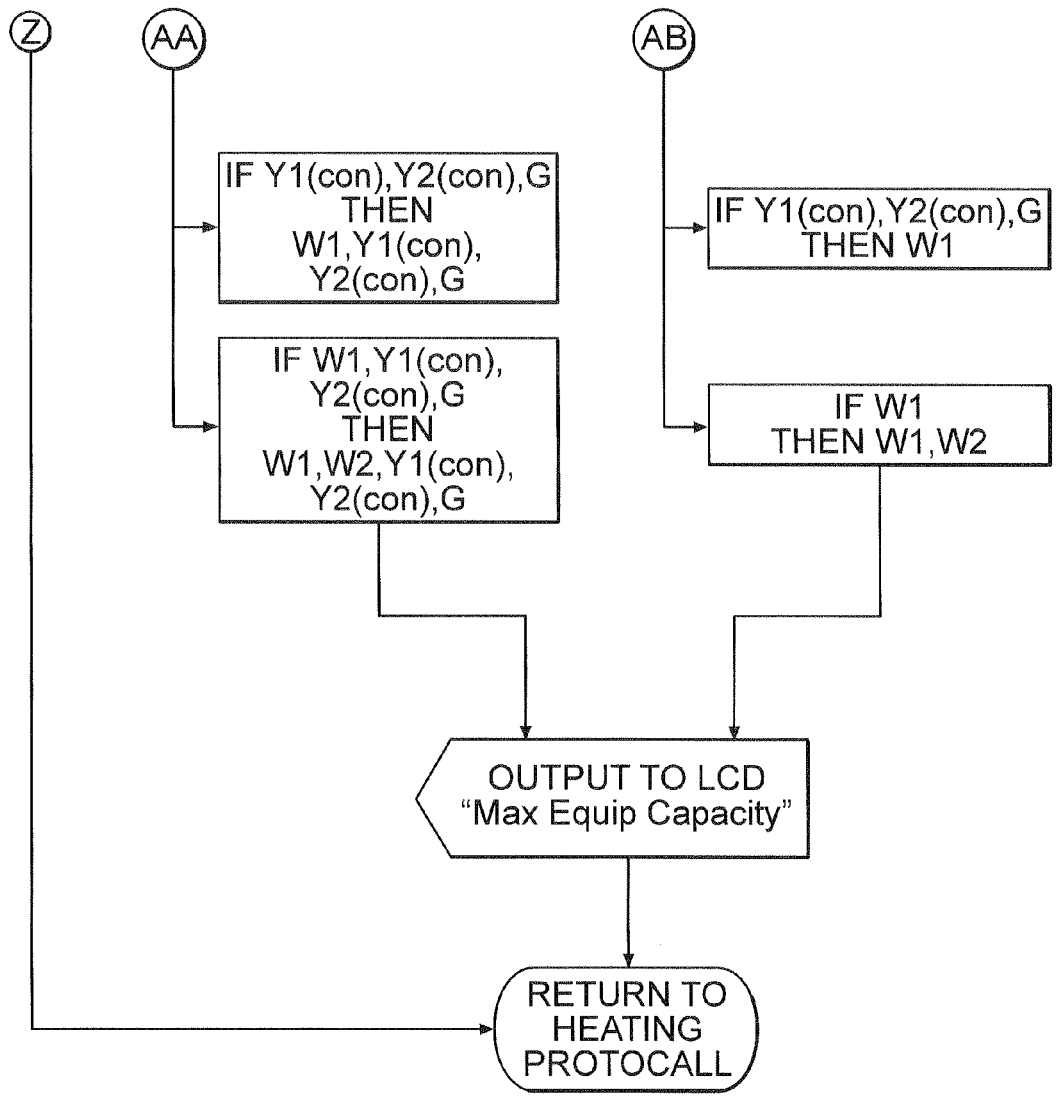

FIGS. 24a-24b illustrate a flowchart of an example embodiment of a method 2400 for performing a heating stage-up procedure, in accordance with various aspects of the present invention. The method 2400 checks for current stage operation and compares LAT to a threshold value and OAT to a threshold value to determine whether or not to stage up during a heating cycle. The method 2400 is a part of the method 2300 of FIGS. 23a-23c.

A geo-thermal heat pump (also known as a ground source heat pump) is a heating and/or cooling system that transfers heat to and/or from the ground. The ground is used as a source of heat in the cold weather months and as a heat sink in the warm weather months. In general, fluid-filled geo-thermal field loop piping (also known as a loop field) is buried in the ground having fluid input and output connections to the geo-thermal heat pump equipment. The geo-thermal heat pump equipment pumps fluid (e.g., a refrigerant) through the loop field such that heat may be exchanged between the loop field and the ground. The geo-thermal heat pump system may extract heat from an internal environment (e.g., a house) to cool the internal environment and dissipate the extracted heat into the ground via the loop field. Similarly, the geo-thermal heat pump system may extract heat from the ground via the loop field and pump the heat into the internal environment to heat the internal environment. In general, the loop field is installed deep enough in the ground where the ground temperature is fairly stable at a temperature somewhere between, typically, 50° F. and 60° F. (e.g., 55° F.).

In general, for geo-thermal heat pump systems, as long as enough time has elapsed for heat exchange to occur between the loop field and the ground during operation, then the loop temperature stays relatively constant (e.g., at about 55° F.). However, if the internal environment (e.g., a house) or the external environment (outdoors) is very hot (or cold), it can take a long time to bring the zone temperatures within the internal environment to a desired comfort level. This can cause the loop temperature to deviate significantly from 55° F., for example, resulting in the heating (or cooling) process becoming considerably less efficient. In such a situation, it may be desirable to activate auxiliary HVAC equipment to help compensate. In accordance with an embodiment of the present invention, the loop temperature is monitored, allowing HVAC staging decisions to be made based, at least in part, on loop temperature.

Figure 25:
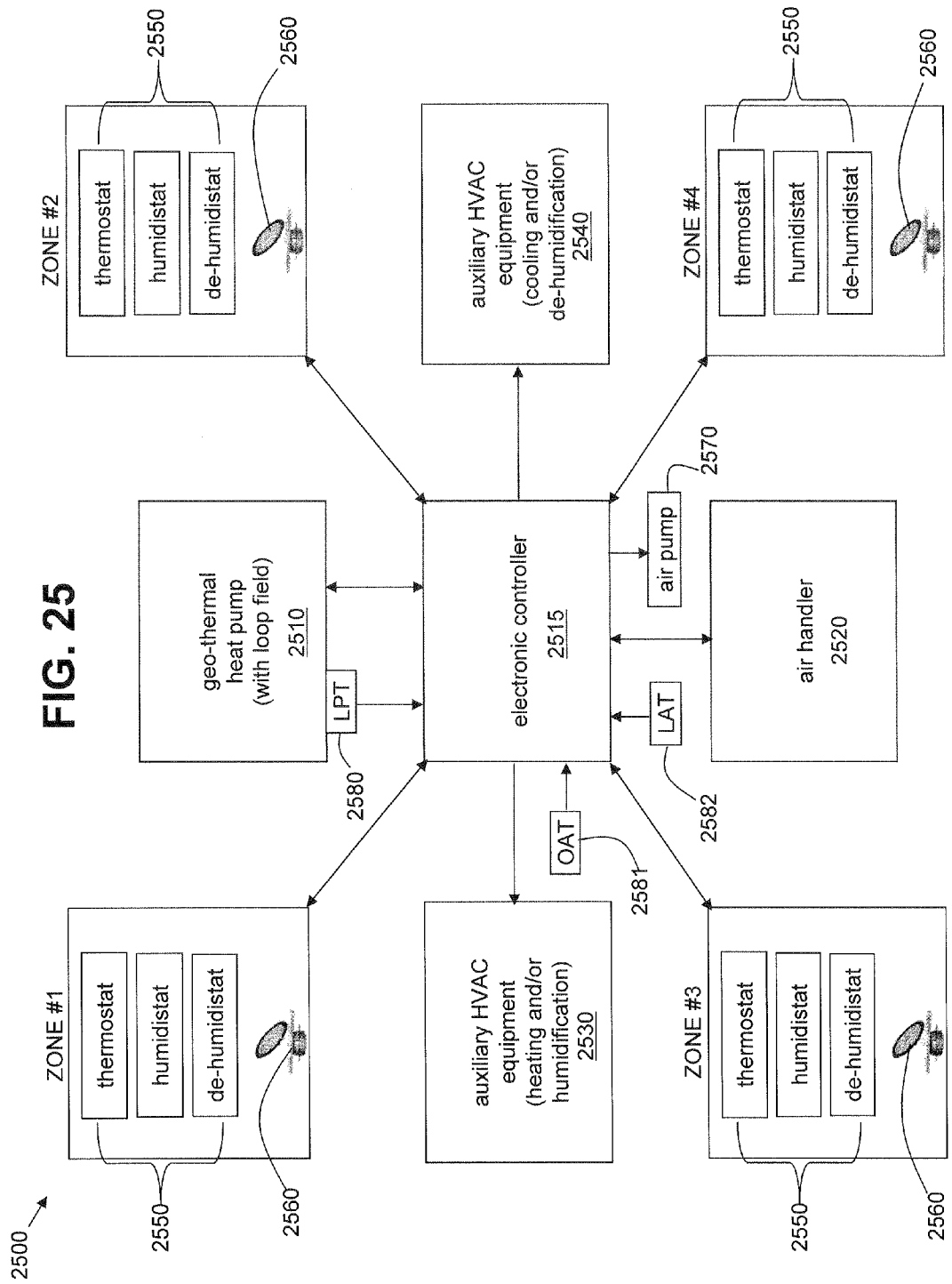
FIG. 25 illustrates a schematic block diagram of a second example embodiment of a system to control environmental parameters of pre-defined zones within a first environment using a geo-thermal heat pump.

FIG. 25 illustrates a schematic block diagram of a second example embodiment of a system 2500 to control environmental parameters of pre-defined zones within a first environment using a geo-thermal heat pump 2510. At the center of the system 2500 is an electronic controller 2515 which is similar to the electronic controller 115 described previously herein. The electronic controller 2515 is configured to interface with a control panel 110 as discussed previously herein, in accordance with an embodiment of the present invention. However, for purposes of discussion herein, when the electronic controller 2515 is discussed, it may be assumed that the electronic controller 2515 interfaces to other parts of the system 2500 through the control panel 110. However, in accordance with another embodiment of the present invention, the control panel 110 and the electronic controller 2515 are integrated and form a single device.

The system 2500 includes a geo-thermal heat pump 2510 operatively connected to the electronic controller 2515, and an air-handler 2520 operatively connected to the electronic controller 2515. The geo-thermal heat pump 2510 has at least two stages, in accordance with an embodiment of the present invention. Also, the air handler has at least two stages (e.g., at least two fan speeds), in accordance with an embodiment of the present invention. The air handler may be multi-speed or variable speed. Such geo-thermal heat pumps and air handlers are well known in the art.

The system further includes auxiliary HVAC heating and/or humidification equipment 2530 and auxiliary HVAC cooling and/or de-humidification equipment 2540, both operatively connected to the electronic controller 2515. The geo-thermal heat pump 2510 and the auxiliary HVAC equipment 2530 and 2540 are operatively connected to the air handler 2520 such that cooled or heated air from the geo-thermal heat pump 2510 and the auxiliary HVAC equipment 2530 and 2540 may be fed into the duct work of the first environment by the air handler 2520. The auxiliary HVAC equipment 2530 may include, for example, a gas furnace, a propane heater, an oil furnace, a resistive heating strip, and/or a humidifier, in accordance with various embodiments of the present invention. The auxiliary HVAC equipment 2540 may include, for example, an air conditioning unit and/or a de-humidifier in accordance with an embodiment of the present invention. Such auxiliary HVAC equipment is well known in the art.

The system 2500 also includes environmental zone sensor devices (e.g., a thermostat, a humidistat, and a de-humidistat) 2550 located within zones to be heated and/or cooled. The zone sensor devices 2550 are operatively connected to the electronic controller 2515 such that the electronic controller 2515 may electronically read the sensor measurements provided by the zone sensor devices 2550. The system also includes duct work air (pneumatic) dampers 2560 which are operatively connected to the electronic controller 2515 via an air pump 2570 and are associated with the duct work leading to the various zones. The electronic controller 2515 controls the opening and closing of the air dampers 2560 in dependence on zones that are calling for heating or cooling. In accordance with other embodiments of the present invention, the dampers may be of a different type such as, for example, an electric damper driven by an electric motor where the electronic controller is configured to activate the electric motor.

The system 2500 further includes several temperature sensors including a loop temperature (LPT) sensor 2580, an outdoor air temperature (OAT) sensor 2581, and a leaving air temperature (LAT) sensor 2582 which are operatively connected to the electronic controller 2515. The LPT sensor 2580 measures the loop temperature of the loop field of the geo-thermal heat pump 2510 and reports the loop temperature to the electronic controller 2515. In accordance with an embodiment of the present invention, the LPT sensor 2580 is mounted at the fluid return entrance where the loop field enters the equipment of the geo-thermal heat pump 2510.

The OAT sensor 2581 measures the outdoor air temperature external to the zones (e.g., external to a house having the zones) and reports the outdoor air temperature to the electronic controller 2515. The LAT sensor 2582 measures the temperature of the air leaving the air handler 2520 (i.e., the leaving air temperature) and reports the leaving air temperature to the electronic controller 2515. The electronic controller 2515 may be configured (e.g., programmed) to make equipment staging decisions based on any, all, or any combination or sub-combination of these measured temperatures (i.e., LPT, OAT, LAT), in accordance with various embodiments of the present invention. The electronic controller is configured to allow an HVAC contractor/practitioner to set threshold values (high or low) to which the measured temperatures can be compared to trigger staging decisions. Threshold values may also be set for other parameters such as cumulative weighting value and airflow, for example, as discussed herein.

Figure 26:
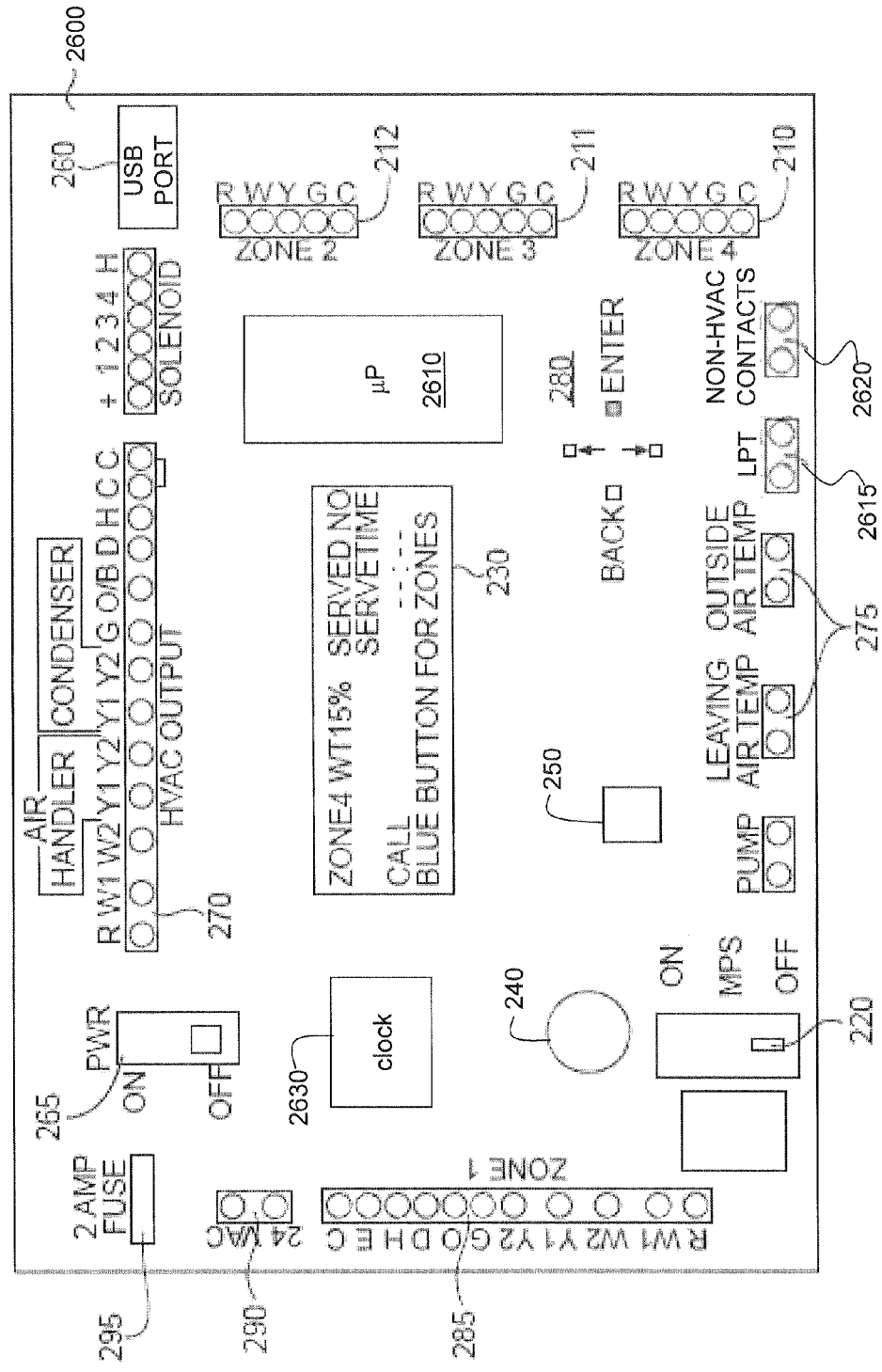
FIG. 26 illustrates an example embodiment of an electronic controller used in the system of FIG. 25.

FIG. 26 illustrates an example embodiment of an electronic controller 2515 used in the system 2500 of FIG. 25. The electronic controller 2515 is similar to the electronic controller 115 described previously herein, but includes some differences. The electronic controller 2515 comprises a circuit board 2600 with various components and devices mounted to the circuit board 2600 including terminals (e.g., 210), switches (e.g., 220), a programmable microprocessor 2610, an LCD display device 230, resistors, capacitors (e.g., 240), integrated circuit chips (e.g., 250), as well as other components.

The power switch 265 is used to control 24 VAC power to the control panel 110. The HVAC outputs 270 are the dry contacts to control the HVAC equipment (e.g., both the geo-thermal heat pump and the auxiliary HVAC equipment). The terminals 210, 211, and 212 are the thermostat inputs for zone #4, zone #3, and zone #2, respectively. The sensor inputs 275 are the inputs for the LAT sensor and OAT sensor. The sensor inputs 2615 are the inputs for the LPT sensor. Control buttons 280 provide a programming interface with components of the controller 2515. The switch 220 is used to control power for the micro pump (air pump device 2570). The zone #1 input terminal 285 accepts inputs from any 24 VAC thermostats (heat pump or heat/cool). The 24 VAC power input 290 is provided via transformer connections "R" and "C". The 2-amp fuse 295 protects the board 2600 against thermostat shorts.

The electronic controller 2515 also includes a real-time clock 2630. In accordance with an embodiment of the present invention, the clock 2630 is used by the electronic controller 2515 to keep track of a total service time and the service times associated with each zone. The electronic controller 2515 is configured to derive a time-out signal from the clock 2630 whenever a calling zone exceeds a pre-defined service time. The time-out signal may be used to make staging decisions by the electronic controller 2515, in accordance with an embodiment of the present invention.

For example, a time-out threshold of 15 minutes is set in the electronic controller 2515. The electronic controller 2515 is configured to track not only the total servicing time, but also the servicing time of each individual zone. At time zero, the system 2500 begins servicing zone #1 in response to a service call from zone #1 and the servicing time is tracked by the electronic controller 2515 using the clock 2630. After 10 minutes, a service call is received by the electronic controller 2515 from zone #2, and the system 2500 begins servicing zone #2 in addition to zone #1. After 13 minutes, the servicing of zone #1 is completed. After 17 minutes, the servicing of zone #2 is completed. Therefore, zone #1 was serviced for 13 minutes and zone #2 was serviced for 7 minutes. The total servicing time was 17 minutes.

If, after 15 minutes (the time-out threshold) zone #1 and zone #2 were not yet finished being serviced, then the electronic controller 2515 would have generated a time-out signal and the electronic controller 2515 would command the system 2500 to stage up in response to the time-out signal in order to finish servicing zone #1 and zone #2 in a timely manner. However, in the example above, the servicing of zone #1 was completed in 13 minutes (before the 15 minute threshold was reached) and the servicing of zone #2 was completed in 7 minutes (before the 15 minute threshold was reached), even though the total continuous servicing time was 17 minutes. Therefore, a time-out signal was not generated and the system 2500 was not commanded to stage up. That is, the present staging was adequate to finish servicing zone #2 in a timely manner. As such, the system 2500 is commanded to stage up only when extra heating or cooling capacity is truly needed based on the set time-out threshold. Also, the real-time clock 2630 is used to facilitate the logging of data in an easy to access format.

The electronic controller 2515 further includes a USB (universal serial bus) port 260. The USB port 260 allows a personal computer (PC), for example, to interface to the electronic controller 2515 as described previously herein. Furthermore, the USB port 260 allows communication with a flash drive plugged into the USB port 260. In accordance with an embodiment of the present invention, when a flash drive is plugged into the USB port 260, the electronic controller 2515 will look for an updated hex file on the flash drive. Upon finding an updated hex file, the electronic controller 2515 will ask (e.g., via the LCD display device 230) if the user wants to upgrade the software of the electronic controller 2515 and allow the user to respond. If a hex file is not found on the flash drive, the electronic controller 2515 will ask if the user wants to download the data log.

The electronic controller 2515 further includes non-HVAC dry contacts 2620 which allow interfacing to at least one dry contract relay on the control panel 110. The relay on the control panel 110 has associated normally open (NO)/normally closed (NC) and common terminals and may be used to provide the system 2500 with the ability to interact with non-HVAC systems outside of the system 2500. The operation of the relay is programmable during the set up process. Software on the electronic controller 2515 allows monitoring of various parameters, allowing the relay to be switched or activated on any of, for example, a particular call or any call from any zone, any particular output from the system 2500, loop temperature (LPT), outside air temperature (OAT), leaving air temperature (LAT), a particular zone being served, a time of day (e.g., 2 μm to 4 μm), or any particular time parameter (e.g., 5 minutes per hour).

Figure 29:
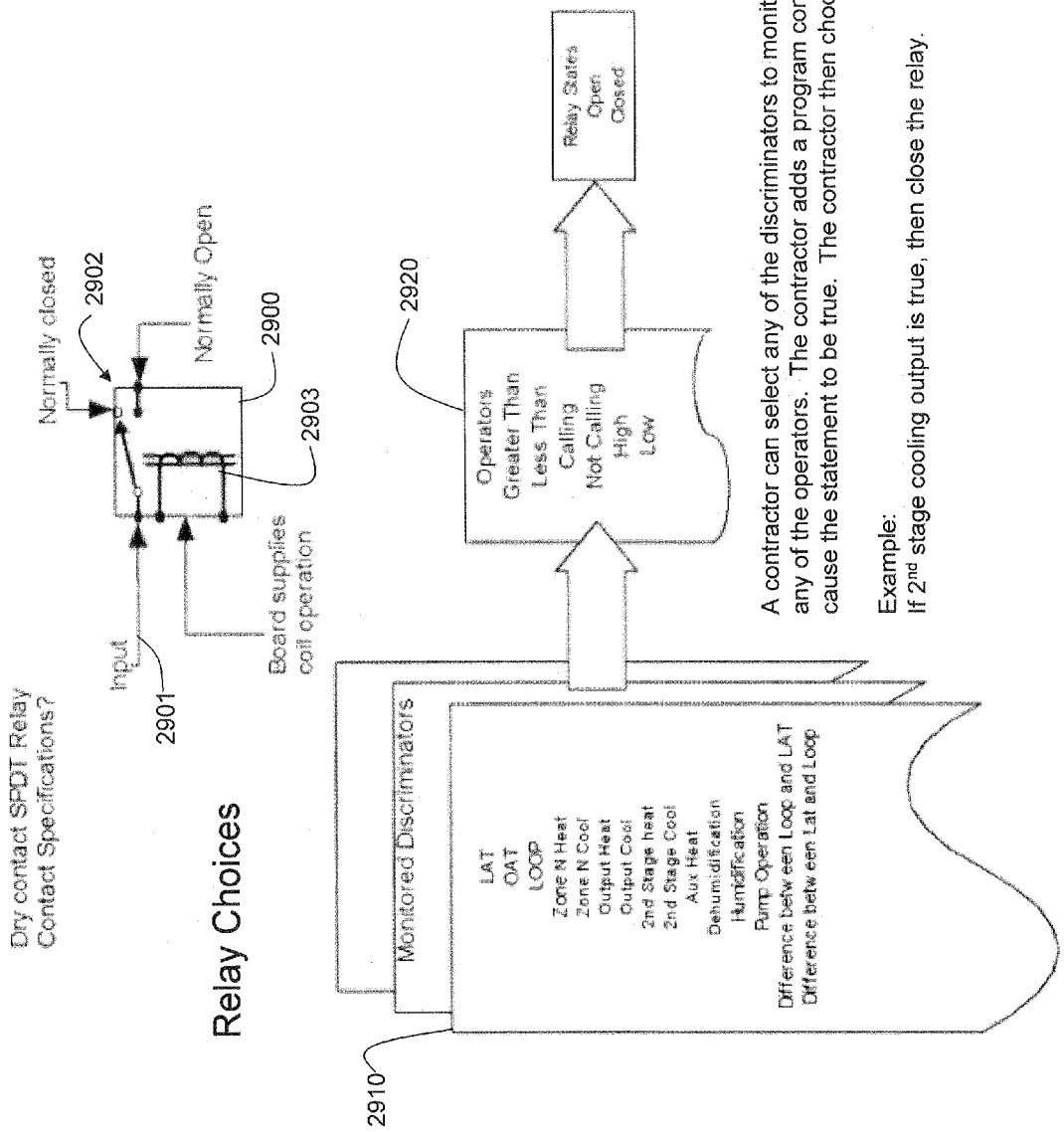
FIG. 29 illustrates an example embodiment of a dry contact relay and dry contact relay choices.

FIG. 29 illustrates an example embodiment of a dry contact relay 2900 and dry contact relay choices (monitored discriminators 2910 and operators 2920) that may be selected and conditioned by a contractor setting up the system. The relay 2900 has an input 2901 and a switchable output 2902. The relay 2900 includes a coil 2903 that is activated by a signal from the electronic controller 2515 from the dry contacts 2620 to open and close the switchable output 2902.

For example, a user may want to have the window blinds of a particular zone automatically close whenever that zone is being serviced for cooling. Similarly, a user may want to have the window blinds automatically close whenever two or more zones are being served. To accomplish the automatic operation of the blinds, the signals that drive the blinds are simply fed to the input of the non-HVAC relay on the control panel 110 which is operatively connected to the electronic controller 2515 via the non-HVAC contacts 2620. Whenever the electronic controller 2515 senses the pre-programmed triggering condition, the electronic controller activates the non-HVAC relay such that the signals to drive the window blinds are passed through the non-HVAC relay to the window blind motor, for example.

Figure 27:
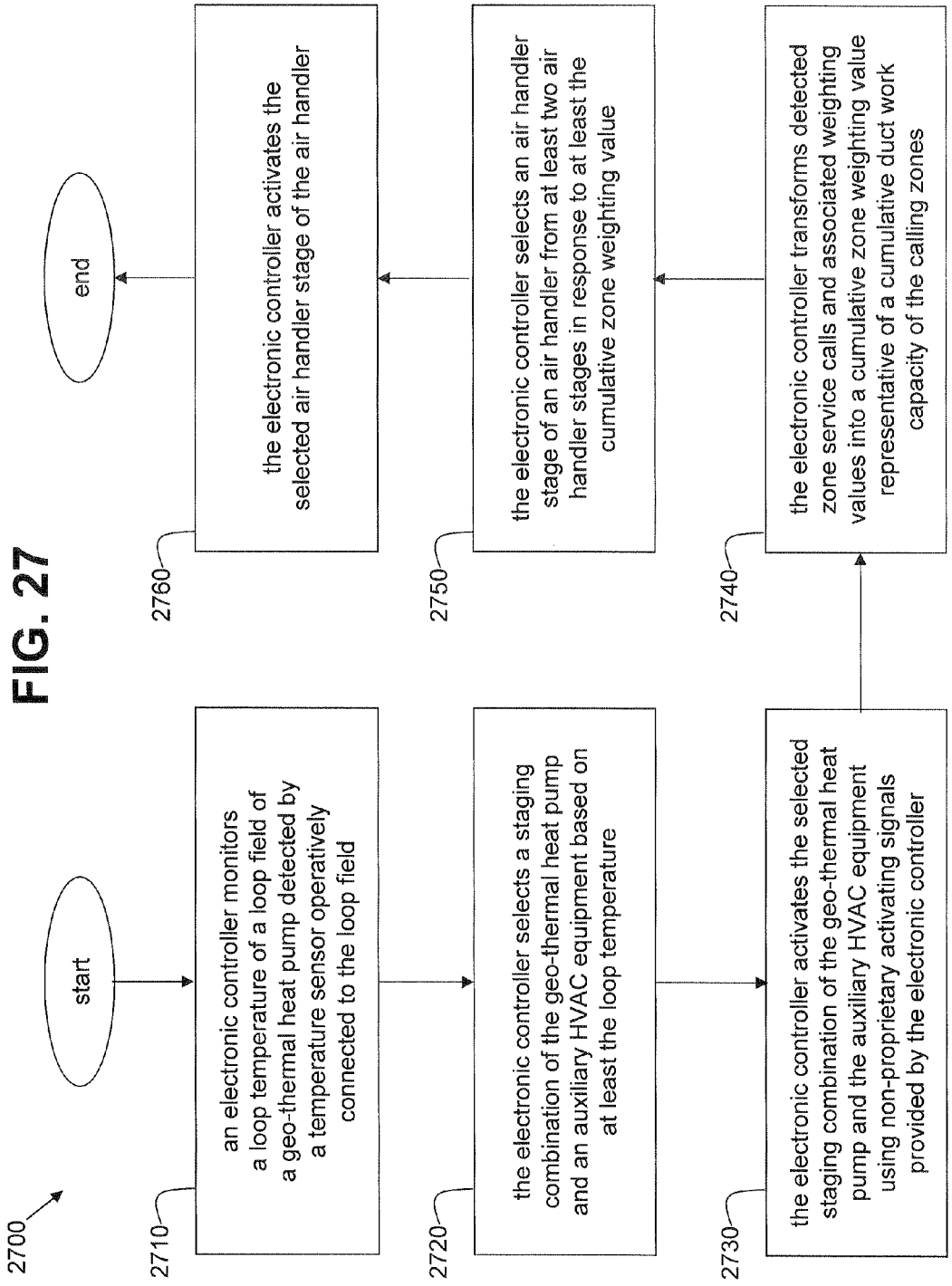
FIG. 27 is a flowchart of an example embodiment of a method to control environmental parameters of pre-defined zones within a first environment using the electronic controller of FIG. 26 in the system of FIG. 25.

FIG. 27 is a flowchart of an example embodiment of a method 2700 to control environmental parameters of pre-defined zones within a first environment using the electronic controller 2515 of FIG. 26 in the system 2500 of FIG. 25. The environmental parameters may include temperature, humidity, and air flow, for example. In step 2710 of the method 2700, an electronic controller 2515 monitors a loop temperature (LPT) of a loop field of a geo-thermal heat pump 2510 detected by a temperature sensor 2580 operatively connected to the loop field. In step 2720, the electronic controller 2515 selects a staging combination of the geo-thermal heat pump 2510 and an auxiliary HVAC equipment 2530 or 2540 based on at least the loop temperature. In accordance with an embodiment of the present invention, selecting a staging combination in step 2720 of the method 2700 may include selecting one or more stages of the geo-thermal heat pump 2510 along with no stage, one stage, or more than one stage of the auxiliary HVAC equipment 2530 or 2540. Furthermore, situations may arise where one or more stages of the auxiliary HVAC equipment is selected, but not any stages of the geo-thermal heat pump. For example, such a situation may arise when it is determined by the electronic controller 2515 that the geo-thermal heat pump 2510 is not functioning correctly.

In step 2730, the electronic controller 2515 activates the selected staging combination of the geo-thermal heat pump 2510 and the auxiliary HVAC equipment 2530 or 2540 using non-proprietary activating signals provided by the electronic controller 2515. The non-proprietary activating signals from the electronic controller 2515 are generated to be able to operate with standard geo-thermal heat pump equipment and standard auxiliary HVAC equipment. As a result, the electronic controller 2515 is compatible with standard HVAC equipment.

In accordance with an embodiment of the present invention, each of the pre-defined zones has an associated duct work capacity and the electronic controller 2515 stores a weighting value for each of the pre-defined zones which is representative of the associated duct work capacity of each of the pre-defined zones. In step 2740, the electronic controller 2515 transforms detected zone service calls and associated weighting values into a cumulative zone weighting value being representative of a cumulative duct work capacity of the calling zones. A zone service call may include any of a heating call, a cooling call, a humidification call, a de-humidification call, and a fan-only call. The zone service calls originate from zone sensor devices 2550 (e.g., a thermostat, a humidistat, a de-humidistat) associated with the various zones and are detected by the electronic controller 2515.

In step 2750, the electronic controller 2515 selects an air handler stage of an air handler 2520 from at least two air handler stages in response to at least the cumulative zone weighting value. In step 2760, the electronic controller 2515 activates the selected air handler stage of the air handler 2520. Furthermore, the electronic controller 2515 may activate at least one duct work air damper device 2560 associated with each zone of the detected zone service calls.

In accordance with another embodiment of the present invention, the electronic controller 2515 may select a staging combination of the geo-thermal heat pump 2510 and the auxiliary HVAC equipment 2530 or 2540 based not just on loop temperature (LPT), but also on other parameters such as at least one of a change ($\Delta T$) in the LAT, the OAT, the cumulative zone weighting value, or a time-out signal derived from the real-time clock 2630. Again, the electronic controller is configured to allow an HVAC contractor/practitioner to set threshold values (high or low) to which the parameters can be compared to trigger staging decisions.

Figure 28A:
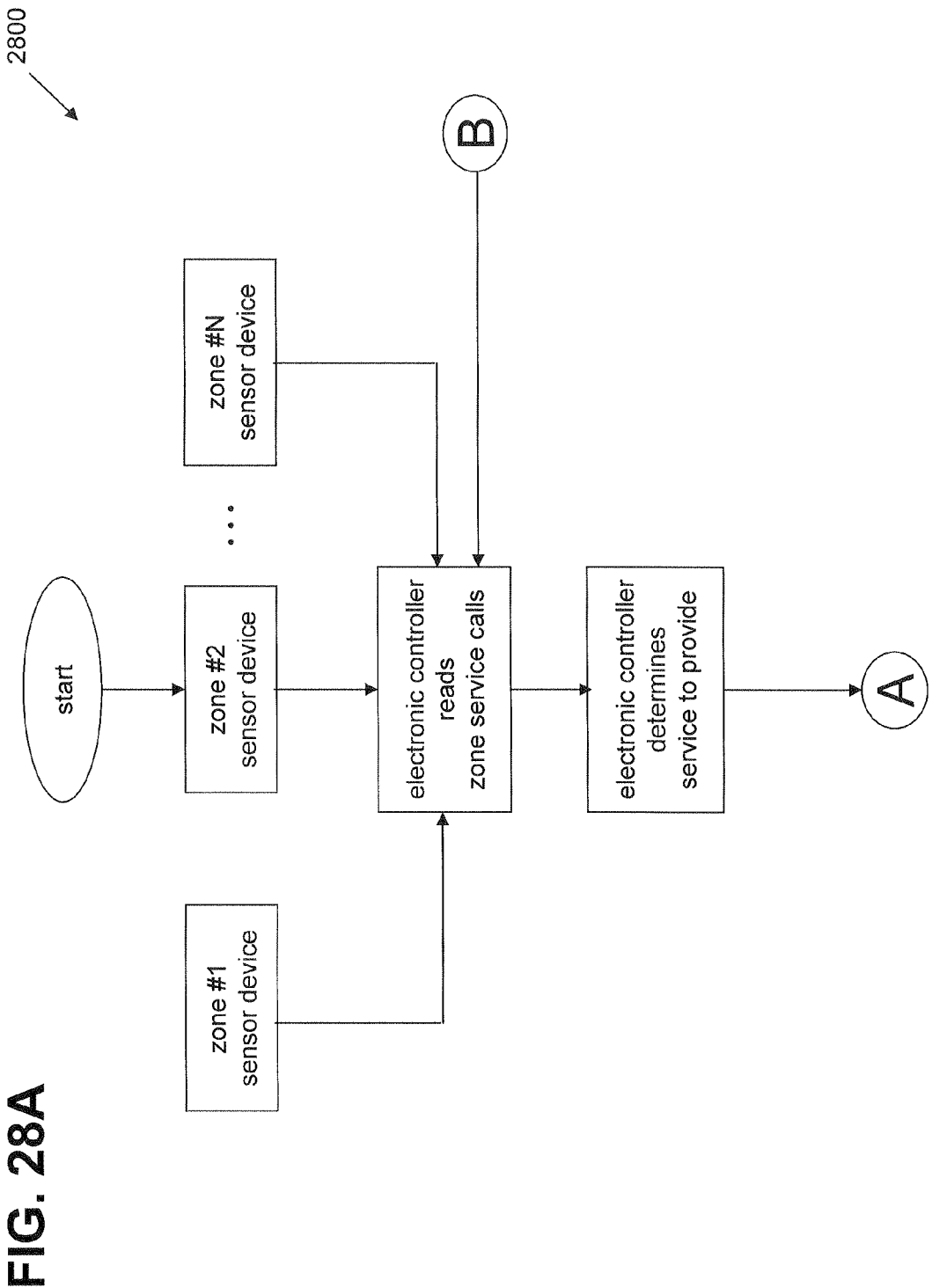
FIGS. 28A-28B illustrate a functional block diagram of an embodiment of a process for controlling environmental parameters of pre-defined zones within a first environment using the system of FIG. 25 having the electronic controller of FIG. 26 which embodies the method of FIG. 27.
Figure 28B:
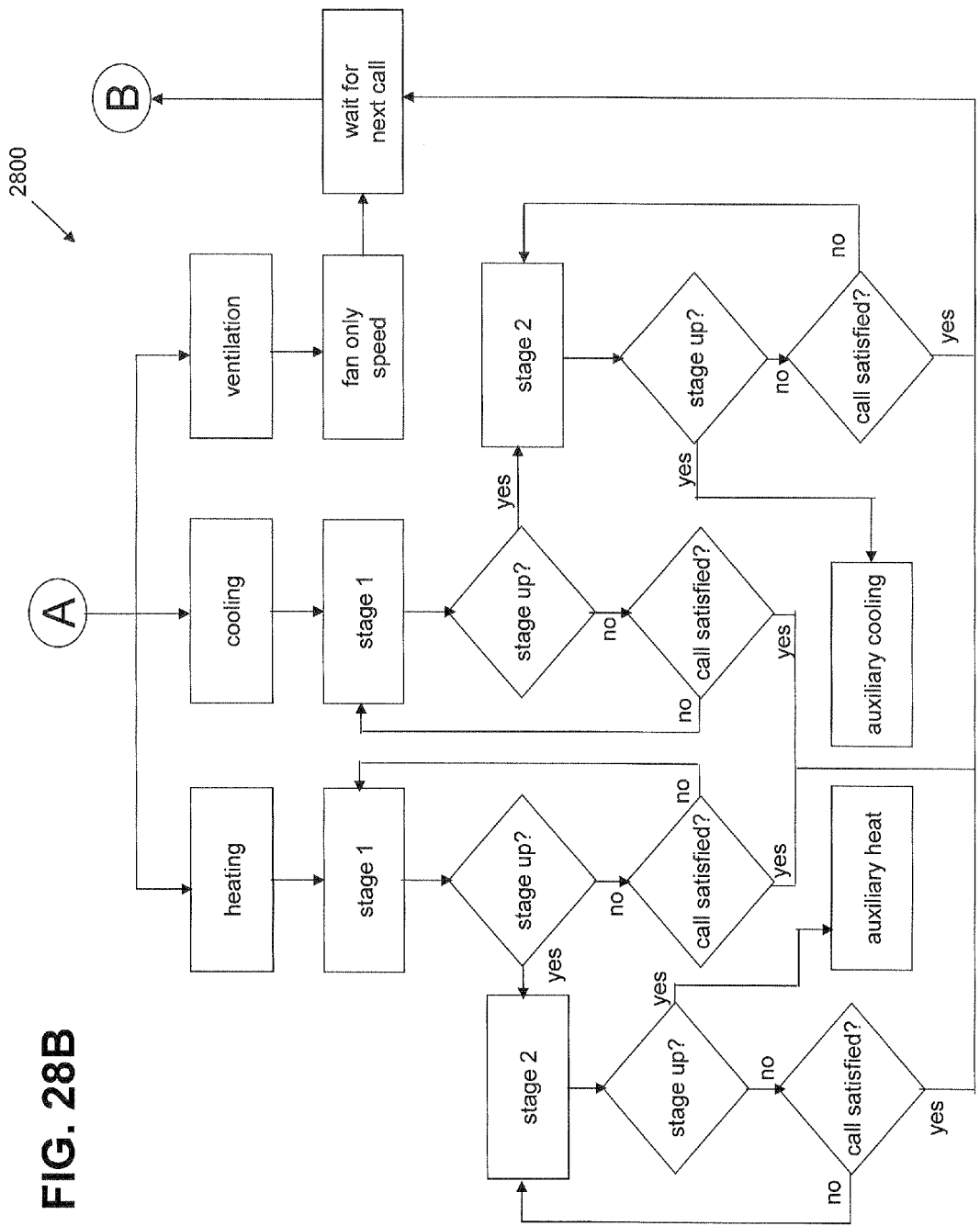

FIGS. 28A-28B illustrate a functional block diagram of an embodiment of a process 2800 for controlling environmental parameters of pre-defined zones within a first environment using the system 2500 of FIG. 25 having the electronic controller 2515 of FIG. 26 which embodies the method 2700 of FIG. 27. FIG. 28A shows N sensor devices (#1 to #N) corresponding to a sensor device in each of N zones. The electronic controller 2515 monitors the sensor devices and reads any zone service calls from the sensor devices. In response to reading the zone service calls, the electronic controller 2515 determines which service to provide.

In FIG. 28B, three services are shown being that of heating, cooling, and ventilation. If one or more zones call for heating, for example, the electronic controller 2515 will activate at least stage 1 of the geo-thermal heat pump 2510 and at least a first stage of the air handler 2520. The electronic controller 2515 will further determine if stage 2 of the geo-thermal heat pump 2510 should be activated, if a further stage of the air handler should be activated, and if the auxiliary HVAC heating equipment 2530 should be activated. Again, such staging decisions are based on programmable combinations of loop temperature (LPT), leaving air temperature (LAT), outdoor air temperature (OAT), cumulative zone weighting value, and time as described previously herein. Similarly, if one or more zones call for cooling, the electronic controller 2515 will react in a similar manner, activating appropriate stages of the geo-thermal heat pump 2510, the auxiliary HVAC cooling equipment 2540, and the air handler 2520.

If one or more zones call for ventilation, then the electronic controller 2515 activates a fan-only speed of the air handler 2520 to provide ventilation to the calling zones. Similarly, if one or more zones call for humidification or de-humidification, one or more stages of the geo-thermal heat pump 2510 may be activated along with an auxiliary HVAC humidifier or an auxiliary HVAC de-humidifier.

In summary, a method and system to control environmental parameters of pre-defined zones within an environment using an electronic controller are disclosed. An electronic controller monitors a loop temperature of a loop field of a geo-thermal heat pump as detected by a temperature sensor connected to the loop field. The electronic controller selects a staging combination of the geo-thermal heat pump and an auxiliary HVAC equipment based on at least the loop temperature. The electronic controller activates the selected staging combination, to modify at least a portion of the environmental parameters, using non-proprietary activating signals provided by the electronic controller.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiment disclosed, but that the claimed subject matter will include all embodiments falling within the scope of the appended claims.

What is claimed is:

1. A method to control environmental parameters of pre-defined zones within a first environment using an electronic controller, said method comprising:
   said electronic controller monitoring a loop temperature of a loop field of a geo-thermal heat pump detected by a temperature sensor operatively connected to said loop field;
   said electronic controller selecting a staging combination of said geo-thermal heat pump and an auxiliary HVAC equipment based on at least said loop temperature; and
   said electronic controller activating said selected staging combination of said geo-thermal heat pump and said auxiliary HVAC equipment, to modify at least a portion of said environmental parameters, using industry standard activating signals provided by said electronic controller.

2. The method of claim 1, where each of said pre-defined zones has an associated duct work capacity, and where said electronic controller stores a weighting value for each of said pre-defined zones representative of said associated duct work capacity of each of said pre-defined zones, said method further comprising:
   said electronic controller detecting any zone service calls from sensor devices associated with each of said pre-defined zones;
   said electronic controller transforming said detected zone service calls and said weighting value of each of said pre-defined zones associated with said detected zone service calls into a cumulative zone weighting value representative of a cumulative duct work capacity of said pre-defined zones associated with said detected zone service calls;
   said electronic controller selecting an air handler stage from at least two air handler stages of an air handler in response to at least said cumulative zone weighting value; and
   said electronic controller activating said selected air handler stage.

3. The method of claim 2 further comprising said electronic controller activating at least one duct work air damper device of said pre-defined zones associated with said detected zone service calls.

4. The method of claim 2 further comprising said electronic controller selecting said staging combination of said geo-thermal heat pump and said auxiliary HVAC equipment based further on said cumulative zone weighting value.

5. The method of claim 2 wherein said sensor devices associated with each of said pre-defined zones includes at least one of a thermostat, a humidistat, and a de-humidistat.

6. The method of claim 2 wherein said zone service calls include any of a heating call, a cooling call, a humidification call, a de-humidification call, and a fan-only call.

7. The method of claim 1 wherein said auxiliary HVAC equipment includes one of a gas furnace, a propane heater, an oil furnace, a resistive heating strip, an air conditioning unit, a humidifier, and a de-humidifier.

8. The method of claim 1 further comprising said electronic controller selecting said staging combination of said geo-thermal heat pump and said auxiliary HVAC equipment based further on a change ($\Delta T$) in a leaving air temperature (LAT) of an air handler.

9. The method of claim 1 further comprising said electronic controller selecting said staging combination of said geo-thermal heat pump and said auxiliary HVAC equipment based further on an outside air temperature (OAT) of a second environment which is external to said first environment.

10. The method of claim 1 further comprising said electronic controller selecting said staging combination of said geo-thermal heat pump and said auxiliary HVAC equipment based further on a time-out signal derived from a clock of said electronic controller.

11. The method of claim 1 wherein said environmental parameters include at least one of temperature, humidity, and air flow.

12. A forced air system to control environmental parameters of pre-defined zones within a first environment, said system comprising:
   an air handler providing at least two air handler stages;
   a geo-thermal heat pump having a loop field and being operatively connected to said air handler;
   an auxiliary HVAC equipment being operatively connected to said air handler; and
   an electronic controller being operationally connected to said air handler, said geo thermal heat pump, and said auxiliary HVAC equipment, wherein said electronic controller is configured for:
      (1) monitoring a loop temperature of said loop field of said geo-thermal heat pump detected by a temperature sensor operatively connected to said loop field;
      (2) selecting a staging combination of said geo-thermal heat pump and said auxiliary HVAC equipment based on at least said loop temperature; and
      (3) activating said selected staging combination of said geo-thermal heat pump and said auxiliary HVAC equipment, to modify at least a portion of said environmental parameters, using industry standard activating signals provided by said electronic controller.

13. The system of claim 12, where each of said pre-defined zones has an associated duct work capacity, and where a weighting value is assigned for each of said pre-defined zones representative of said associated duct work capacity of each of said pre-defined zones, and wherein said electronic controller is further configured for:
   (1) detecting any zone service calls from sensor devices associated with each of said pre-defined zones;
   (2) transforming said detected zone service calls and said weighting value of each of said pre-defined zones associated with said detected zone service calls into a cumulative zone weighting value representative of a cumulative duct work capacity of said pre-defined zones associated with said detected zone service calls;
   (3) selecting an air handler stage from said at least two air handler stages in response to at least said cumulative zone weighting value; and
   (4) activating said selected air handler stage.

14. The system of claim 13 further comprising at least one duct work air damper device associated with each of said pre-defined zones, wherein said electronic controller is further configured for activating said at least one duct work air damper device of said pre-defined zones associated with said detected zone service calls.

15. The system of claim 13 wherein said electronic controller is further configured for selecting said staging combination of said a geo-thermal heat pump and said auxiliary HVAC equipment based further on said cumulative zone weighting value.

16. The system of claim 13 wherein said sensor devices associated with each of said pre-defined zones includes at least one of a thermostat, a humidistat, and a de-humidistat.

17. The system of claim 13 wherein said zone service calls include any of a heating call, a cooling call, a humidification call, a de-humidification call, and a fan-only call.

18. The system of claim 12 wherein said auxiliary HVAC equipment includes one of a gas furnace, a propane heater, an oil furnace, a resistive heating strip, an air conditioning unit, a humidifier, and a de-humidifier.

19. The system of claim 12 wherein said electronic controller is further configured for selecting said staging combination of said geo-thermal heat pump and said auxiliary HVAC equipment based further on a change ($\Delta T$) in a leaving air temperature (LAT) of said air handler.

20. The system of claim 12 wherein said electronic controller is further configured for selecting said staging combination of said a geo-thermal heat pump and said auxiliary HVAC equipment based further on an outside air temperature (OAT) of a second environment which is external to said first environment.

21. The system of claim 12 wherein said electronic controller is further configured for selecting said staging combination of said a geo-thermal heat pump and said auxiliary HVAC equipment based further on a time-out signal derived from a clock of said electronic controller.

22. The system of claim 12 wherein said environmental parameters include at least one of temperature, humidity, and air flow.

23. An electronic controller for use in a forced air system to control environmental parameters of pre-defined zones within a first environment, said electronic controller comprising:
   a programmable microprocessor;
   sensor inputs; and
   at least one programmable dry contact relay providing interaction with HVAC systems, wherein said electronic controller is configured for:
      (1) monitoring a loop temperature of a loop field of a geo-thermal heat pump detected by a temperature sensor operatively connected to said loop field;
      (2) selecting a staging combination of said geo-thermal heat pump and an auxiliary HVAC equipment based on at least said loop temperature; and
      (3) activating said selected staging combination of said geo-thermal heat pump and said auxiliary HVAC equipment, to modify at least a portion of said environmental parameters, using industry standard activating signals provided by said electronic controller.

24. The electronic controller of claim 23, where each of said pre-defined zones has an associated duct work capacity, and where a weighting value is assigned and stored on said electronic controller for each of the pre-defined zones representative of said associated duct work capacity of each of said pre-defined zones, and wherein said electronic controller is further configured for:
   (1) detecting any zone service calls from sensor devices associated with each of said pre-defined zones;
   (2) transforming said detected zone service calls and said weighting value of each of said pre-defined zones associated with said detected zone service calls into a cumulative zone weighting value representative of a cumulative duct work capacity of said pre-defined zones associated with said detected zone service calls;
   (3) selecting an air handler stage from at least two air handler stages of an air handler in response to at least said cumulative zone weighting value; and
   (4) activating said selected air handler stage.

25. The electronic controller of claim 24 wherein said electronic controller is further configured for activating at least one duct work air damper device of said pre-defined zones associated with said detected zone service calls.

26. The electronic controller of claim 24 wherein said electronic controller is further configured for selecting said staging combination of said geo-thermal heat pump and said auxiliary HVAC equipment based further on said cumulative zone weighting value.

27. The electronic controller of claim 24 wherein said sensor devices associated with each of said pre-defined zones includes at least one of a thermostat, a humidistat, and a de-humidistat.

28. The electronic controller of claim 24 wherein said zone service calls include any of a heating call, a cooling call, a humidification call, a de-humidification call, and a fan-only call.

29. The electronic controller of claim 23 further comprising a real-time clock providing for the logging of data and time duration monitoring.

30. The electronic controller of claim 23 further comprising at least one programmable dry contact relay providing interaction with a non-HVAC system.

31. The electronic controller of claim 23 further comprising a USB port interface providing flash drive reading/writing capability.

32. The electronic controller of claim 23 wherein said auxiliary HVAC equipment includes one of a gas furnace, a propane heater, an oil furnace, a resistive heating strip, an air conditioning unit, a humidifier, and a de-humidifier.

33. The electronic controller of claim 23 wherein said electronic controller is further configured for selecting said staging combination of said geo-thermal heat pump and said auxiliary HVAC equipment based further on a change ($\Delta T$) in a leaving air temperature (LAT) of an air handler.

34. The electronic controller of claim 23 wherein said electronic controller is further configured for selecting said staging combination of said geo-thermal heat pump and said auxiliary HVAC equipment based further on an outside air temperature (OAT) of a second environment which is external to said first environment.

35. The electronic controller of claim 23 wherein said electronic controller is further configured for selecting said staging combination of said geo-thermal heat pump and said auxiliary HVAC equipment based further on a time-out signal derived from a clock of said electronic controller.

36. The electronic controller of claim 23 wherein said environmental parameters include at least one of temperature, humidity, and air flow.

* * * * *